US008631044B2

(12) United States Patent
Jebara et al.

(10) Patent No.: US 8,631,044 B2
(45) Date of Patent: Jan. 14, 2014

(54) MACHINE OPTIMIZATION DEVICES, METHODS, AND SYSTEMS

(75) Inventors: Tony Jebara, New York, NY (US); Bert Huang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/133,932

(22) PCT Filed: Dec. 11, 2009

(86) PCT No.: PCT/US2009/067630
§ 371 (c)(1),
(2), (4) Date: Sep. 15, 2011

(87) PCT Pub. No.: WO2010/068840
PCT Pub. Date: Jun. 17, 2010

(65) Prior Publication Data
US 2012/0005238 A1    Jan. 5, 2012

Related U.S. Application Data

(63) Continuation-in-part of application No. PCT/US2009/032070, filed on Jan. 26, 2009.

(60) Provisional application No. 61/122,356, filed on Dec. 12, 2008.

(51) Int. Cl.
*G06F 7/00* (2006.01)
(52) U.S. Cl.
USPC .......................................... 707/798; 709/201
(58) Field of Classification Search
CPC .................... G06F 17/30958; G06F 17/30867; G06F 17/30961
USPC ............. 707/798, 999.102, 999.002; 709/201
See application file for complete search history.

(56) References Cited

U.S. PATENT DOCUMENTS 6,091,424 A * 7/2000 Madden et al. ............... 345/619
6,714,975 B1 * 3/2004 Aggarwal et al. ............. 709/224
(Continued)

FOREIGN PATENT DOCUMENTS

JP    2006-039955 A    2/2006
KR    2007-0058046 A    6/2007

OTHER PUBLICATIONS

Huang et al., "Maximum Likelihood Graph Structure Estimation with Degree Distributions", In Analyzing Graphs: Theory and Applications, NIPS Workshop, 2008, 6 pages.*

(Continued)

*Primary Examiner* — Phuong Thao Cao
(74) *Attorney, Agent, or Firm* — Miles and Stockbridge P.C.; Mark A. Catan

(57) ABSTRACT

A method, system, computer program product and computer readable media for matching using degree distribution information are disclosed. An embodiment of the method can include performing b-matching on a graph data structure expanded using degree distribution information in order to identify neighbors of a selected input node. The b-matching can be performed using belief propagation. The belief propagation method is adapted to use a compressed message update rule and to be suitable for use with distributed processing systems. An embodiment can also include enhancing a matching result by applying degree distribution information to a first matching result to generate a second matching result. Embodiments for online advertisement/search term matching, product recommendation, dating service and social network matching, auction buyer/seller matching and resource allocation, among other, are disclosed.

73 Claims, 29 Drawing Sheets

(56) References Cited

U.S. PATENT DOCUMENTS

| | | | |
|---|---|---|---|
| 6,952,682 B1* | 10/2005 | Wellman | 705/37 |
| 7,489,638 B2* | 2/2009 | Keslassy et al. | 370/238 |
| 7,733,895 B2* | 6/2010 | Kesselman et al. | 370/416 |
| 7,778,247 B2* | 8/2010 | Green | 370/389 |
| 7,788,260 B2* | 8/2010 | Lunt et al. | 707/727 |
| 7,933,915 B2* | 4/2011 | Singh et al. | 707/760 |
| 8,000,262 B2* | 8/2011 | Leighton et al. | 370/254 |
| 8,078,255 B2* | 12/2011 | Bhandarkar et al. | 600/407 |
| 8,150,634 B1* | 4/2012 | Constantine et al. | 702/20 |
| 8,195,693 B2* | 6/2012 | Syeda-Mahmood | 707/790 |
| 8,250,600 B2* | 8/2012 | Kodialam et al. | 725/34 |
| 2001/0056395 A1 | 12/2001 | Khan et al. | |
| 2002/0099519 A1* | 7/2002 | Srivastava | 702/181 |
| 2003/0140143 A1* | 7/2003 | Wolf et al. | 709/225 |
| 2003/0185229 A1* | 10/2003 | Shachar et al. | 370/460 |
| 2004/0267686 A1* | 12/2004 | Chayes et al. | 707/1 |
| 2005/0048456 A1* | 3/2005 | Chefd'hotel et al. | 434/267 |
| 2005/0226214 A1* | 10/2005 | Keslassy et al. | 370/351 |
| 2005/0243736 A1 | 11/2005 | Faloutsos et al. | |
| 2005/0265618 A1 | 12/2005 | Jebara | |
| 2006/0115267 A1* | 6/2006 | Kesselman et al. | 398/51 |
| 2006/0253418 A1 | 11/2006 | Charnock et al. | |
| 2006/0271438 A1 | 11/2006 | Shotland et al. | |
| 2007/0014247 A1* | 1/2007 | Ou et al. | 370/254 |
| 2007/0031003 A1 | 2/2007 | Cremers | |
| 2007/0050282 A1* | 3/2007 | Chen et al. | 705/38 |
| 2007/0118432 A1 | 5/2007 | Vazirani et al. | |
| 2007/0185871 A1 | 8/2007 | Canright et al. | |
| 2007/0239694 A1* | 10/2007 | Singh et al. | 707/3 |
| 2008/0027969 A1 | 1/2008 | Wen et al. | |
| 2008/0052152 A1* | 2/2008 | Yufik | 705/14 |
| 2008/0071764 A1 | 3/2008 | Omi et al. | |
| 2008/0215607 A1* | 9/2008 | Kaushansky et al. | 707/102 |
| 2008/0243735 A1 | 10/2008 | Rish et al. | |
| 2008/0256034 A1* | 10/2008 | Chang et al. | 707/3 |
| 2008/0260230 A1 | 10/2008 | Gotardo et al. | |
| 2008/0275861 A1* | 11/2008 | Baluja et al. | 707/5 |
| 2008/0275899 A1* | 11/2008 | Baluja et al. | 707/102 |
| 2008/0307097 A1 | 12/2008 | Sabatelli et al. | |
| 2009/0022403 A1 | 1/2009 | Takamori et al. | |
| 2009/0110089 A1* | 4/2009 | Green | 375/260 |
| 2009/0262664 A1* | 10/2009 | Leighton et al. | 370/254 |
| 2010/0251290 A1* | 9/2010 | Kodialam et al. | 725/34 |
| 2010/0257054 A1* | 10/2010 | Martin et al. | 705/14.46 |
| 2011/0040619 A1* | 2/2011 | Jebara et al. | 705/14.46 |

OTHER PUBLICATIONS

Sanghavi et al., "Linear Programming Analysis of Loopy Belief Propagation for Weighted Matching", In Advances in Neural Information Processing Systems 20, 2008, 8 pages. (Provided by Applicant).*

Sanghavi et al., "Belief Propagation and LP relaxation for Weighted Matching in General Graphs", In Proceedings of NIPS, Dec. 2007, 17 pages.*

Bayati et al. "Belief Propagation for Weighted b-Matching on Arbitrary Graphs and its Relation to Linear Programs with Integer Solutions", Technical Report, ARXIR: 0709.1190, Microsoft Research, Sep. 2007, 22 pages.*

Bayati et al., "Maximum Weight Matching via Max-Product Belief Propagation", In 2005 IEEE International Symposium on Information Theory (ISIT), 2005, 5 pages.*

Pandit et al., Netprobe: A Fast and Scalable System for Fraud Detection in Online Auction Networks, 2007, WWW '07: Proceedings of the 16th International Conference on World Wide Web, pp. 201-210.

Huang et al., Loopy belief propagation for bipartite maximum weight b-matching, 2007, Proceedings of the Eleventh International Conference on Artificial Intelligence and Statistics, pp. 1-8.

Bayati et al., Maximum weight matching via max-product belief propagation, *In Proc. of the IEEE International Symposium on Information Theory*, 2005, 5 pages.

Fremuth-Paeger et al., Balanced network flows, 1. a unifying framework for design and analysis of matching algorithms, *Networks*, 33(1):1-28, 1999.

Jaakkola et al., Maximum-margin matrix factorization, In *Advances in Neural Information Processing Systems 17*, MIT Press, Cambridge, MA, 2004, 8 pages.

Jebara et al., B-matching for spectral clustering, *In Proc. of the European Conference on Machine Learning, EMCL*, 2006, pp. 679-686.

Marlin et al., Collaborative filtering and the missing at random assumption, *In Proceedings of U AI 2007*, 2007, pp. 267-275.

Marlin, B., Modeling user rating profiles for collaborative filtering. *In Advances in Neural Information Processing Systems 17*. MIT Press, 2004, 8 pages.

McDiarmid, Colin, On the method of bounded differences, *Surveys in Combinatorics*, p. 148188, 1989, pp. 148-188.

Morris et al., Denoising and untangling graphs using degree priors, *In Advances in Neural Information Processing Systems 16*, MIT Press, Cambridge, MA, 2003, 8 pages.

NG et al., On spectral clustering: Analysis and an algorithm, *In Neural Information Processing Systems*, 2001, 8 pages.

Rennie et al., Fast maximum margin matrix factorization for collaborative prediction, In *ICML '05: Proceedings of the 22nd international conference on machine learning*, pp. 713-719, New York, NY, USA, 2005, ACM.

Sanghavi et al., Linear programming analysis of loopy belief propagation for weighted matching, *In Advances in Neural Information Processing Systems 20*, pp. 1273-1280, MIT Press, Cambridge, MA, 2008.

Srebro et al., Weighted low rank approximations, *In Proceedings of the 22nd international conference on machine learning*, 2003, 8 pages.

Shi et al., Normalized Cuts and Image Segmentation, *In IEEE Transactions on Pattern Analysis and Machine Intelligence*, vol. 22, No. 8, Aug. 2000, pp. 888-905.

Huang et al., Loopy Belief Propagation for Bipartite Maximum Weight b-Matching, AISTATS 2007, Proceedings of the Eleventh International Conference on Artificial Intelligence and Statics, Mar. 21-24, 2007, Puerto Rico. 8 pgs.

Huang et al., Maximum likelihood graph structure estimation with degree distributions, NIPS 2008 Workshop on analyzing Graphs: Theory and Applications Dec. 12, 2008 in Whistler, BC, Canada. 6 pgs.

Jebara et al., Graph Construction and b-Matching for Semi-Supervised Learning, posted on Columbia university Website May 13, 2009. 8 pgs.

Alon, Eigenvalues and expanders. Combinatorica, 6(2):83-96, 1986.

Alon et al., λ1, isoperimetric inequalities for graphs, and superconcentrators. Journal of Combinatorial Theory, Series B, 8:73-88, 1985.

Ambuhl, et al., Inapproximability results for sparsest cut, optimal linear arrangement and precendence constrained scheduling. In Foundations of Computer Science, 2007. 9 pgs.

Arora, et al. Expander flows, geometric embeddings and graph partitioning. In Symposium on Theory of Computing, 2004. 37 pgs.

Sanghavi et al., Linear programming analysis of loopy belief propagation for weighted matching. In Advances in Neural Information Processing Systems, 2005. 8 pgs.

Spielman et al., Spectral partitioning works: Planar graphs and finite element meshes. In IEEE Symposium on Foundations of Computer Science, 1996. 34 pgs.

Shaw et al., Structure preserving embedding. In Danyluk et al. (2009), ISBN 978-1-60558-516-1. 18 pgs.

Duan et al., Approximating maximum weight matching in near-linear time. In Proceedings 51st IEEE Symposium on Foundations of Computer Science (FOCS), 2010. 10 pgs.

Huang et al., Exact graph structure estimation with degree priors. In M. Wani, M. Kantardzic, V. Palade, L. Kurgan, and Y. Qi, editors, ICMLA, pp. 111-118. IEEE Computer Society, 2009. ISBN 978-0-7695-3926-3. 8 pgs.

Karatzoglou et al., Collaborative filtering on a budget. In Y. Teh and M. Titterington, Editors, Proceedings of the Thirteenth International Conference on Artificial Intelligence and Statistics (AISTATS), vol. 9, pp. 389-396, 2010.

(56) References Cited

OTHER PUBLICATIONS

Kolmogorov et al., Blossom v: a new implementation of a minimum cost perfect matching algorithm. Mathematical Programming Computation, 1:43-67, 2009. ISSN 1867-2949. URL http://dx.doi.org/10.1007/s12532-009-0002-8. 10.1007/s12532-009-0002-8.

Sankowski et al., Maximum weight bipartite matching in matrix multiplication time. Theor. Comput. Sci., 410(44): 4480-4488, 2009.

Shaw et al., Minimum volume embedding. In M. Meila and X. Shen, editors, Proceedings of the 11th International Conference on Artificial Intelligence and Statistics, vol. 2 of JMLR: W&CP, Mar. 2007. 8 pgs.

Weiss et al., MAP Estimation, Linear Programming and Belief Propagation with Convex Free Energies, School of Computer Science and Engineering, The Hebrew University of Jerusalem, Jerusalem, Israel, Proceedings of Uncertainty in Artificial Intelligence (UAI), 2007, Jul. 19-22, 2007. 10 pgs.

* cited by examiner

2500

|    | W1 | W2 | W3 |
|----|----|----|----|
| M1 | 1  | 2  | 3  |
| M2 | 4  | 5  | 6  |

|    | M1 | M2 | W1 | W2 | W3 |
|----|----|----|----|----|----|
| M1 | 0  | 0  | 1  | 2  | 3  |
| M2 | 0  | 0  | 4  | 5  | 6  |
| W1 | 1  | 4  | 0  | 0  | 0  |
| W2 | 2  | 5  | 0  | 0  | 0  |
| W3 | 3  | 6  | 0  | 0  | 0  |

| 5 x 5 Weight Matrix | Degree Distribution Marginals for each M and W (on respective rows) |
|---|---|
| Transpose of Degree Distribution Marginals for each M and W (on respective cols) | Zero Quadrant |

Degree Distributions
M1 = { 0.2, 0.6, 0.2 }
M2 = { 0.8, 0.1, 0.1 }
W1 = { 0.2, 0.6, 0.2 }
W2 = { 0.8, 0.2, 0 }
W3 = { 0.2, 0.8, 0 }

2508

| 0 | 0 | 1 | 2 | 3 | -0.2 | -0.4 | 0.4 | 0.2 | 0 |
|---|---|---|---|---|------|------|-----|-----|---|
| 0 | 0 | 4 | 5 | 6 | -0.8 | 0.7  | 0   | 0.1 | 0 |
| 1 | 4 | 0 | 0 | 0 | -0.2 | -0.4 | 0.4 | 0.2 | 0 |
| 2 | 5 | 0 | 0 | 0 | -0.8 | 0.6  | 0.2 | 0   | 0 |
| 3 | 6 | 0 | 0 | 0 | -0.2 | -0.6 | 0.8 | 0   | 0 |
| -0.2 | -0.8 | -0.2 | -0.8 | -0.2 | 0 | 0 | 0 | 0 | 0 |
| -0.4 | -0.7 | -0.4 | 0.6 | -0.6 | 0 | 0 | 0 | 0 | 0 |
| 0.4 | 0 | 0.4 | 0.2 | 0.8 | 0 | 0 | 0 | 0 | 0 |
| 0.2 | 0.1 | 0.2 | 0 | 0 | 0 | 0 | 0 | 0 | 0 |
| 0 | 0 | 0 | 0 | 0 | 0 | 0 | 0 | 0 | 0 |

FIG. 25D

MACHINE OPTIMIZATION DEVICES, METHODS, AND SYSTEMS

This application is a national stage application of International Application No. PCT/US09/67630, filed on Dec. 11, 2009, which claims the benefit of U.S. Provisional Application No. 61/122,356, entitled "Clustering Using B-Matching and Semidefinite Embedding Algorithms," filed on Dec. 12, 2008, and claims priority to, and is a continuation-in-part of, International Application No. PCT/US09/32070, entitled "Belief Propagation For Generalized Matching," filed on Jan. 26, 2009, each of which is hereby incorporated by reference in its entirety herein.

This invention was made with government support under Career Award IIS-0347499 awarded by the National Science Foundation. The government has certain rights in the invention.

BACKGROUND

Computational systems and methods are used to facilitate many transactions and machine functions. Examples include network optimization, pattern matching, consumer recommender engines, homeland security, and others. Many systems employ computational models called network models or graphs which define links or edges between nodes. The links and nodes may be used to represent features of the problem space. Some techniques employing graphs solve for an optimized set of edges based on constraints on a respective number of edges that may connect each node and a respective value associated with the connection. There exists a perennial need for new applications, speed improvements, reliability, and other advantages for such systems and methods.

SUMMARY

Embodiments of the disclosed subject matter relate generally to systems, methods, programs, computer readable media, and devices that benefit from the optimization of links between things, for example, those that optimize computer transactions, provide certain types of machine intelligence such as pattern recognition, make and optimize recommendations to facilitate and others.

In a particular example, a recommender makes certain transactions available responsively to optimized matches between goods or services and machine representations of people or other entities. Often these kinds of matching problems present an opportunity to optimize some global good, such as revenue for a seller, likelihood of a recommended product or service to be well-received by a consumer, or optimal selection and placement of advertising messages on search result pages, web content pages or adjacent internet media. Such an optimized matching can be handled using various methods, one of which is solving a matching problem by estimating or inferring a subgraph that represents an optimal or desirable level of the global good, whatever that may be for a particular application.

BRIEF DESCRIPTION OF THE DRAWINGS

FIGS. 25A-25D are diagrams of an initial weight matrix being expanded once to "square" the matrix and then expanded once again to include degree distribution data.

DETAILED DESCRIPTION

Figure 1:
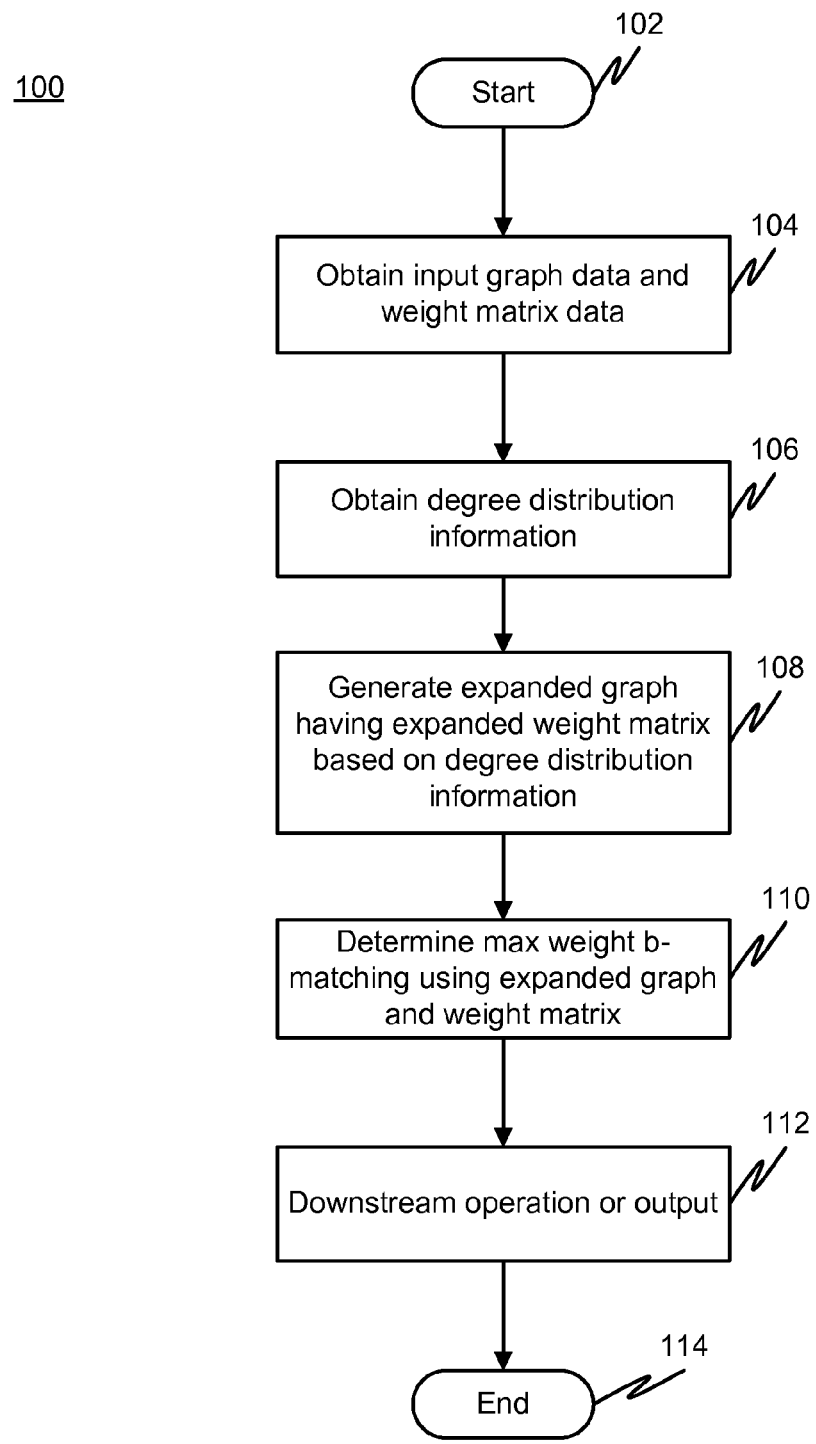
FIG. 1 is a chart of a method for matching using degree distribution information according to some embodiments of the disclosed subject matter.

Deriving an optimized graph structure given partial information about nodes and/or edges may be used as a computational framework for machine intelligence engines such as used for matching advertisements to consumers, allocating limited offers or recommendations in search engine result pages, machine learning, matching of buyers and sellers in an auction system, matching users of social networks, and many other problems. Many of these systems and methods involve the optimizing of a subgraph from an original graph data structure. Techniques have been developed for finding subgraphs from an original graph. However, conventional techniques may employ assumptions or compromises that fail to find global optima. More precise techniques suffer from execution times that are commercially unfeasible or undesirable for certain applications that may require relatively fast solution times.

Graph estimation can be used to match graph nodes of the same type with each other (e.g., unipartite graphs) or match nodes of a first type or class with nodes of a second type or class (e.g., bipartite graphs) with each other, and in other types of graphs. One type of matching is b-matching, where b represents the desired degree value for a result. Degree represents the number of connections or neighbors between nodes. The b value for matching can be a constant value and the same for all nodes. Alternatively, each node can have an independent b value that can be the same or different from that of the other nodes. Also, instead of being a constant value, the b value can be described as a distribution over a range of values. Problems types that include distributions of b-values (or degrees of connectedness between nodes) are known as degree distribution problems.

Examples of degree distribution problems include auctions where each buyer and seller may select an independent number (or capacity) of corresponding buyers/sellers or may have a range of capacities they can handle but which may incur different costs. Also a degree distribution problem can arise for cases in which the capacity changes over time, such as when a desired number of possible connections changes according to a quota which varies dynamically. Conventional approaches to solving b-matching problems may not be effective for solving degree distribution problems.

In general, many types of real-world problems can be represented as a graph for purposes of finding a solution to the problem using a computer programmed to solve a specific type of graph matching problem representing the real-world problem. The graph can include nodes that can be potentially connected via edges. Each edge in the graph can have a weight value representing a quantity such as cost, profit, compatibility, or the like. A solution to the problem can be represented as a subgraph of the original graph, the solution subgraph can be considered optimal if the subgraph maximizes the weight values.

For example, the problem of providing matches between online dating service users can be represented in a machine storing a representation of a bipartite graph (G) composed of a first group of nodes (v) representing males and a second group of nodes (μ) representing females. Edges (ϵ) in the graph can represent a potential match between two members (or nodes). A weight matrix can include weight values (W) for each edge representing a compatibility measure between the pair of male and female user nodes connected by the edge. An optimal solution to the online dating graph problem may be represented as a subgraph having edges connecting each member to those opposite members that are determined to be the most likely matches such that the subgraph produces a maximum or near-maximum compatibility value. The edge weight values for the online dating service problem can be compatibility index values that represent compatibility values for the respective edges (or connections) between respective members on the graph. The compatibility index value can be computed by any suitable process or system, for example, collaborative filtering, matching of profiles based on similarity or more complex rules, etc.

In addition to the online dating match problem having an original graph representing the dating service members and a weight matrix containing compatibility index values for matches between users, there can also be a degree distribution (ψ) for each member. The degree distribution indicates the degree (or number of connections) preference of a node. For example, in the dating service example, a degree distribution can represent the number of matches that a user has paid to receive, the number of matches that a user expects to be able to adequately evaluate within a certain time period, or the like. Generally speaking, the degree distribution for a node represents the degree preference for the node and can be used to encourage a graph solution for that node to have a desired number of connections, while numerically discouraging or penalizing undesired numbers of connections. Each node can have its own degree distribution.

B-matching is one technique for solving graph matching problems. In b-matching, the solution graph contains b matches for each node. While b-matching may be an acceptable technique for certain problems, in its conventional form it has not typically been useful for problems that include degree distributions because of the fixed-degree nature of the b-matching technique.

A graph representing a matching problem including degree distributions can be transformed into an expanded graph ($G_b$) and expanded weight matrix solvable using b-matching with fixed degrees to arrive at a solution that takes into account the degree distributions of the original problem. The expanded graph includes the original graph nodes as well as additional dummy nodes (d) and the expanded weight matrix includes the original weight values as well as additional weight values ($\omega$) determined based on the degree distribution values and that correspond to the edges ($E_b$) between original nodes and dummy nodes. By creating an expanded graph and weight matrix, the degree distribution values are incorporated into the weight matrix so that a b-matching solution of the expanded graph will reflect the degree distribution values for each node.

Returning to the online dating problem, each dating service member can have an associated degree distribution that represents a desired number of matches. An expanded graph is created using the original graph and dummy nodes. An expanded weight matrix is created using the original weight matrix and weight values for the dummy nodes that are determined using the degree distribution values.

Then, a b-matching is performed to solve for a maximum weight subgraph of the expanded graph and weight matrix. The b-matching can be performed using loopy belief propagation as described in greater detail below. A portion of the solution graph to the expanded graph is extracted and represents the solution to the original graph with degree distributions being considered in the solution.

The following paragraphs describe various specific embodiments of techniques matching using degree distribution that may be used as a basis for a variety of devices, systems, and methods.

FIG. 1 is a chart of a method for matching using degree distribution information according to some embodiments of the disclosed subject matter. In particular, in method 100 processing begins at 102 and continues to 104.

At 104, an input graph data structure and corresponding weight data are obtained. The input graph data structure can be a unipartite, bipartite, or other type of graph data structure. The weight data represents a weight (or a profit, cost, or other measure) of an edge between two nodes in the graph data.

At 106, degree distribution information is obtained. The degree distribution information includes degree distribution information for each node in the input graph data structure. The degree distribution information can include prior distribution over node degrees, degree information inferred from statistical sampling properties, degree distributions learned empirically from data, given degree probabilities, or the like. The degree distribution for each node can be specified by a term $\psi_j$.

At 108, a new graph data structure is generated that includes dummy nodes in addition to the nodes of the input graph data structure. There are an additional number of dummy nodes equal to each set of nodes in the input graph. An expanded weight matrix is generated using the input weight matrix as the weight values for the input nodes in the expanded weight matrix and degree distribution information is used to determine a weight value for edges between input nodes and dummy nodes, according to the following formula:

$$w(v_i, d_{i,j}) = \psi_i(j-1) - \psi_i(j)$$

Processing continues to 110.

At 110, a maximum weight b-matching operation is performed on the expanded graph data structure and weight matrix. Depending on the structure of the input graph data, a max flow method can be used to determine the maximum weight b-matching or, when the graph a bipartite graph, a belief propagation method can be used to determine the maximum weight b-matching. During the maximum weight b-matching, b is set to the size of a dimension of the original weight matrix (e.g., if the original weight matrix is an n×n matrix, then b=n). The b-matching operation solves the following problem:

$$\hat{\varepsilon}_b = \text{argmax}_{\hat{\varepsilon}_b \subseteq \varepsilon_b} \sum_{(v_i, d_{i,j}) \in \hat{\varepsilon}_b} w(v_i, d_{i,j}) + \sum_{(i,j) \in \hat{\varepsilon}_b} W_{ij}$$

subject to $deg(v_i, \hat{\varepsilon}_b) = N_i$ for $v_i \in V$.

Where, v is a node, d is a dummy node, W is an edge potential or weight value, and $N_i = deg(v_i, \varepsilon)$ is the size of the neighborhood of node $v_i$.

Additional discussion of the mathematical basis and background of degree distribution matching is set forth in the Appendices.

At 112, an output operation is performed. For example, a result graph or matrix, or a portion of a result graph or matrix can be provided to another module within the same system, provided to another system or provided to a user or operator for use in another process. Processing continues to 114 where processing ends. It will be appreciated that 104-112 can be repeated in whole or in part in order to accomplish a contemplated matching using degree distribution.

Figure 2:
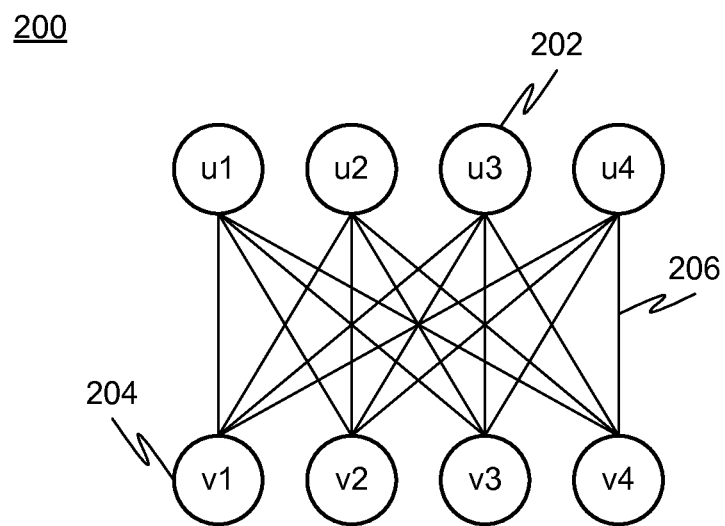
FIG. 2 is a schematic diagram of a matching problem represented as a bipartite graph showing unmatched elements.
Figure 3A:
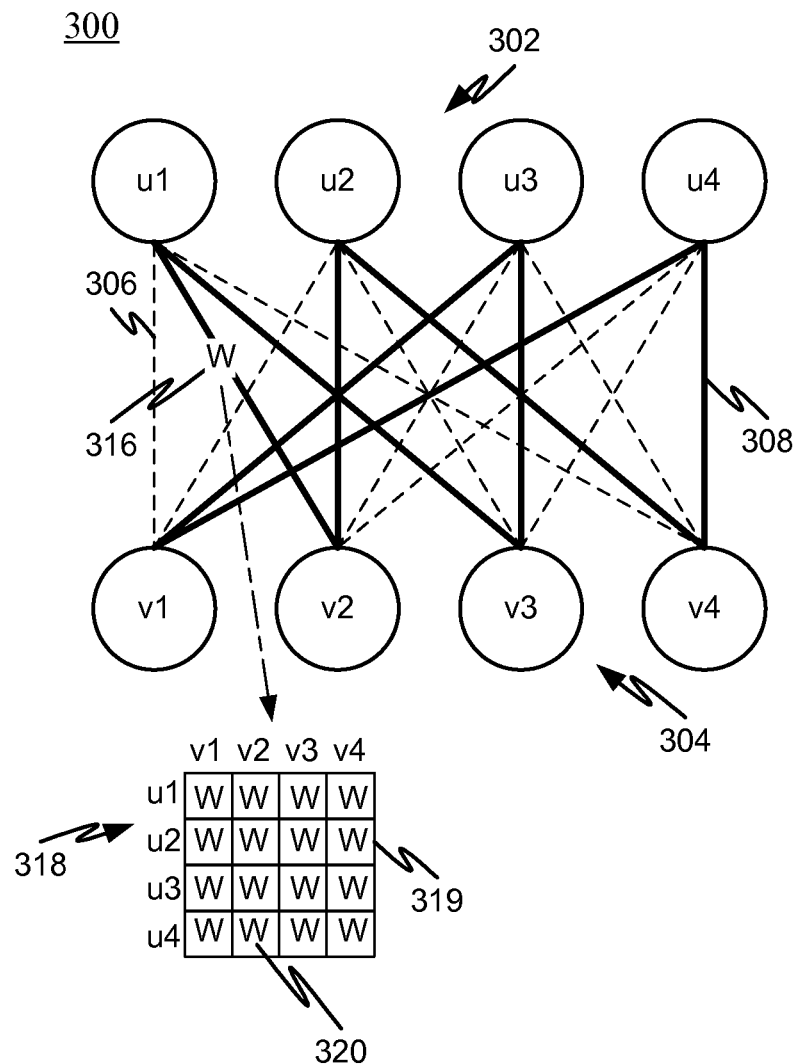
FIG. 3A is a schematic diagram of a matching problem represented as a bipartite graph showing matched elements, unmatched elements and a weight matrix, according to some embodiments of the disclosed subject matter.

FIG. 2 and FIG. 3A are schematic diagrams of a matching problem represented as a bipartite graph. FIG. 2 shows unmatched elements, while FIG. 3A shows matched elements, unmatched elements and a weight matrix.

FIG. 2 shows a bipartite graph 200 having a first group of nodes 202 (u1-u4) matched to a second group of nodes 204 (v1-v4) potentially connected by edges 206.

In FIG. 3A, a bipartite graph 300 shows a first group of nodes 302 (u1-u4) matched to a second group of nodes 304 (v1-v4). The first group may represent a first group of entities or things such as goods, people, or resources and the second group may represent a second group of entities or things such as consumers, people, or resource users. The nature of the objects or entities that can make up these first and second groups are numerous as should be clear from the instant disclosure, but a common feature in most embodiments is that entities of the first group are to be matched to entities of the second group as a part of some kind of a transaction and the precise matching may correspond to some kind of aggregate value such as maximum total revenue. The matching problem posed by the context of the particular first and second groups and the aggregate value sought may also involve constraints such as the number of first group of things that are to be matched to a given second group of thing. Groups could be distinguished by any classification and groupings are not limited by the examples given.

In FIG. 3A, dashed lines (e.g., 306) represent possible edges and solid lines (e.g., 308) represent b-matched edges. By b-matched, it is meant that the problem illustrated results in a desired b matches between each of the first group of things to one or more second group of things. In the case shown on the bipartite graph 300, b=2 for each node of groups 302 and 304, so that each node 302 or 304 is connected to two other nodes 304 or 302 with matched edges 308.

Typically, the information representing the potential assignment as indicated by all of the lines 306 and 308 can be supplemented with additional information, generally, weights, which indicate something about the value or cost associated with making each assignment. Here a weight W value of an edge is represented at 316. This weight information may serve as a basis for selecting an assignment that provides some optimum or provides a basis for discriminating the goodness of one assignment scheme versus another. The additional information may be represented in the form of any suitable data structure to store a weight for each edge, such as a weight matrix 318 with each row corresponding to a member of the first group and each column corresponding to a member of the second group with each cell 320 at an intersections indicating the respective weight of an edge connecting each pair of members. The weight matrix 318 represents different weights for each combination of buyer and seller.

The problem of matching of members of one group to another can be described in terms of a bipartite graph. Given a bipartite graph (which can be represented by 300) and associated weight data, a method can be used to perform a matching based on belief propagation. Here the example of a situation where it is desired to match suppliers with customers will be used to illustrate the method. One or more computers may be provided with information defining supplier and customers, which are referred here to as "nodes" which information may be considered to define a bipartite graph 300. Each supplier node (u 302 or v 304) is connected to a customer node (v 304 or u 302) by an edge 308 so the one or more computers is supplied with the potential edges 308 of all the nodes 302, 304 mapping from a supplier node to a customer node. The one or more computers are also provided with access to weight data, for example a matrix 318 with a weight value 319 for each edge of the bipartite graph data structure. The process executed by the one or more computers is such that information is recorded and updated respective of each node, such that a subprocess is performed for each node that communicates with other nodes. In this example, the weight data may be total cost of goods and the optimum matching would coincide with maximum exchange of revenue between buyers and sellers.

Figure 3B:
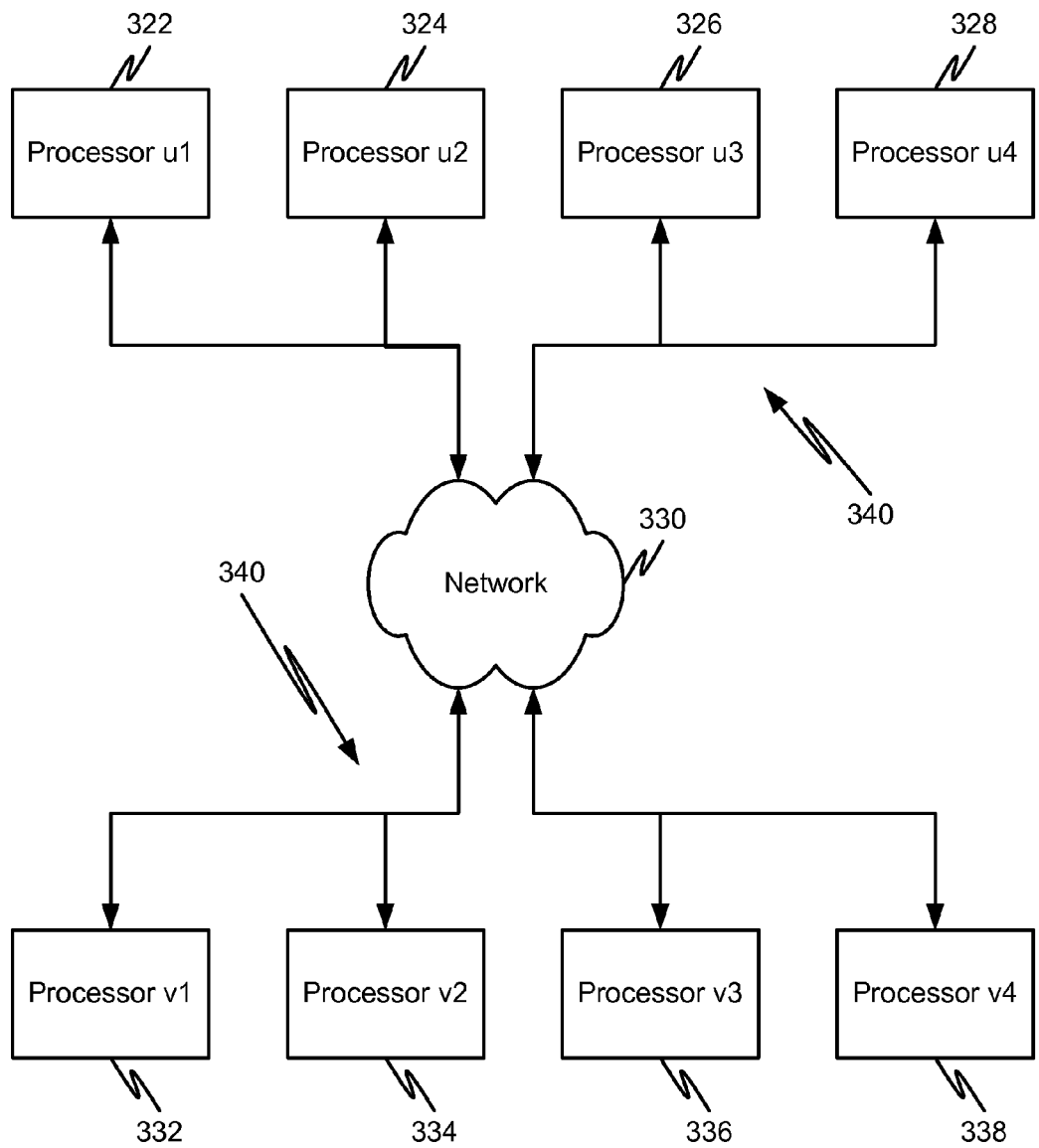
FIG. 3B is a diagram of an arrangement for distributed processing for performing matching using degree distribution information according to some embodiments of the disclosed subject matter.

Referring now also to FIG. 3B, according to this and other embodiments, the matching problem may be distributed in a system 321 among multiple processors 322-328 and 332-338 communicating over a network 330 such that each can send and receive messages via wired or wireless links being depicted figuratively as connecting lines 340. For the present example, each node shown in FIG. 3A may correspond to a respective node processor 322-328 and 332-338 in FIG. 3B. An alternative would be that each processor would correspond to multiple nodes, but for the sake of discussion, the case where there is a separate processor for each node will be assumed. In such a case only a portion of the weight data in the weight matrix 318 may be provided to each supplier node processor (322-328), the portion being sufficient to indicate the weights of the edges that connect each supplier to all its potential customers (e.g., all the other customers). Similarly, only a portion of the weight matrix 318 may be provided to each customer node processor (332-338) indicating the weights of the edges that connect the customer to all its potential suppliers. The node processors can access the respective weight information on common (e.g. central) or distributed data stores (e.g., respective of each node or community of node processors).

FIG. 3B is a diagram of an arrangement of distributed processors for generalized matching using belief propagation according to some embodiments of the disclosed subject matter. In particular, in this example, a first group of node processors (322-328) correspond to nodes u1-u4 of the graph shown in FIG. 3A, respectively. A second group of node processors (332-338) correspond to nodes v1-v4 of the graph shown in FIG. 3A, respectively. Each of the node processors (502-508 and 512-518) are independently coupled to a network 330 (e.g., the Internet, a local area network, wide area network, wireless network, virtual private network, custom network, bus, backplane, or the like). By being interconnected through the network 330, each of the node processors (322-328 and 332-338) can communicate with the others and send/receive messages according to the belief propagation method described above. Also, each of the node processors (322-328 and 332-338) can be queried independently for its b-matched list generated by the belief propagation method described above. Not only can each node be independently queried, but each node can arrive at its optimal b-matched solution without requiring knowledge of the other nodes' solutions (i.e., the belief propagation method is "privacy protecting" with respect to each node).

The solutions for each node can be aggregated in a central data storage location or may be retained individually at each node, or grouped according to a criterion (e.g., grouping all supplier matches into a list and all customer matches into another list).

The network 330 can be a network such as the Internet, a local area network (LAN), a wide area network (WAN), a virtual private network (VPN), a direct connection network (or point-to-point), or the like. In general, the network can include one or more now known or later developed technologies for communicating information that would be suitable for performing the functions described above. The selection of network components and technologies can depend on a contemplated embodiment.

In FIG. 3B, one processor is shown for each node for clarity and simplicity of illustrating and describing features of an embodiment. It will be appreciated that each processor may perform the belief propagation method for more than one node.

Not shown in FIG. 3A or 3B are dummy nodes used in the generation and solution of an expanded graph and weight matrix. The dummy nodes function essentially the same as the original nodes, but would not represent actual suppliers or bidders and also, as discussed below, are not degree constrained during the b-matching operation performed on the expanded graph and weight matrix.

Thus, each supplier node, customer node and dummy node may only require access to a vector, defining the potentially connected customer and supplier node weights and a portion of the degree distribution information. In an architecture embodiment for solving the bipartite graph problem, the expanded graph and matrix data may be apportioned among different computers or processors such that each receives only the lists of its suppliers or customers and the associated weights. Other than that, the only other information required for a complete solution, as will become clear below, is a train of messages from other nodes, where each message may be a simple scalar.

A matching can be obtained that progressively seeks an optimization of the above problem by having each customer node keep a score of, for example, how much better buying from each supplier node is than buying from other suppliers. Also, each buyer node may keep a score of how much better selling to each customer node is than selling to other customers. Initially, the score may be just the dollar values represented by the weights. In the process described below, figuratively speaking, as the scores are updated, the supplier nodes tell the customer nodes how much potential money is lost if they are chosen according to their current scores and the customers tell the suppliers similarly. All the scores are continuously updated using this data which may be described as passing messages among the nodes, where the messages contain the information to keep score. Eventually, if the scores are updated according to subject matter described below, the scores progress toward an optimum sorted list of suppliers for each customer and a sorted list of customers for each supplier. Then each supplier or customer node's information can be used to select that supplier or customer's best one or more matches.

In the approach described, each node updates a value corresponding to each of the supplier nodes and customer nodes, with a processor. The process may be described as "belief propagation," and entails passing messages between adjacent nodes. An important aspect of the approach is knowing when to stop passing messages and determine the best matchings from the node's data. Because the approach progresses toward an optimal solution, the basis for sorting the matches by each node gets better and better as each message is processed. Thus, the one or more one or more computers could be programmed to stop after a period of time or after a threshold number of messages. An optimal solution can be obtained upon the realization of another termination condition as described below.

Once the termination condition is met, the one or more one or more computers, a predetermined number of supplier nodes and a predetermined number of respective customer nodes matching each selected supplier node, may be selected and provided to a client process, for example the matchings may be displayed on a terminal for a user to see.

Note that the graphs 200, 300 and 321 include a limited number of nodes and edges for illustration purposes. The number of nodes and edges in an actual graph data structure for the embodiments described below may include a greater or lesser number of nodes/edges than the number of nodes/edges shown in FIGS. 2, 3A and 3B. Also, the b value for each node in a particular implementation may be assigned a value other than 2 depending on the contemplated matching problem to be solved by the implementation.

Figure 4:
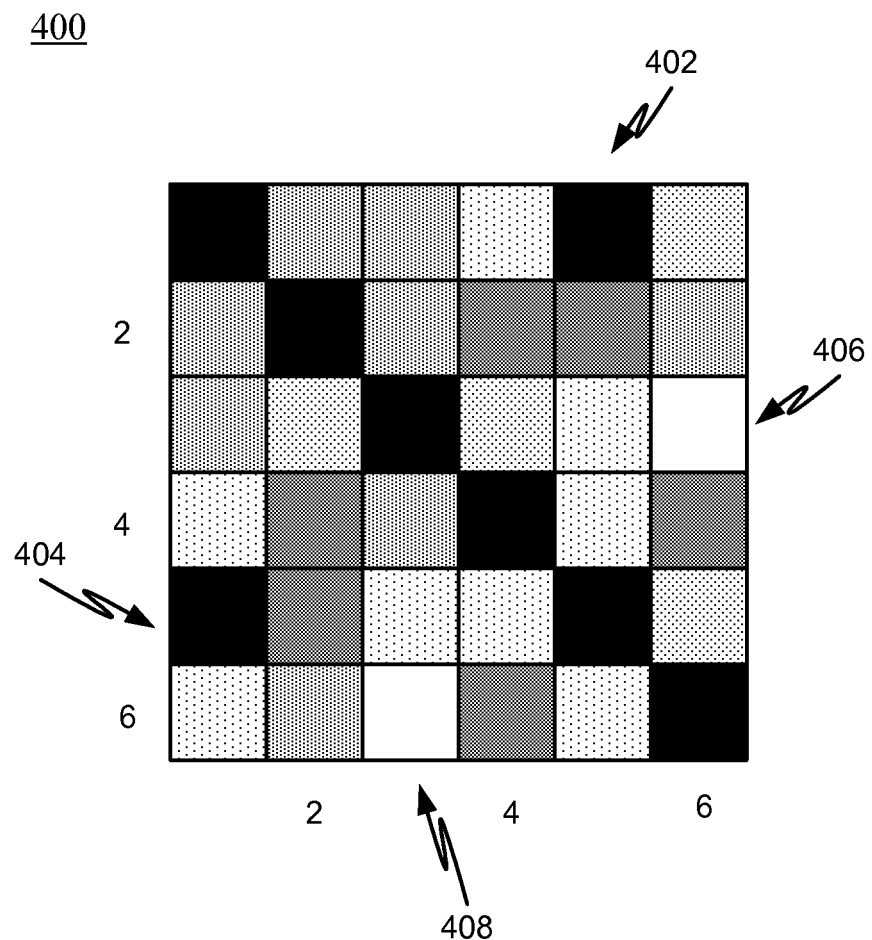
FIG. 4 is a schematic diagram of a weight matrix according to some embodiments of the disclosed subject matter.

FIG. 4 is a schematic diagram of a weight matrix according to some embodiments of the disclosed subject matter. In particular, a weight matrix 400 is shown graphically with cells having shading representing various weight values. The diagonal is shaded black to indicate no weight value for a node connecting to itself. Other node cells shaded black (e.g., 402 and 404) indicate a low weight value to reduce or eliminate the potential for the result to contain an edge for those respective nodes (e.g., between nodes 1 and 5). Also, the weight matrix may be adjusted to force or encourage the result to contain an edge between two nodes by containing a high weight value at weight matrix locations corresponding to an edge between two nodes (e.g., 406 and 408).

Figure 5:
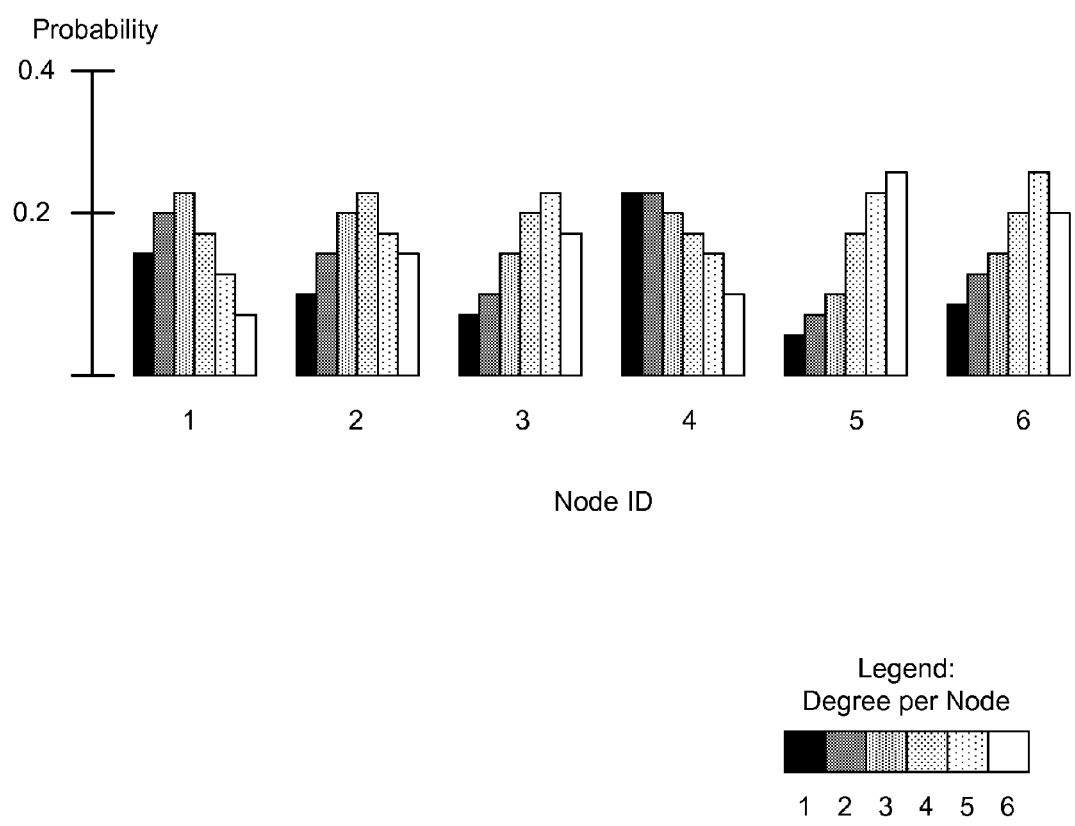
FIG. 5 is a schematic diagram of degree distribution information according to some embodiments of the disclosed subject matter.

FIG. 5 is a schematic diagram of degree distribution information according to some embodiments of the disclosed subject matter. The graphical representation of node degree distributions in FIG. 5 visually illustrates the information provided by degree distribution data. For example, Node 4 has a preference for a lower degree (say 1 or 2), while Node 5 has a preference for a higher degree (say 5 or 6). The matching system and method of this disclosure can perform matching while accommodating differing degree distribution priors or preferences by incorporating degree distribution information into an expanded weight matrix use to determine a matching result.

Figure 6:
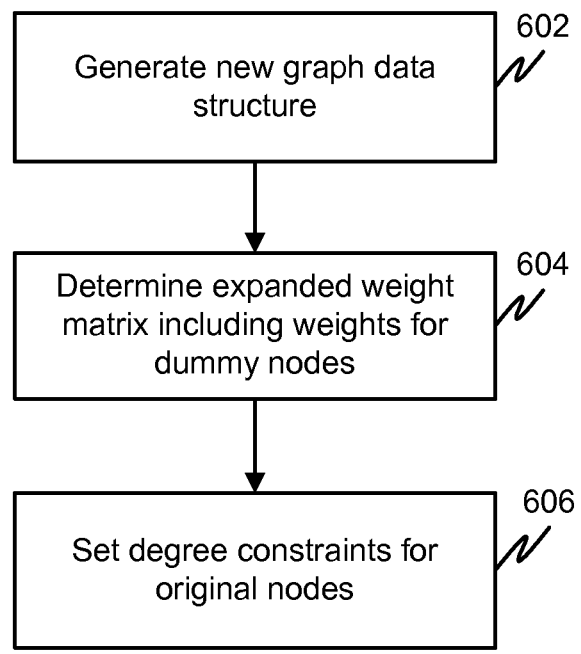
FIG. 6 is a chart of a method for generating an expanded weight matrix according to some embodiments of the disclosed subject matter.

FIG. 6 is a chart of a method for generating an expanded weight matrix according to some embodiments of the disclosed subject matter. In particular FIG. 6 expands on 108 from FIG. 1. Processing begins at 602 where a new graph structure is generated. The new graph structure is two times the size of the original graph structure. If the original graph structure had n nodes of each type, the new graph structure has 2n nodes and has a corresponding adjacency matrix of size 2n×2n.

At 604, an expanded weight matrix corresponding to the expanded graph data structure is determined. The expanded weight matrix includes the original weight matrix values in one quadrant, two quadrants containing weight matrix values based on degree distribution data and a zero quadrant, as will be described in greater detail below with respect to FIG. 7A.

At 606, degree constraints are set for the original nodes within the expanded graph data structure. The degree constraint for the original nodes is set to the size of one side of the original weight matrix. In other words, if the original weight matrix is of size n×n, then the original nodes are constrained such the b=n when performing the b-matching on the expanded graph and expanded weight matrix.

Figure 7A:
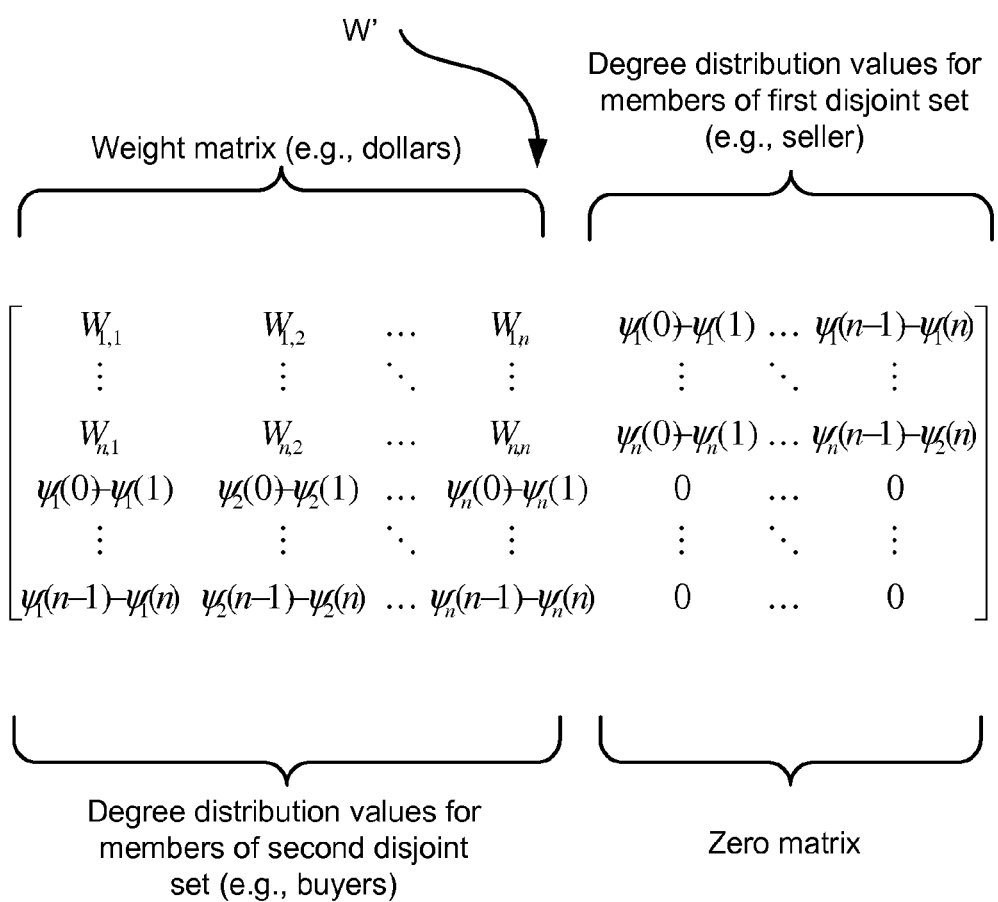
FIG. 7A is a diagram showing expanded weight matrix coefficients generated according to some embodiments of the disclosed subject matter.

FIG. 7A is a diagram showing expanded weight matrix coefficients generated according to some embodiments of the disclosed subject matter. In particular, to solve the degree distribution problem, the weight matrix W that represents the value (or relative value) of each match, is expanded doubling its size to generate an expanded weight matrix W'. The original weight matrix W (which reflects, for example, the negotiated price for a good to be sold by seller i to buyer k) forms the upper left quadrant of the expanded weight matrix W'. The upper right quadrant of the expanded weight matrix W' includes $\psi_i(j)$ delta values such as, starting at the first row: $\psi_1(0)-\psi_1(1), \ldots, \psi_1(n-1)-\psi_1(n)$, and so on until the last row $\psi_n(0)-\psi_n(1), \ldots, \psi_n(n-1)-\psi_n(n)$. The lower left quadrant of the expanded weight matrix W' includes $\phi_i(j)$ delta values such as, starting at the first row: $\phi_1(0)-\phi_1(1), \ldots, \phi_n(0)-\phi_n(1)$, and so on until the last row $\phi_1(n-1)-\phi_1(n), \ldots, \phi_n(n-1)-\phi_n(n)$. The lower right quadrant values can all be set to zero.

The bipartite graph is expanded by adding to the seller and buyer nodes, dummy nodes to double the number of sellers and buyers. Thus, if there are n buyers and n sellers, an additional n buyers and n sellers are appended. These dummy nodes correspond to the appended delta values $\psi_i(j)$, $\phi_i(j)$, or 0, respectively in the expanded weight matrix W'. In cases where the number of sellers differs from the number of buyers, the larger of the two is used as the expanded weight matrix size and the smaller side of the original weight matrix is expanded with small values (e.g., zero or negative maximum value) and dummy nodes are added to the graph data. These complete a square original and expanded weight matrix and original and expanded bipartite graph. The expanded nodes are dummy nodes similar to those used for the expanded weight matrix.

Once the expanded weight matrix W' is created and the dummy nodes are provided, methods described below can be applied to the expanded graph and weight data. In distributed processing, the number of node processors may simply be doubled, for example, to have each processor operate and receive and send messages relating to a respective node. The value of b used for solving the problem may be set to n, namely, the number of buyers and sellers (noting that some of the buyers and sellers may be dummies and not real buyers or sellers). Once the matching problem is solved on the expanded graph using the expanded weight matrix W', as a b-matching problem, (b=n), for example by using the disclosed belief propagation methods and systems, the b-matching solution for the original graph and weight matrix is obtained by extracting the upper left quadrant of a matrix representing the matches on the expanded graph (or by truncating the matrix to remove dummy nodes).

Figure 7B:
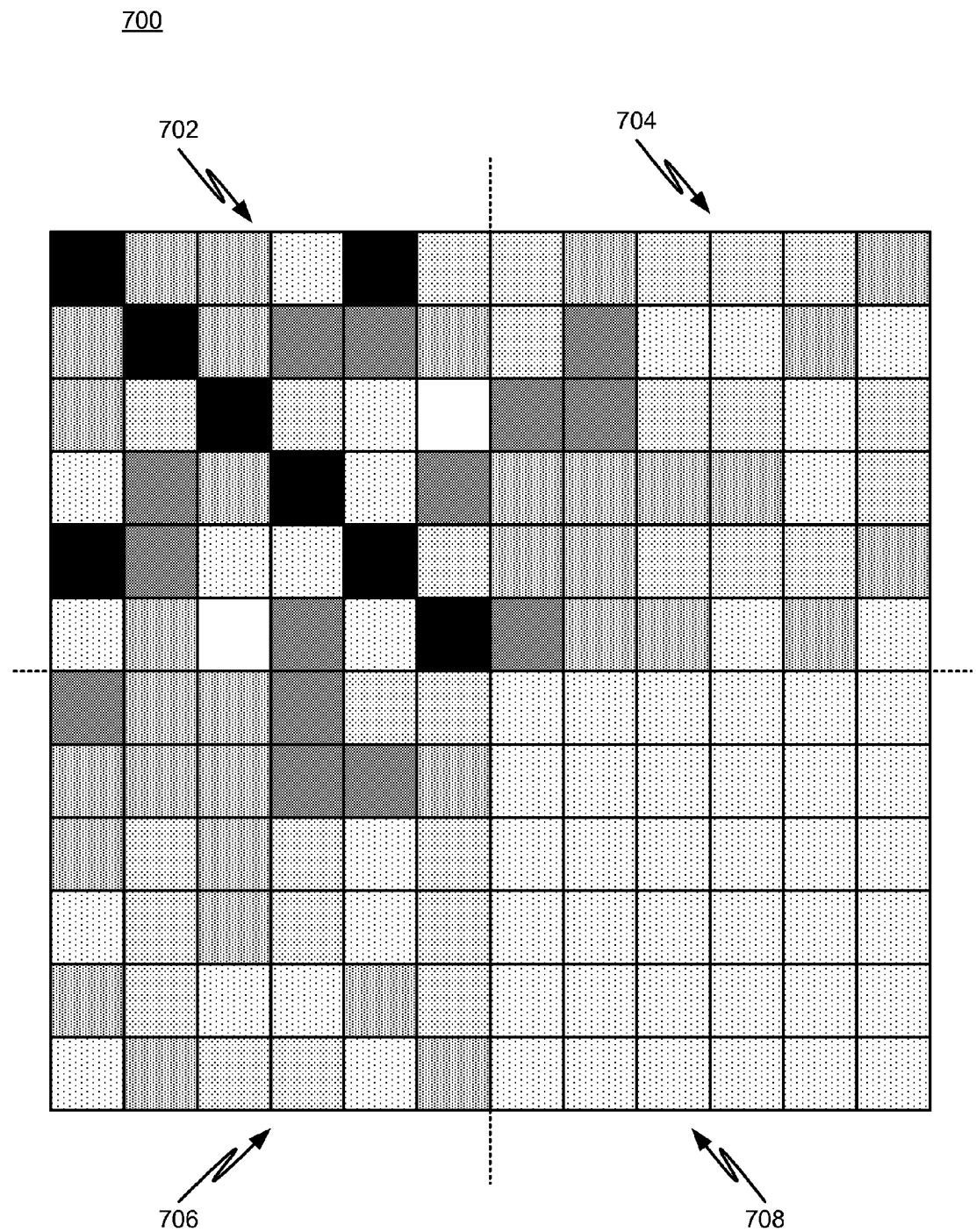
FIG. 7B is a schematic diagram showing an expanded weight matrix generated according to some embodiments of the disclosed subject matter.

FIG. 7B is a graphical illustration of an expanded weight matrix 700 generated according to the coefficient matrix shown in FIG. 7A. The expanded weight matrix 700 includes the original weight matrix 400 shown in FIG. 4 as the upper left quadrant 702. The upper right 704 and lower left 706 quadrants, corresponding to edges between original nodes and dummy nodes, have been determined using coefficients as described above with respect to FIG. 7A. The lower right quadrant 708, corresponding to edges between dummy nodes only, is a zero value quadrant.

Figure 8:
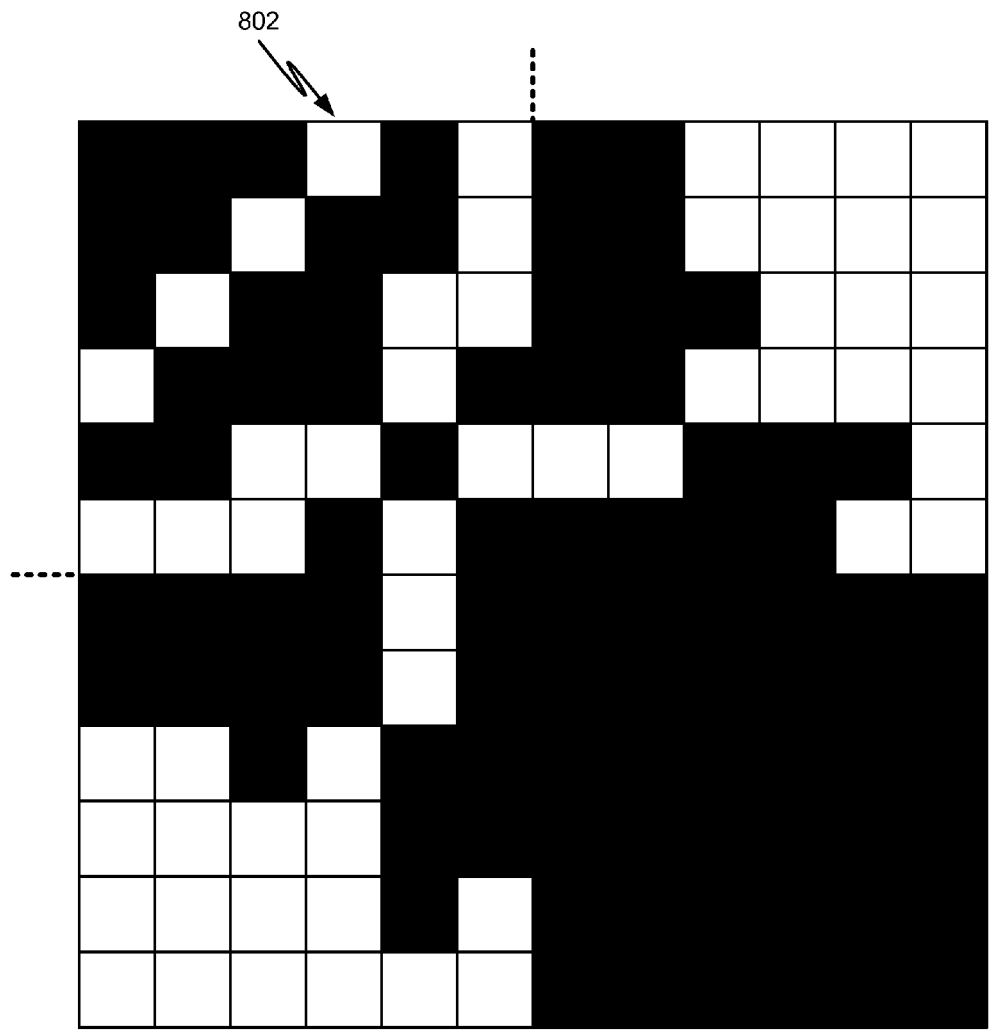
FIG. 8 is a schematic diagram showing an expanded weight matrix after b-matching and conversion to binary values generated according to some embodiments of the disclosed subject matter.
Figure 9:
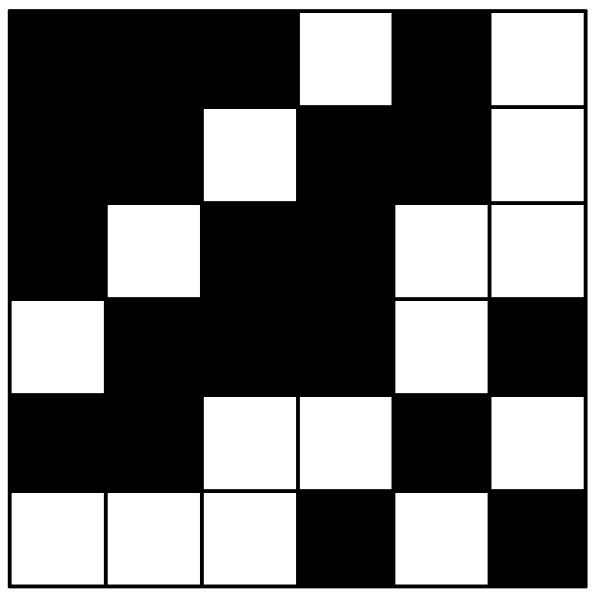
FIG. 9 is a schematic diagram of a matching result obtained by truncating the binary expanded weight matrix shown in FIG. 8, according to some embodiments of the disclosed subject matter.

FIG. 8 is a schematic diagram showing a resulting expanded weight matrix 800 produced by performing a b-matching operation on the expanded graph structure and outputting match values as binary values. In the binary expanded result matrix, white cells indicate a match and black cells indicate no match. Within the expanded result matrix 800, the upper right quadrant 802 is of interest as a solution to the original matching problem with degree distribution and is extracted (or the dummy nodes can be truncated) to generate a final output result of the b-matching. FIG. 9 is a schematic diagram of a matching result obtained by truncating the binary expanded weight matrix shown in FIG. 8, according to some embodiments of the disclosed subject matter.

Figure 10:
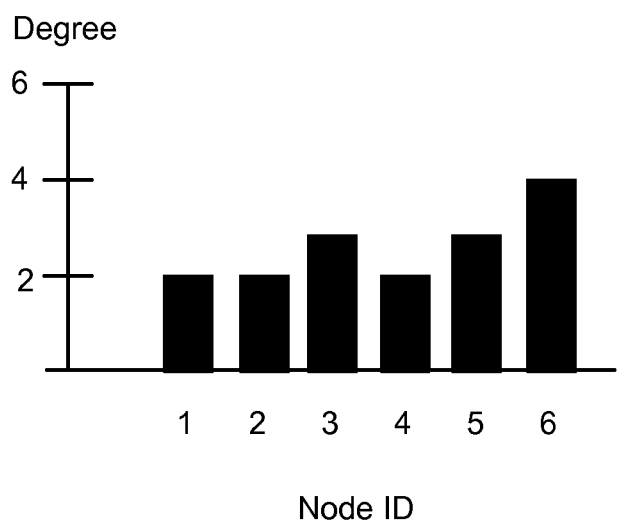
FIG. 10 is a diagram of node degrees of the matching result shown in FIG. 9, according to some embodiments of the disclosed subject matter.

FIG. 10 is a schematic diagram of node degrees of the matching result shown in FIG. 9. For example, Nodes 1, 2 and 4 each has degree 2. Nodes 3 and 5 have degree 3 and Node 6 has degree 4. Comparing the match result degrees with the input degree distribution data shows that the matching using degree distribution provided results consistent with preferred or prior node degrees, with Nodes 3, 5 and 6 having a degree distribution favoring higher degrees and Nodes 1, 2 and 4 having degree distributions favoring lower degrees.

Figure 11:
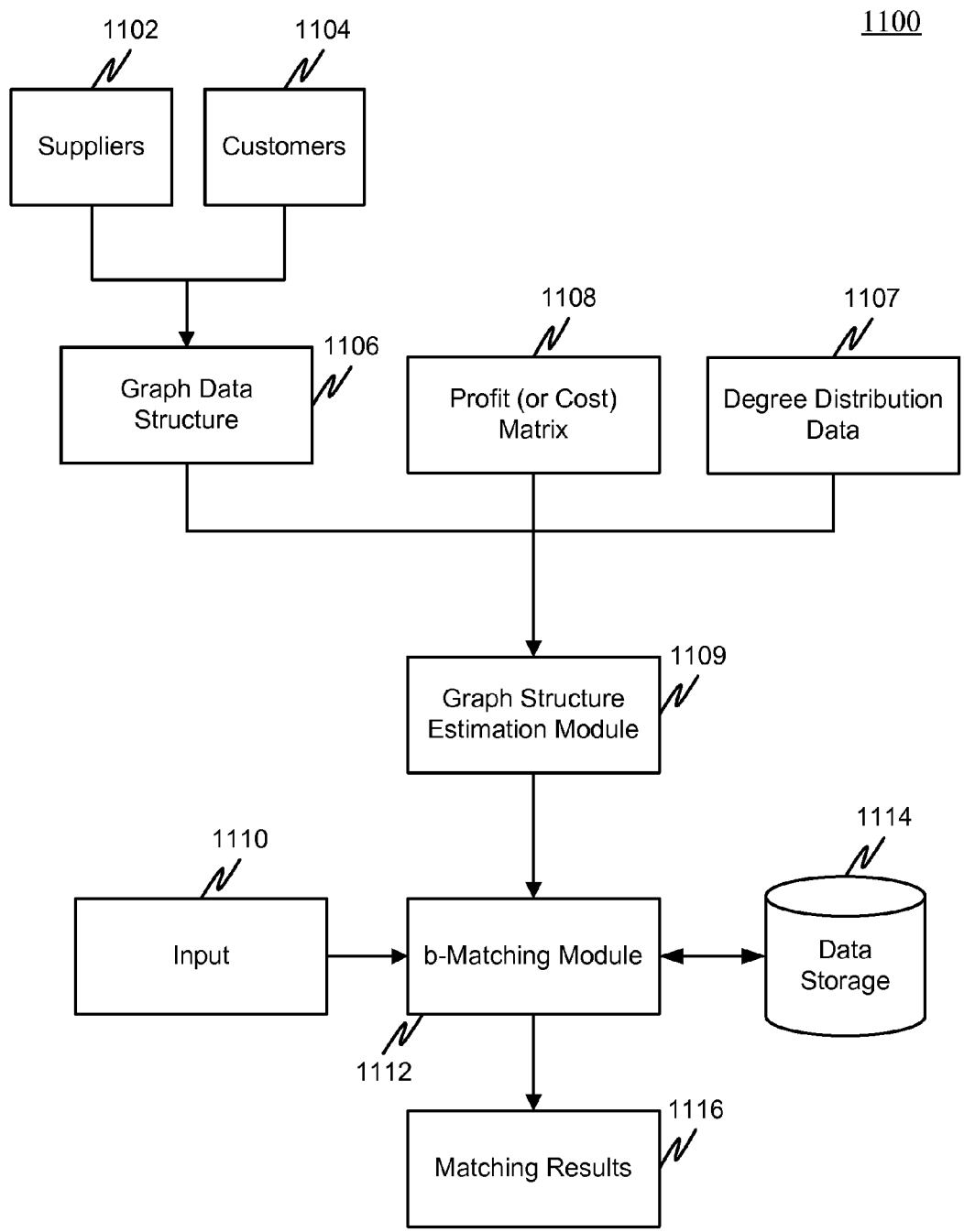
FIG. 11 is a diagram of a system for matching a first class of things to a second class of things using degree distribution information according to some embodiments of the disclosed subject matter.

FIG. 11 is a diagram of a system for matching a first class of things to a second class of things using degree distribution information according to some embodiments of the disclosed subject matter. In particular, a belief propagation matching system 1100 includes a group of suppliers 1102 and a group of customers 1104. Each of the suppliers 1102 and customers 1104 are represented as nodes in a graph data structure 1106. The system 1100 also includes degree distribution data 1107 and a profit (or cost) matrix 1108. The graph data structure 1106 and profit matrix 1108 are provided as input to a graph structure estimation module 1109. Output from the graph structure estimation module is provided as input to a b-matching module 1112. Also provided as input to the b-matching module 1112 is input data 1110. The b-matching module 1112 is coupled to a data storage 1114 and provides matching results 1116 as output.

In operation, the suppliers 1102 and customers 1104 are stored as nodes or vertices of the graph data structure 1106. The degree distribution data 1107 represent distribution over degrees for each node. The profit matrix 1108 stores the edge profits (or weights) for each edge connecting a supplier and customer. The graph data structure 1106, the degree distribution data 1107 and the profit matrix 1108 can each be stored in the data storage 1114 for retrieval by the graph structure estimation module 1109 and the b-matching module 1112.

The graph structure estimation module 1109 obtains the graph data structure 1106, the degree distribution data 1107 and the profit matrix 1108 from the data storage 1114 and generates an expanded graph data structure and weight matrix (or profit) matrix according to the method described above with respect to FIG. 1.

The b-matching module 1112 receives the input 1110, which can be, for example, a node of interest for b-matching. In one example, the b-matching module 1112 uses an expanded graph data structure profit matrix to perform the b-matching using belief propagation according to the method described below with respect to FIGS. 12A-12E. As discussed above, the b-matching may also be performed using max flow methods when the graph data structure is not a bipartite graph. The messages and beliefs are stored in the data storage 1114. Once the termination condition is met, the b-matching module 1112 outputs the matching results 1116. The termination condition can include any of the termination conditions described below with reference to the conditional branch 1212 in FIG. 12A.

The b-matching module 1112 can operate according to software instructions retrieved from a one or more computers readable medium. The software instructions, when executed by the b-matching module 1112, cause the b-matching module 1112 to perform the belief propagation generalized matching methods as described below.

For example, when adapted for an advertisement/keyword matching application, an implementation of software for the b-matching module 1112 can perform belief propagation according to the following pseudo code:

```
Begin Pseudo Code
// define data structures and variables
data structure GraphNode { float received_msgs[ max_num_of_neighbors ]
};
GraphNode ads [num_of_ads];
GraphNode keywords [num_of_keywords];
int Profit_Matrix [num_of_ads] [num_of_keywords];
int b=3;
Boolean Message_Changed = true;
initialize all received_msgs to 1; // to compute messages first time around
initialize Profit_Matrix with bid values;
// start a main loop to continue until no messages are changed
while ( Message_Changed == true ) {
  Message_Changed = false; // switch off loop unless a message changes
  // send messages from ads to keywords
  for i=1 to num_of_ads {
    for j=1 to num_of_keywords {
      sorted_msgs[ ] =
        sorted list of ads[i].received_msgs[ ] *
        corresponding exp(Profit_Matrix[ ][ ]) values
        excluding that from keyword node j;
      L = original index of sorted_msgs[b]; // get index (or
        node) of the bth received msg*profit;
      old_rcvd_msg = keywords[j].received_msgs[i];
      keywords[j].received_msgs[i] =
        exp(Profit_Matrix[i][j]) / (exp(Profit_Matrix[i][L]) *
        ads[i].received_msgs[L]);
      if old_rcvd_msg not equal to keywords[j].received_msgs[i]
        then Message_Changed = true;
    } end j loop
  } end i loop
  // send messages from keywords to ads
  for j=1 to num_of_keywords {
    for i=1 to num_of_ads {
      sorted_msgs[ ] = sorted list of keywords[j].received_msgs[] *
        corresponding exp(Profit_Matrix[ ][ ]) values
        excluding that from ad node i;
      L = original index of sorted_msgs[b]; // get index (or
        node) of the bth received msg*profit;
      old_rcvd_msg = ads[i].received_msgs[j];
      ads[i].received_msgs[j] =
        exp(Profit_Matrix[i][j]) / (exp(Profit_Matrix[L][j]) *
        keywords[j].received_msgs[L]);
      if old_rcvd_msg not equal to ads[i].received_msgs[j]
        then Message_Changed = true;
    } end i loop
  } end j loop
```

-continued

```
} end while loop - we are now done - no messages are changing
// now get the belief values for a keyword node of interest
for i=1 to num_of_ads {
    belief_values[i] = keywords[keyword_of_interest].received_msgs[i] *
Profit_Matrix[i][keyword_of_interest];
} end i loop
sort belief_values[ ];
output largest b belief_values[ ];
End Pseudo Code
```

The above pseudo code represents an example of a linear implementation of the belief propagation method described below. Several simplifications have been made for purposes of illustration including assuming that each node exchanges messages with all nodes of the corresponding type. In an actual implementation, nodes may only exchange messages with their respective neighbor nodes. Also, the pseudo code example continues until no messages are changed. As described above, there are other termination conditions that can be used with the belief propagation method. As mentioned above, the b value for the original graph nodes is constant set to the size of one of the groups of the original graph structure (e.g., n) for all. The dummy nodes remain unconstrained with regard to degree during the b-matching process.

The b-matching module 1112 can be a general-purpose computer adapted for generalized matching using belief propagation, a special-purpose one or more computers for generalized matching using belief propagation, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like.

The data storage 1114 can be a database such as a relational database or any other suitable arrangement of data. The data can be stored in a physical computer readable media such as a volatile or nonvolatile electronic memory, a magnetic storage device, and/or an optical storage device, or any known or later developed computer readable media.

Figure 12A:
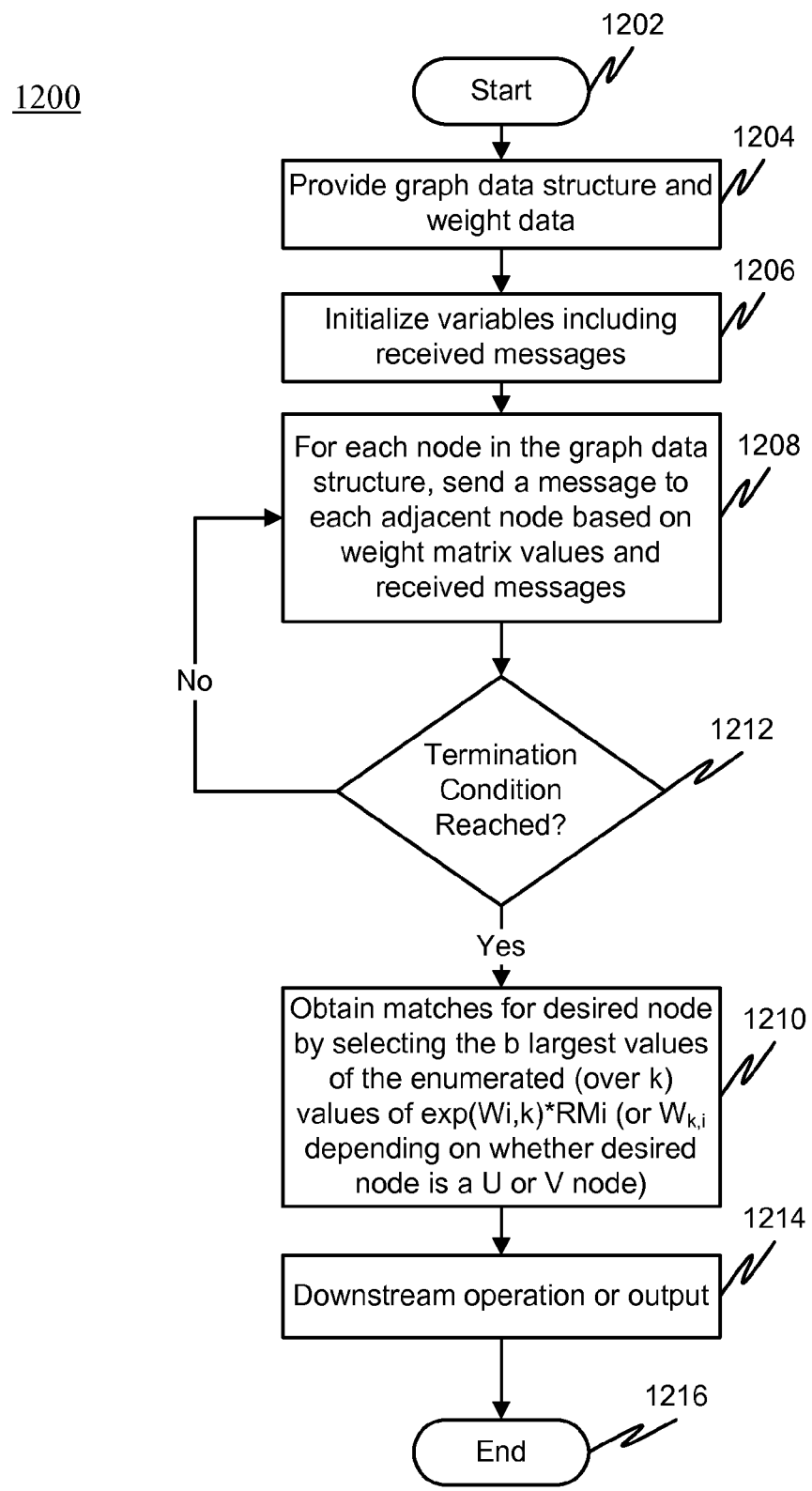
FIG. 12A is a chart of a method for matching a first class of things to a second class of things based upon belief propagation according to some embodiments of the disclosed subject matter.
Figure 12B:
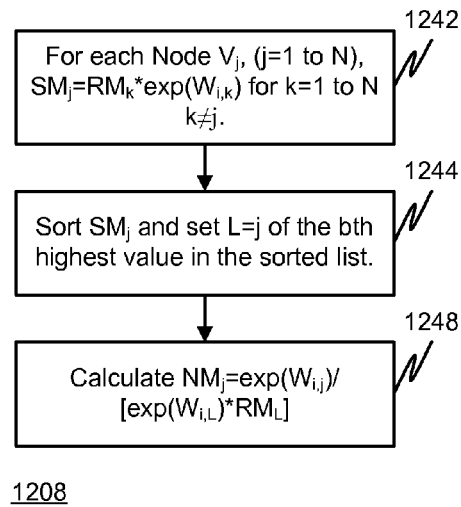
FIG. 12B illustrates an embodiment of operations within 1208 of FIG. 12A.
Figure 12C:
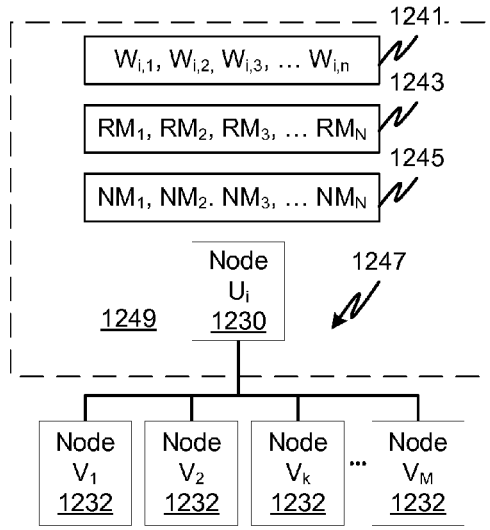
FIG. 12C shows operations a node in the second set V of the bipartite graph.

Referring now to FIG. 12A through 12E, after providing the graph data structure and the edge weight data (e.g., weight matrix or vectors to all the node processors) as indicated by the operation 1204 of chart 1200, variables are initialized as indicated by the operation 1206. The latter operation may include initializing values of data storage elements that store the values of the most recent messages received by the node. An iterative process is performed at 1208 by each node processor 1230, 1250 (See node processors in FIGS. 12C and 12E) to generate messages and to process received messages until a termination condition 1212 is met. Referring to FIGS. 12B and 12C, the multiple customer node processors 1230 contain various updateable data stores 1241, 1243, 1245 which hold a weight vector 1241, a received message vector 1243, and a new message vector 1245. Each node processor 1230 also may store data indicating the potential supplier nodes to which the node corresponding to the node processor 1232 to may be potentially matched. This additional data may be inherent in the data stored at 1241, 1243, and 1245 depending on the data structure employed since the weight matrices, received message values, and new message values are each respective of one of these attached node processors 1232. Also, multiple supplier node processors 1250 contain various updateable data stores 1261, 1263, 1265 which hold a weight vector 1261, a received message vector 1263, and a new message vector 1265. Each node processor 1250 also may store data indicating the potential nodes to which the node corresponding to the node processor 1252 to which it may be potentially optimally matched but this data may be inherent in the other data as discussed above.

The node processor 1230 receives messages from, and transmits messages to, node processors 1232 to which it is connected, each of which corresponds to another node in the respective disjoint set. In this example, each node processor 1230 and 1232 corresponds to a node of a bipartite graph which has two disjoint sets U and V. The node processors 1232 each have the features of node processor 1230. The function of each node processor 1230 may be to derive messages from the data in the data stores 1241, 1243, 1245 and transmit such messages and to receive messages and update the data in the data stores 1241, 1243, 1245. This is done iteratively, in the subprocess 1208, as shown in process 1200 of in FIG. 2A.

Figure 12D:
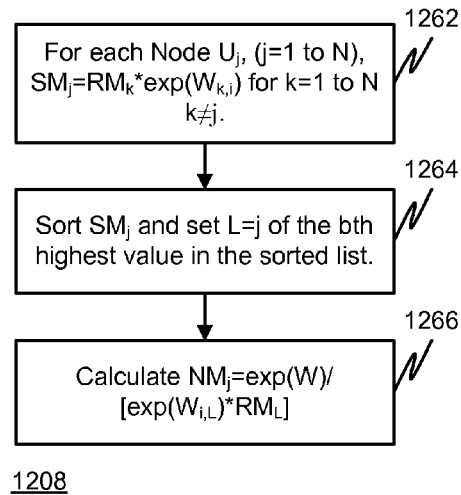
FIG. 12D illustrates an embodiment of operations within 1208 of FIG. 12A.
Figure 12E:
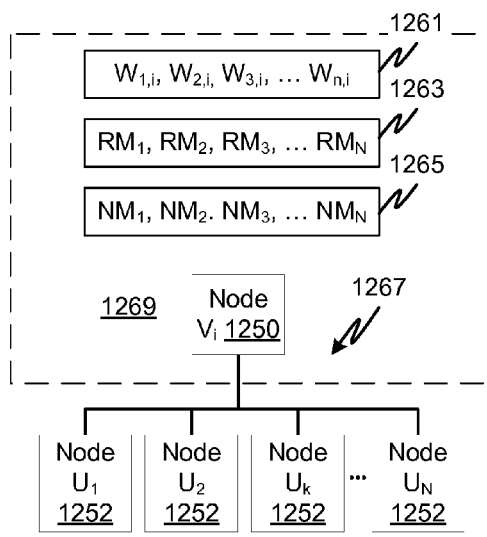
FIG. 12E shows operations a node in the second set U of the bipartite graph.

FIG. 12B illustrates an embodiment of operations within 1208 of FIG. 12A. FIG. 12C shows operations a node in the second set V of the bipartite graph. FIG. 12D illustrates an embodiment of operations within 1208 of FIG. 12A. FIG. 12E shows operations a node in the second set U of the bipartite graph. The operations are the same, but the operand indices are different in order to account for the set to which the node belongs.

However illustrated in FIG. 12A, the operations of FIG. 12B may be done by separate processors respective of one or more nodes in the single bipartite graph, by processors corresponding to subsets of nodes or by a single processor. Thus, the iteration illustrated as a single process at 1208 may be performed by separate processors in an independent fashion based on messages shared between them.

Referring in particular to FIG. 12B, at 1242, the node processor 1230 performs calculations corresponding to node $U_i$. At 1242, intermediate values $SM_j$ are calculated for each node $V_j$ to which node $U_i$ may be matched using messages received from the $V_j$ node processors. These intermediate values are simply $SM_j = RM_k * \exp(W_{i,k})$ for k=1 to N with k≠j. ("exp" denotes exponentiation based on the natural logarithm and * represents multiplication) That is, the contribution of the term for the message $RM_k$ where k=j is skipped over. At 1244, the list of intermediate values $SM_j$ are sorted and the term corresponding to the supplier having the bth highest value is identified. The suppliers are indicated by the index j, so a value L is set to this index. At 1248, new messages $NM_j$ are calculated to be sent to each supplier node processor 1232 according to: $NM_j = \exp(W_{i,j})/[\exp(W_{i,L}) * RM_L]$.

Referring in particular to FIG. 12D, at 1262, the node processor 1250 performs calculations corresponding to node $V_i$. At 1262, intermediate values $SM_j$ are calculated for each node $U_i$ to which node $V_i$ may be matched using messages received from the $U_j$ node processors. These intermediate values are simply $SM_j = RMk * \exp(W_{k,i})$ for k=1 to N with k≠j. ("exp" denotes exponentiation based on the natural logarithm and * represents multiplication) That is, the contribution of the term for the message $RM_k$ where k=j is skipped over. At 1264, the list of intermediate values $SM_j$ are sorted and the term corresponding to the customer having the bth highest value is identified. The customers are indicated by the index j, so a value L is set to this index. At 1268, new messages $NM_j$ are calculated to be sent to each customer node processor 1252 according to:

$$NM_j = \exp(W_{j,i})/[\exp(W_{i,L}) * RM_L].$$

Referring back to FIG. 12A, the new messages are passed between all the node processors 1232 and 1252 until a termination condition 1212 is reached. Operation proceeds based on whether the termination condition has been reached, as indicated at 1212. The termination condition may be expiration of a watchdog timer, a number of messages received by each processors. Another alternative, and one that provides an optimum solution, is for each node processor to terminate when the messages stop changing. That is, the more recent message is compared to the previous message and if they are the same, the processor stops processing for sending node or when all messages are the same as corresponding prior messages processing for all nodes can be halted. The operation 1212 may also include updating the data stores 1243 or 1263.

As mentioned, the termination condition can be defined as reaching a steady state with respect to message updating, that is, the changes in messages stops. Alternatively, the steady state can be defined as no further message updates being sent if the sending processor makes the determination that the updates are not changing, or when a number of update message being sent or received is below a certain threshold. Alternatively, the termination condition can be defined in terms of a number of iterations of message updating or a number of messages sent (either an aggregate number or a number per node). In another alternative, the termination condition can be defined as the elapsing of a predetermined period of time. If the termination condition has been reached, processing continues with the selection, for an input node, of a predetermined number of supplier nodes or a predetermined number of customer nodes, as indicated at 1214. Otherwise processing returns to the operation indicated at 1208 and discussed above.

At 1210, each node can calculate a vector showing the optimal matches. This can be done by U nodes by enumerating the values of $\exp(W_{i,k})*RM_i$ over k and selecting the b largest values. This can be done by V nodes by enumerating the values of $\exp(W_{k,i})*RM_i$ over k and selecting the b largest values. Note that the RM values are respective of the U of V node for which the calculation is done.

The Appendices give an explanation of the operations 1208 and 1210 and some further detail and analysis.

Note that the graph data structure can be any type of data structure suitable for use with generalized matching using belief propagation, such as a bipartite graph data structure. The graph data structure can contain one or more nodes of the same group (unipartite case) or different groups (bipartite case). For example, the graph data structure can include supplier nodes and customer nodes, where each supplier node can be connected to one or more customer nodes, and vice versa. In respective embodiments, the graph node data structure elements correspond to physical entities such as suppliers, customers, goods and/or services. In addition, in embodiments, the nodes correspond to other entities as described below with respect to other embodiments.

The weight data such as represented by the weight matrix discussed above may represent a profit value for each edge between two nodes of the graph data structure. The weight matrix could also be a cost matrix representing a cost associated with a respective matching with suitable values for the terms to suit the computations methods. In the case of a profit matrix, the matching process typically includes a function to enhance and/or maximize profit. And in the case of a cost matrix, the matching process typically includes a function to reduce and/or minimize cost. The values in the profit matrix can be negative, zero, positive or a combination of these values.

An exemplary weight matrix may be represented by a data structure having a record corresponding to each node. The record for each node can include a list of adjacent nodes and a profit value for each of the adjacent nodes. The term "adjacent" refers to the nodes to which a given node may be connected in the same (unipartite case) or a disjoint set (bipartite case). The items of data in the profit matrix can represent physical entities or values such as actual supplier capacity, actual customer demand, monetary amounts of bidding or asking prices, monetary amounts of profit, distances, monetary costs, and/or the like. A portion of the profit matrix can be selected and provided to a respective node processor. The selected portion can represent only the profit matrix record corresponding to each respective node processor. By providing only a portion of the profit matrix to each node processor, data storage and transfer requirements can be reduced.

In operation 1208, electronic messages are passed between adjacent nodes, which may be networked or communicate by a bus or any other data communication system. The node processor can be a computer, a single processor on a device with multiple processors, or any suitable machine capable of making the described computations and sending and receiving the described data. As described above, value (or data content) of each message is determined according to a compressed message update rule. Received messages may be stored by the processor in an electronic memory, such as, for example, RAM, non-volatile storage, a database or any suitable data store. The operation 1210 can be performed using the respective node processors. Downstream processing 1214 may include a process that corresponds to the particular application. For example, if the bipartite graph may describe an application in which search queries or other key words terms appearing on web pages are assigned to bidders, as described in U.S. patent application Ser. No. 11/285,126 (Published as U.S. 2007/0118432) to Vazirani et. Al. and filed Nov. 21, 2005, which is hereby incorporated by reference in its entirety. In that case, a first set of nodes would be the bidders and a second set of nodes would be the sellers and the downstream operation would include placing the advertisements corresponding to the bidders to corresponding locations on one or more web pages, for example, alongside search results or on other web pages.

The nodes selected at 1214 are matched based on updated belief values. For example, in a b-matching problem, the b nodes having the highest belief values with respect to an input node are selected. Ties can be handled in a number of ways including by using a "coin toss" to select between tying nodes, or, alternatively or in addition, a small random value can be added to the weight or profit matrix value for each edge so that no two nodes are likely to tie. The selected nodes can be provided as output to another process or system. Processing then terminates at 1216.

It will be appreciated that the 1202-1216 procedure may be repeated in whole or in part in order to accomplish a contemplated belief propagation b-matching function. For example, the belief values may be updated for the entire graph data structure and then matching results may be provided for a plurality of nodes on interest before the belief values of the graph are updated. Alternatively, because the matching may result in changes to one or more nodes in the graph as a result of being selected as matching nodes (e.g., a supplier's amount of available goods may be reduced or a customer's requirement for goods may have been met), the belief values may need to be recomputed each time a matching is performed for a node.

Figure 13:
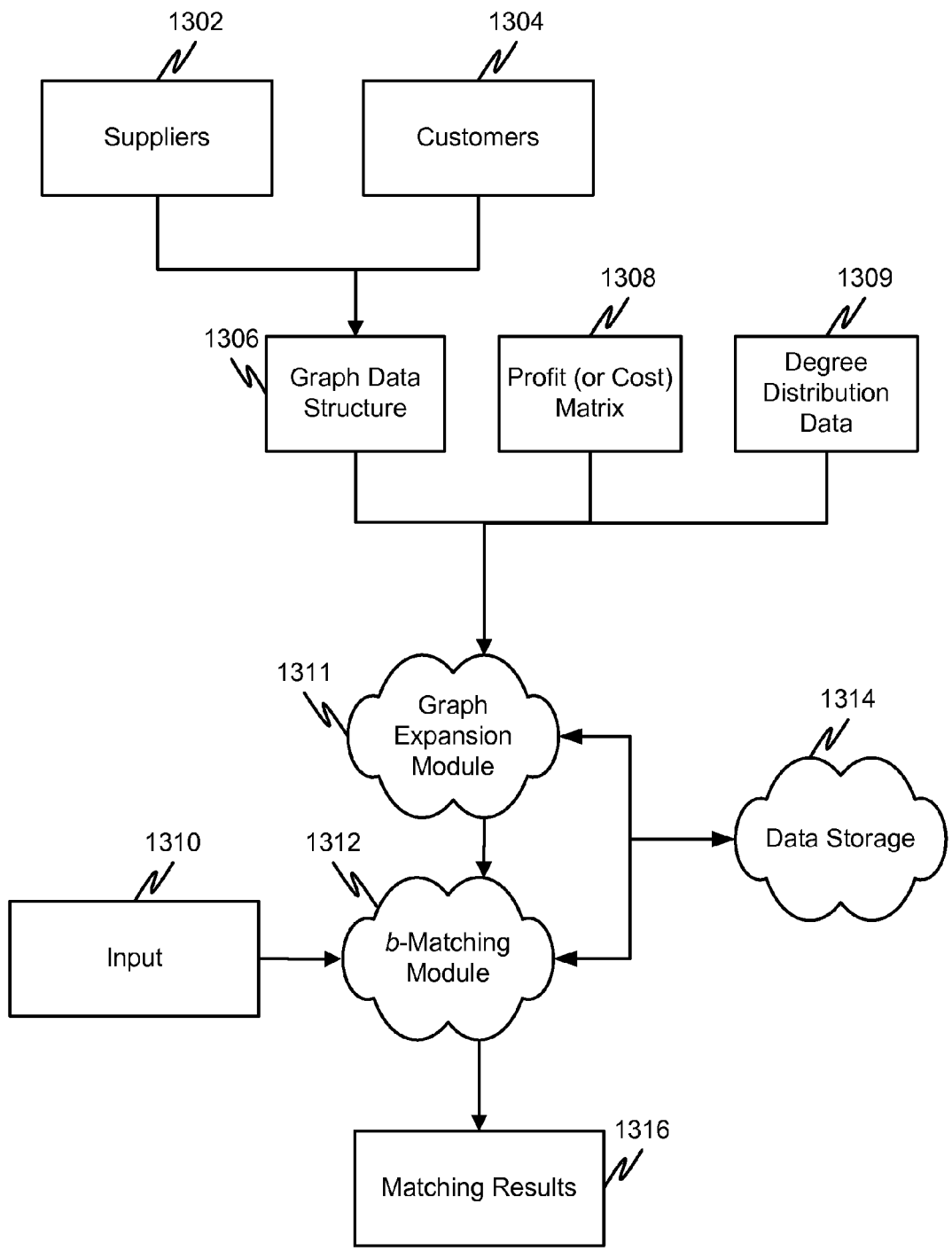
FIG. 13 is a block diagram of a system for matching using degree distribution including parallel processors according to some embodiments of the disclosed subject matter.

FIG. 13 is a block diagram of a system for matching using degree distribution including parallel processors according to some embodiments of the disclosed subject matter. In particular, a belief propagation matching system 1300 includes a group of suppliers 1302 and a group of customers 1304. Each of the suppliers 1302 and customers 404 are represented as nodes arranged and stored in a graph data structure 1306. The system 1300 also includes a profit (or cost) matrix 1308 and degree distribution data 1309. The graph data structure 1306, profit matrix 1308 and degree distribution data 1309 are provided as input to a graph expansion module 1311. An expanded graph and profit matrix produce by the graph expansion module is provided as input to a b-matching module 1312. Also provided as input to the belief propagation matching system 1312 is input data 1310. The belief propagation matching system 1312 is coupled to a data storage 1314 and provides matching results 1316 as output.

In operation, the suppliers 1302 and customers 1304 are stored as nodes or vertices of the graph data structure 1306. The profit matrix 1308 stores the edge profits (or weights) for each edge connecting a supplier and customer. The degree distribution data 1309 represents preferred or prior node degree distributions. The graph data structure 1306, the profit matrix 1308 and the degree distribution data 1309 can each be stored in the data storage 1314.

The graph expansion module 1311 generates an expanded graph data structure including the original graph data structure and additional dummy nodes. The graph expansion module 1311 also generates an expanded profit matrix including the original profit matrix as one quadrant, two quadrants based on the degree distribution data 1309 and a zero quadrant, according to the method described above.

The belief propagation matching system 1312 receives the expanded graph and profit matrix produced by the graph expansion module 1311 and also receives the input data 1310, which can be, for example, a node of interest for b-matching. The belief propagation matching processor 1312 uses the expanded graph data structure and the expanded profit matrix to perform a distributed form of belief propagation for b-matching as described above. The messages and beliefs are updated using distributive (or parallel) processing and stored in the data storage 1314. Once the termination condition is met, the belief propagation matching system 1312 makes the matching results 1316 available as output. The termination condition can include any of the termination conditions described above with reference to the conditional branch 1212 of FIG. 12A.

The belief propagation matching system 1312 can be a distributed or parallel processing system. For example, the belief propagation matching system 1312 can be implemented as a cloud computing system. Cloud computing is a computing system in which computing resources are provided as a service over a network such as the Internet to users who do not need direct control over the technology infrastructure ("in the cloud") that supports their computation requirements. Cloud computing also provides providing scalable virtual private servers. Examples of commercially available cloud computing offerings include Google App Engine provided by Google.com and Amazon.com's Elastic Compute Cloud (EC2). The data storage 1314 can be an Internet-based scalable storage infrastructure such as Amazon.com's Simple Storage Service (S3) or any other data storage system suitable for use with the belief propagation matching system 1312.

The belief propagation matching system 1312 can also be implemented according to any other suitable distributed or parallel processing architecture, including hardware and software systems containing more than one processing element or storage element, concurrent processes, multiple programs, and/or the like.

The systems and methods described above and below, herein, can be applied to matching nodes in a system represented by a unipartite graph data structure such as a social network. The systems and methods can be used to provide matching results such as social network referrals, connecting websites to other websites, routing messages on a network such as the Internet, and chip layout. In unipartite matching problems all nodes are of the same type or class (e.g., social network members) rather than disjoint sets and they can be matched with other nodes based on a value matrix having a weight or value for each edge of the unipartite graph data structure. For example, in the case of FIG. 3A, a unipartite version would have "u" nodes (302) that are the same as the "v" nodes (304).

Figure 14:
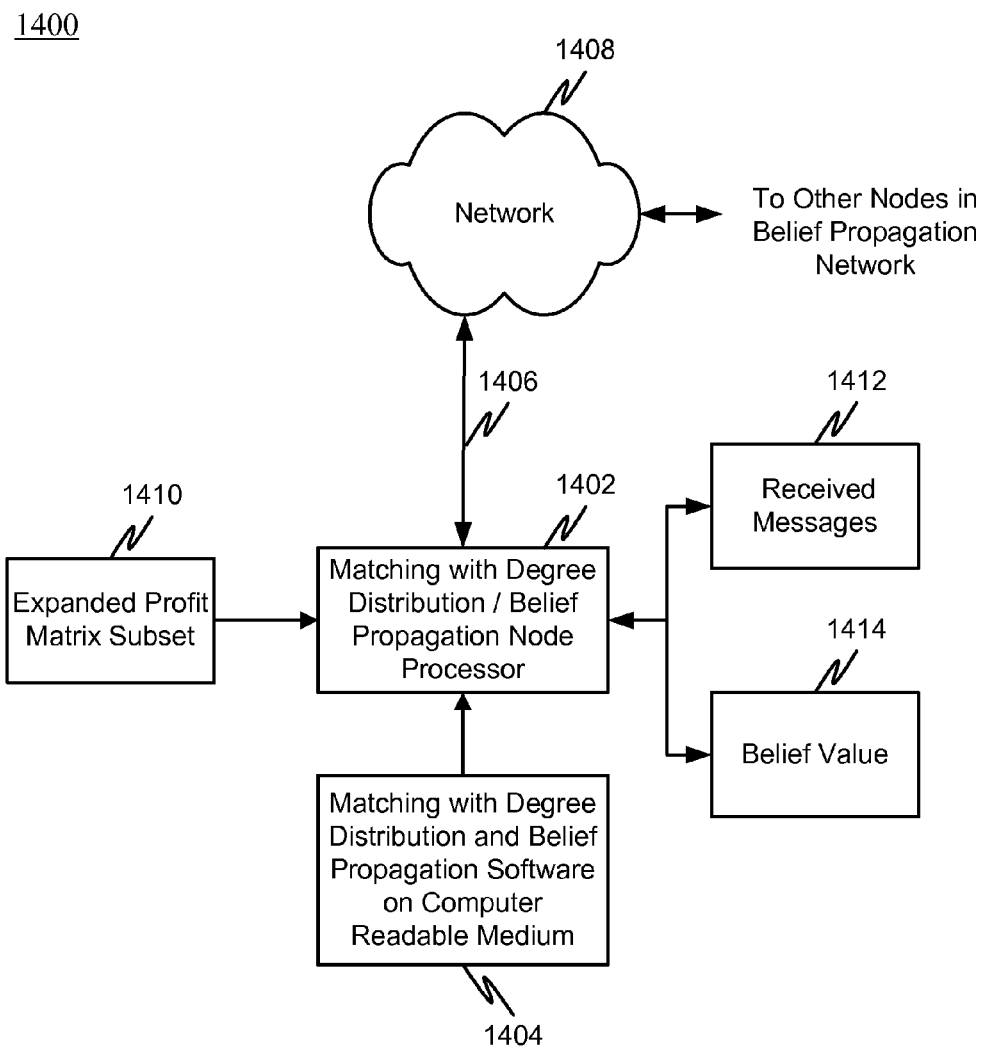
FIG. 14 is a diagram of a node processing system for matching using degree distribution and belief propagation according to some embodiments of the disclosed subject matter.

FIG. 14 is a diagram of a node processing system for matching using degree distribution and belief propagation according to some embodiments of the disclosed subject matter. In particular, the node processing system 1400 includes a belief propagation node processor 1402 that is adapted to access belief propagation software on a one or more computers readable medium 1404. The belief propagation node processor 1402 is coupled via link 1406 to a network 1408. The belief propagation node processor 1402 is also coupled to an electronic data storage that has stored therein an expanded profit matrix subset 1410, received messages 1412 and belief values 1414.

In operation, the belief propagation node processor 1402 loads the matching using degree distribution and belief propagation software 1404 from the computer readable medium and executes the software. Once executing, the software directs the belief propagation node processor 1402 to perform matching using degree distribution and belief propagation according to the method described above. The belief propagation node processor 1402 accesses the expanded profit matrix subset 1410 and computes an updated message value for each connected (or neighbor or adjacent) node and sends the respective updated message to each connected node. The belief propagation node processor 1402 also receives updated messages from the connected nodes. The received messages are stored in the received messages area 1412 of data storage. The received messages 1412 are used in connection with the profit matrix subset 1410 to update belief values 1414 for each of the connected nodes. The profit matrix subset 1410 is the portion of the profit matrix that includes data regarding nodes connected to the node represented by the belief propagation node processor 1402.

Once a termination condition has been reached, the belief propagation node processor 1402 can sort the belief values 1414 and the b connected nodes with the largest belief values can be selected as the b-matching solution for the node corresponding to the belief propagation node processor 1402. It will be appreciated that the selection of the largest belief values is applicable to an example in which a profit matrix is used and it is desirable to enhance and/or maximize profit and that other sorting and selection techniques may be used in a particular embodiment, for example in an embodiment employing a cost matrix, a cost matrix may be converted into a profit matrix by subtracting the cost matrix from an appropriately large constant matrix.

The belief propagation software on a one or more computers readable medium 1404, when executed, can cause the belief propagation node processor 1402 to operate according to the following pseudo code:

---

Begin Pseudo Code
// define data structures and variables
float Received_Msgs [num_of_neighbors];
graph node address Neighbor_Nodes [num_of_neighbors];
int Profit_Matrix [num_of_neighbors];

```
int b=3;
Boolean Message_Changed = true;
initialize all Received_Msgs to 1; // to compute messages first time around
initialize Profit_Matrix with bid values of neighbors;
// start a main loop to continue until no messages are changed
while ( Message_Changed == true ) {
    Message_Changed = false; // switch off loop unless a message changes
    Receive Messages from neighbors;
    Compare new Received Messages with corresponding stored
        Received Messages to look for changed messages;
    If Any Changed Messages Received {
        Store Received Messages in Received_Msgs[ ];
        Message_Changed = true;
        for j=1 to num_of_neighbors {
            Sorted_Msgs[ ] = sorted list of Received_Msgs[ ] *
                corresponding Profit_Matrix[ ] values excluding j;
            L = original index of Sorted_Msgs[b]; // get index (or
                node) of the bth received msg*profit;
            Message =
                exp(Profit_Matrix[j]) / (exp(Profit_Matrix[L]) *
                received_msgs[L]);
            Send Message to Neighbor_Node[j];
        } end j loop
    } end if changed message changed
} end while loop - we are now done - no messages are changing
// now get the belief values for this node
for j=1 to num_of_neighbors {
    belief_values[j] = received_msgs[j] *
        Pofit_Matrix[j];
} end j loop
sort belief_values[ ];
output largest b belief_values[ ];
End Pseudo Code
```

The above pseudo code example makes several assumptions in order to simplify the pseudo code for illustration purposes. For example, the b value is a constant value. Also, the code is assumed to be used on a processor that is computing the belief propagation for a single node of the graph, so that the indexing can be simplified for illustration.

Generalized matching or auction problems find the best assignment of goods to consumers or advertisers to consumers when given a matrix of weights or value for each possible assignment. Generalized bipartite matching is 100% solvable by linear programming, but that approach is too slow for practical applications.

The disclosed subject matter approach may employ belief propagation which gives highly improved solutions, which can be 100% optimal, but does so efficiently and can scale up to problems involving millions of users and advertisers. Other applications include network reconstruction, image matching, resource allocation, online dating, sensor networks, and others.

Online content providers can use the disclosed technology to better match advertising after a user enters a search term. Typically, online content providers show the top advertisers that bid the highest amount for a particular search term. Typically, this is done by solving a generalized matching problem. For example, assume there are 500 users and 100 advertisers. Assume each advertiser wants to show 15 ads and each user can see 3 ads. Since each advertiser bids different dollar amounts for showing their ads, the online content provider has to find the matching of ads to users that earns them the most money. When dealing with millions of users and advertisers, however, the exact solution to this problem using other techniques may be too slow and unable be distributed onto multiple machines for efficient computation. Many online content providers therefore resort to an approximate solution that was developed which gives suboptimal answers (not the most profitable) but can be solved efficiently and online. The disclosed technology permits the solution of large scale generalized matching using a distributed algorithm (belief propagation) which gives an exact answer. This may increase profit, potentially by up to 50%. It remains efficient enough to handle the scale of users/advertisers many online content providers deal with.

Figure 15:
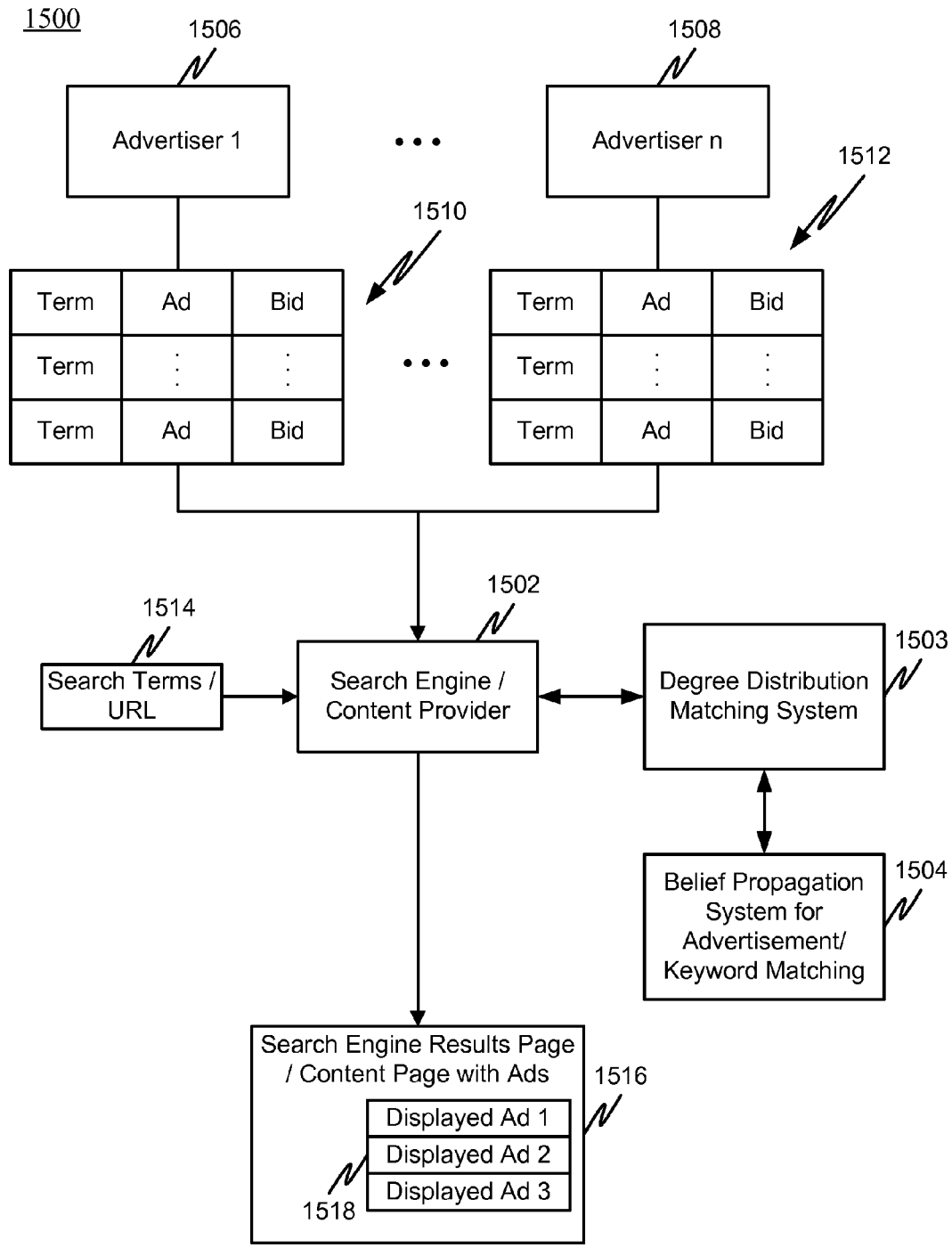
FIG. 15 is a block diagram of a system for matching advertisers with search terms using degree distribution information and belief propagation according to some embodiments of the disclosed subject matter.

FIG. 15 is a block diagram of a system for matching advertisers with search terms using degree distribution information and belief propagation according to some embodiments of the disclosed subject matter. In particular, the system 1500 includes a search engine/content provider 1502 that is coupled to a degree distribution matching system 1503 and a belief propagation system for advertisement/keyword (search term) matching 1504. The search engine/content provider 1502 is also coupled to an electronic data storage having stored therein data representing a plurality of advertisers (1506-1508) each having a respective set of search terms (or keywords), advertisement associated with each keyword, and a bid for placing each advertisement (1510-1512). The search engine/content provider 1502 receives search terms, keywords and/or uniform resource locators (URLs) 1514 from one or more users. In response to the received input 1514, the search engine/content provider 1502 performs search term/advertiser matching using the degree distribution matching system 1503 and the belief propagation system for advertisement/keyword (or search term) matching 1504 to match a number of advertisements (three in this example) to the search term input, as described below with respect to FIG. 16. The b-matching advertisements (e.g., 3) are then displayed on a search engine results page (or content page of a partner website) 1516 as displayed advertisements 1518.

In this example, the nodes of the graph data structure include the advertisers/advertisements and the keywords (or search terms). The profit matrix includes the bid prices for each ad by each advertiser. The bid prices may be used as raw values or may be manipulated in order to arrive at a profit for the bid. The b value represents the maximum number of advertisements to be displayed on a results or content page (e.g., 3). However, each advertiser/advertisement node may also be subject to other constraints on its belief value such as a quota of advertisements to be displayed during a given period of time or a quota on an amount of money to be spent during a given period of time. These constraints may affect whether or not an advertiser/advertisement is selected as matching for a keyword, even if the bid for that advertiser/advertisement is high enough that it would normally be selected.

Advertisers may seek to manipulate or "game" the advertising bid system. The belief propagation methods and systems described above can be modified to provide enhanced protection against bid or ad system manipulation. For example, one bid manipulation scheme includes attempting to deplete a competitor's ad budget by placing a bid just less than the winning bid, this causes the price actually paid by the winning bidder to be artificially high and thus depletes the competitor's budget faster than would normally occur. After the competitor's budget is depleted, their bid is no longer the highest and the ad can be placed at a lower cost by the manipulator. One technique for combating this type of manipulation is to augment the b-matching algorithm with a module that can select a winner other than the first place or b-highest matches. By selecting an ad to be placed other than the normal matching ads, the manipulator's ad can be chosen, thus depleting the manipulator's budget as well. This discourages advertisers from placing artificially high bids in an attempt to deplete a competitor's budget. It will be appreciated that other now known or later developed ad auction manipulation prevention measures can be used with the disclosed subject matter.

The system for matching advertisements with search terms or keywords 1500 can comprise a second system (not shown) in addition to the belief propagation matching system for advertisement keyword matching (1504). The second system can be a bid web server, which also would typically comprise one or more computer storage mediums, one or more processing systems and one or more databases. Conventional web browsers, running on client computers can be used to access information available through the bid web server and permit advertisers to place bids for desired keywords that will be queried through the search engine or content provider. The bid web server can be accessed through a firewall, not shown, which protects account information and other information from external tampering. Additional security measures such as Secure HTTP or the Secure Sockets Layer may be provided to enhance the security of standard communications protocols.

In some of the above embodiments relating to the assignment of web advertisements according to bids, various factors can be used to modify the weight value of the weight matrix used to represent the matching problem. These can include: conversion rate; goal success rate; click through rate; how many times a user selects a given ad in a given session; a duration of time, from an ad result selection, until the user issues another search query, which may include time spent on other pages (reached via a search result click or ad click) subsequent to a given ad click; a ratio of the time, from a given ad result selection until a user issues another search query, as compared to all other times from ad result selections until the user issued another search query; time spent, given an ad result selection, on viewing other results for the search query, but not on the given ad result; how many searches (i.e., a unique issued search query) that occur in a given session prior to a given search result or ad selection; how many searches that occur in a given session after a given search result or ad selection; rather than searches, how many result page views that occur for a given search query before a given selection, this can be computed within the query (i.e., just for a unique query), or for the entire session; and rather than searches, how many search result page views that occur for a given search query after this selection, this can be computed within the query (i.e., just for the unique query), or for the entire session.

Figure 16:
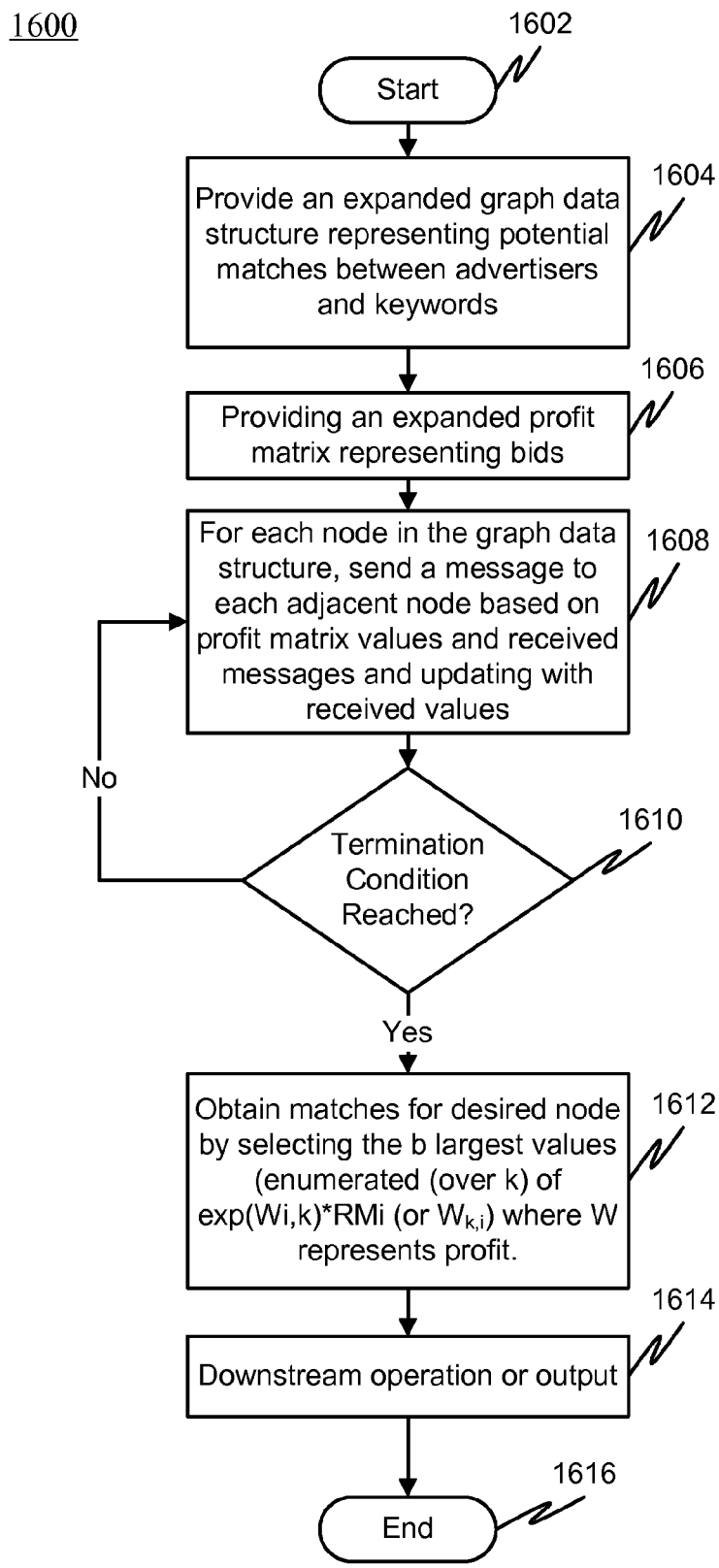
FIG. 16 is a chart of a method of matching advertisers with search terms using degree distribution and belief propagation according to some embodiments of the disclosed subject matter.

FIG. 16 is a chart of a method of matching advertisers with search terms using degree distribution and belief propagation according to some embodiments of the disclosed subject matter. Processing begins at 1602 with the provision 1604 of an expanded graph data structure. The expanded graph data structure nodes or vertices represent advertisers and keywords to be matched and additional dummy nodes as described above. For example, the graph data structure can include advertiser nodes that represent an advertisement from a particular advertiser to be displayed when a user enters one of a group of keywords that are of interest to the advertiser. The graph data structure can include keywords or search terms that correspond to those entered by users and which need to have a set of advertisements matched with in order to enhance and/or maximize revenue generated from pay-per-click advertising, for example.

Next, as indicated at 1606, an expanded profit matrix is provided. The expanded profit matrix represents a profit value for each advertiser/advertisement node connected to a corresponding search term node, plus additional profit values computed for dummy nodes based on degree distribution data, as described above.

Next, electronic messages are passed between adjacent or neighboring nodes as indicated at 1608. A belief propagation processor or distributed processing system adapted to perform belief propagation sends each message from a node is based on the profit matrix values and received messages of that node. The value (or data content) of each message is determined according to a compressed message update rule, described above. Received messages are stored by the processor in an electronic memory, such as, for example, RAM or a database. The message passing can be performed iteratively until a termination condition is met. A conditional branch based on the termination condition is indicated at 1610.

Next belief values for each neighboring node are updated based on received messages and stored as indicated at 1612. The updating can be executed, for example, by the processor adapted to perform belief propagation. The belief value for each node is based on the received messages and the profit matrix portion. If the belief value updating would result in changes to messages already sent, then those messages are sent again with updated values. However, if no belief values change or no message updates are needed, then the node does not send out messages. The settling of the node's belief values for adjacent nodes can indicate that an optimal solution has been reached and the belief propagation has converged on a solution to the matching problem.

A conditional branch is made based on the termination condition as indicated at 1610. The termination condition can be defined as reaching a steady state with respect to message updating. The steady state can be defined as no further message updates being sent or an amount of update message being sent that is below a certain threshold. Alternatively, the termination condition can be defined in terms of a number of iterations of message updating or a number of messages sent (either an aggregate number or a number per node). In another alternative, the termination condition can be defined as the elapsing of a predetermined period of time. If the termination condition has been reached, control proceeds to 1612, otherwise processing returns to 1608.

The b-matching advertiser/advertisement nodes matching an input search term are selected as indicated at 1612. The selected advertiser/advertisement nodes are matched based on sorted belief values. For example, in a b-matching problem, the b nodes having the highest belief values (i.e., profit values) with respect to an input node are selected. The selected nodes can be provided as output to another process or system at 1614. For example, the advertisements corresponding to the selected nodes can be displayed on the search engine results page or content page associated with the search term. Then processing ends at 1616.

It will be appreciated that the sequence 1602-1616 may be repeated in whole or in part in order to accomplish contemplated matching using degree distribution and belief propagation. For example, the belief values may be updated for the entire graph data structure and then matching results may be provided for a plurality of nodes on interest before the belief values of the graph are updated. Alternatively, because the matching may result in changes to one or more nodes in the graph as a result of being selected as matching nodes (e.g., an advertiser's quota of ads or quota of dollars spent may be reached), the belief values may need to be recomputed each time a matching is performed for a node.

Figure 17:
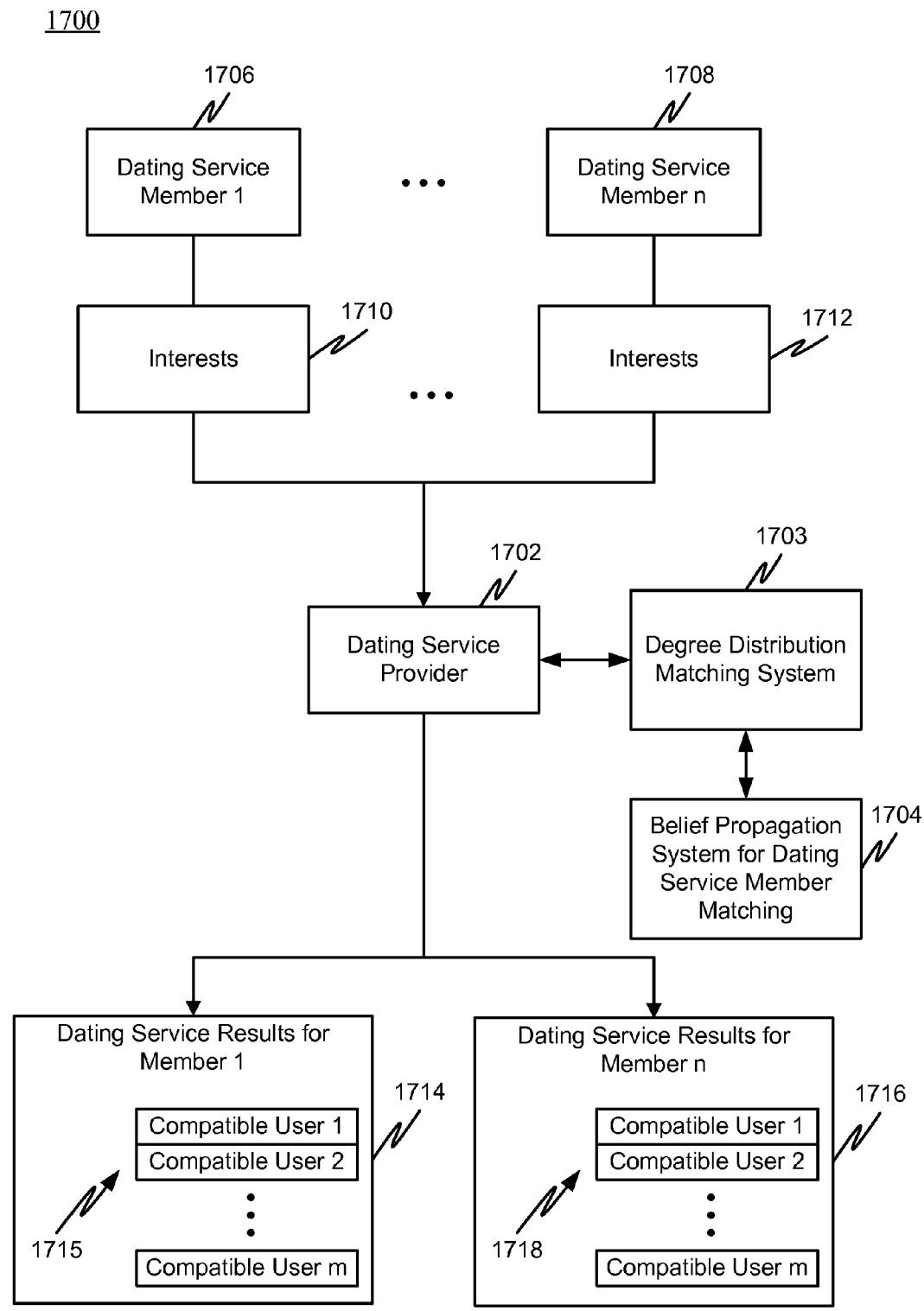
FIG. 17 is a block diagram of a system for matching dating service members using degree distribution and belief propagation according to some embodiments of the disclosed subject matter.

FIG. 17 is a block diagram of a system for matching dating service members using degree distribution and belief propagation according to some embodiments of the disclosed subject matter. In particular, the system 1700 includes a dating service provider 1702 that is coupled to a degree distribution matching system 1703 and a belief propagation system for dating service member matching 1704. The dating service provider 1702 is also coupled to an electronic data storage having stored therein data representing a plurality of dating service members (1706-1708) each having a respective set of interests (1710-1712). The dating service provider 1702 receives the interests (1710-1712) from one or more respective users (1706-1708). The interests (1710-1712) can be used to generate a "profit" matrix for the users, for example, by generating a value representing the interests in common for a given pair of users, which can then be expanded using degree distribution data as described above. In response to the received interests (1710-1712), the dating service provider 1702 performs member matching using the belief propagation system for dating service member matching 1704 to match each member with b other members (e.g., for a fee a dating service may provide b introductions or matches to each user), as described below with respect to FIG. 18. The b matching members may then be communicated to the member that they are matched with as an introduction (e.g., each user may receive an email listing the members he or she has been matched with). For example, a results set 1714 (e.g., in an email or displayed on the user's page at the dating service) can be provided for Member 1. Within the results are listed the b-matching members 1715 selected to match Member 1. And, similarly, a results set 1716 (e.g., in an email or displayed on the user's page at the dating service) can be provided for Member n. Within the results set 1716 are listed the b-matching members 1718 that have been selected to match Member n.

In this example, the nodes of the graph data structure include the members of the dating service. The "profit" matrix (or compatibility matrix) can include the predicted compatibility between a pair of members. The b value represents the number of matching or most likely compatible members to be provided to each respective member (e.g., in accordance with the service agreement with the member). However, each member node may also be subject to other constraints on its belief value such as type of other member being sought, geographic preference, other preferences, a quota of matches to be provided during a given period of time, or the like. These constraints may affect whether or not a member is selected as matching for another member, even if the "profit" or compatibility for that member is high enough that it would normally be selected.

Figure 18:
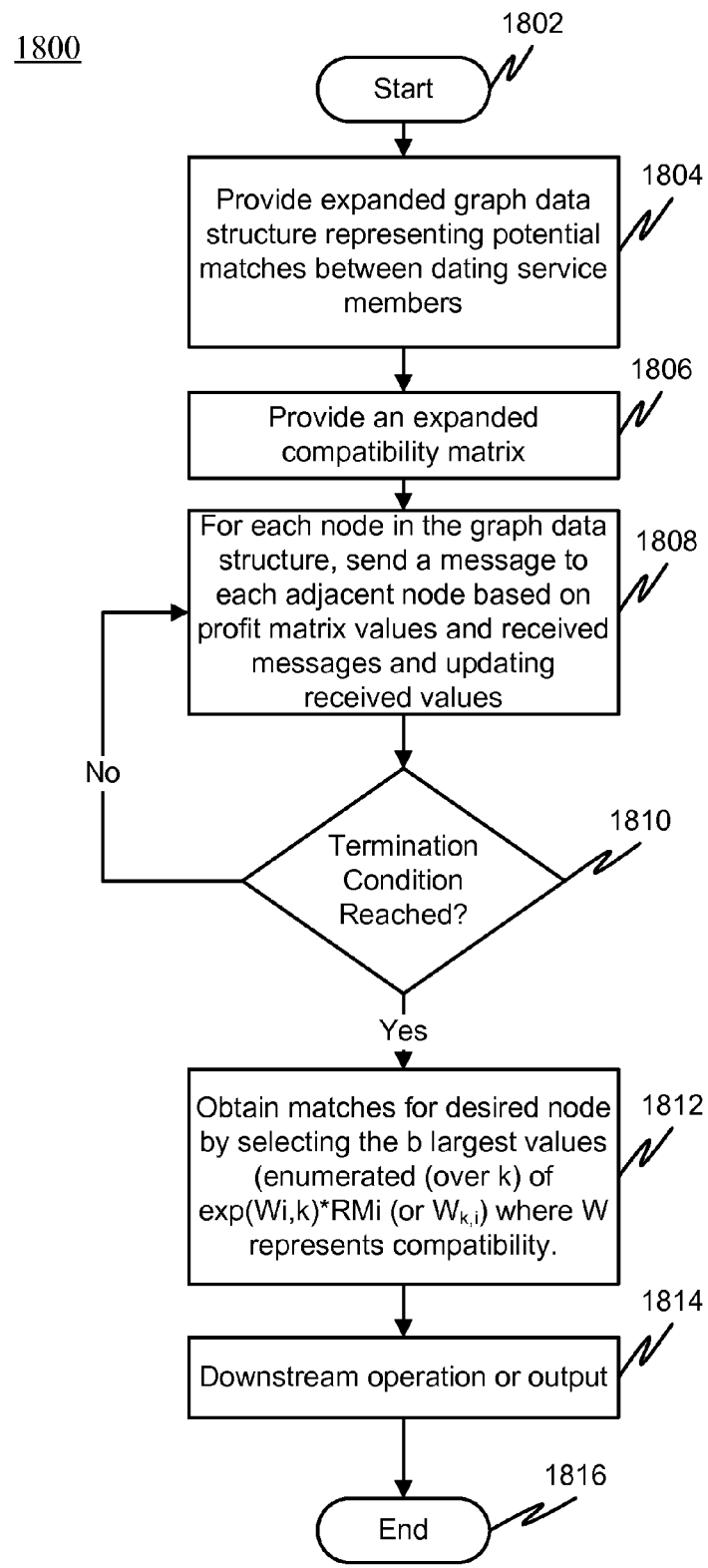
FIG. 18 is a chart of a method of matching dating service members using degree distribution and belief propagation according to some embodiments of the disclosed subject matter.

FIG. 18 is a chart of a method of matching dating service members using degree distribution and belief propagation according to some embodiments of the disclosed subject matter. Processing begins 1802 and an expanded graph data structure 1804 is provided. The graph data structure nodes (or vertices) represent dating service members to be matched and additional dummy nodes according to the expansion method described above.

Next, a compatibility (or "profit") matrix is provided 1806. The compatibility matrix represents a compatibility (or "profit") value for each potential pairing of dating service members. As described above, the compatibility value can be determined based on interests in common, or may be determined according to other suitable methods conventionally used by dating service providers.

Next, electronic messages are passed between adjacent or neighboring nodes as indicated at 1808. A belief propagation processor or distributed processing system adapted to perform belief propagation sends each message from a node is based on the profit matrix values and received messages of that node. The value (or data content) of each message is determined according to a compressed message update rule, described above. Received messages are stored by the processor in an electronic memory, such as, for example, RAM or a database. The message passing can be performed iteratively until a termination condition is met as indicated by the conditional branch 1810.

Belief values for each neighboring node are updated based on received messages and stored as indicated at 1808. The updating can be executed, for example, by the processor adapted to perform belief propagation. The belief value for each node is based on the received messages and the compatibility matrix or relevant portion thereof. If the belief value updating would result in changes to messages already sent, then those messages are sent again with updated values. However, if no belief values change or no message updated are needed, then the node does not send out messages. The settling of the node's belief values for adjacent nodes can indicate that an optimal solution has been reached and the belief propagation has converged on a solution to the matching problem.

The termination condition controlling branching at 1810 can be characterized as the realization of a steady state with respect to message updating. The steady state can be defined as one in which no further message updates are sent. Alternatively, the state may be defined as one in which the message updates being sent has fallen below a certain threshold. Alternatively, the termination condition can be defined in terms of a number of iterations of message updating or in terms of the number of messages sent (either an aggregate number or a number per node). Alternatively, the termination condition can be defined as the lapse of a predetermined time interval.

If the termination condition has been reached, the b-matching member nodes matching an input member are selected as indicated at 1814. The members are matched based on sorted belief values. For example, in a b-matching problem, the b nodes having the highest belief values (i.e., compatibility values) with respect to an input member are selected and can be used as output to provide introductions between members with likely compatibility. At 1814, the selected members can be provided to a compatible member as described above. The process ends at 1816.

It will be appreciated that the procedure of 1802-1816 may be repeated in whole or in part in order to accomplish a contemplated dating service member matching using belief propagation. For example, the belief values may be updated for the entire graph data structure and then matching results may be provided for a plurality of nodes on interest before the belief values of the graph are updated. Alternatively, because the matching may result in changes to one or more nodes in the graph as a result of being selected as matching nodes (e.g., a member's quota of introductions may have been reached), the belief values may need to be recomputed each time a matching is performed for a node.

Figure 19:
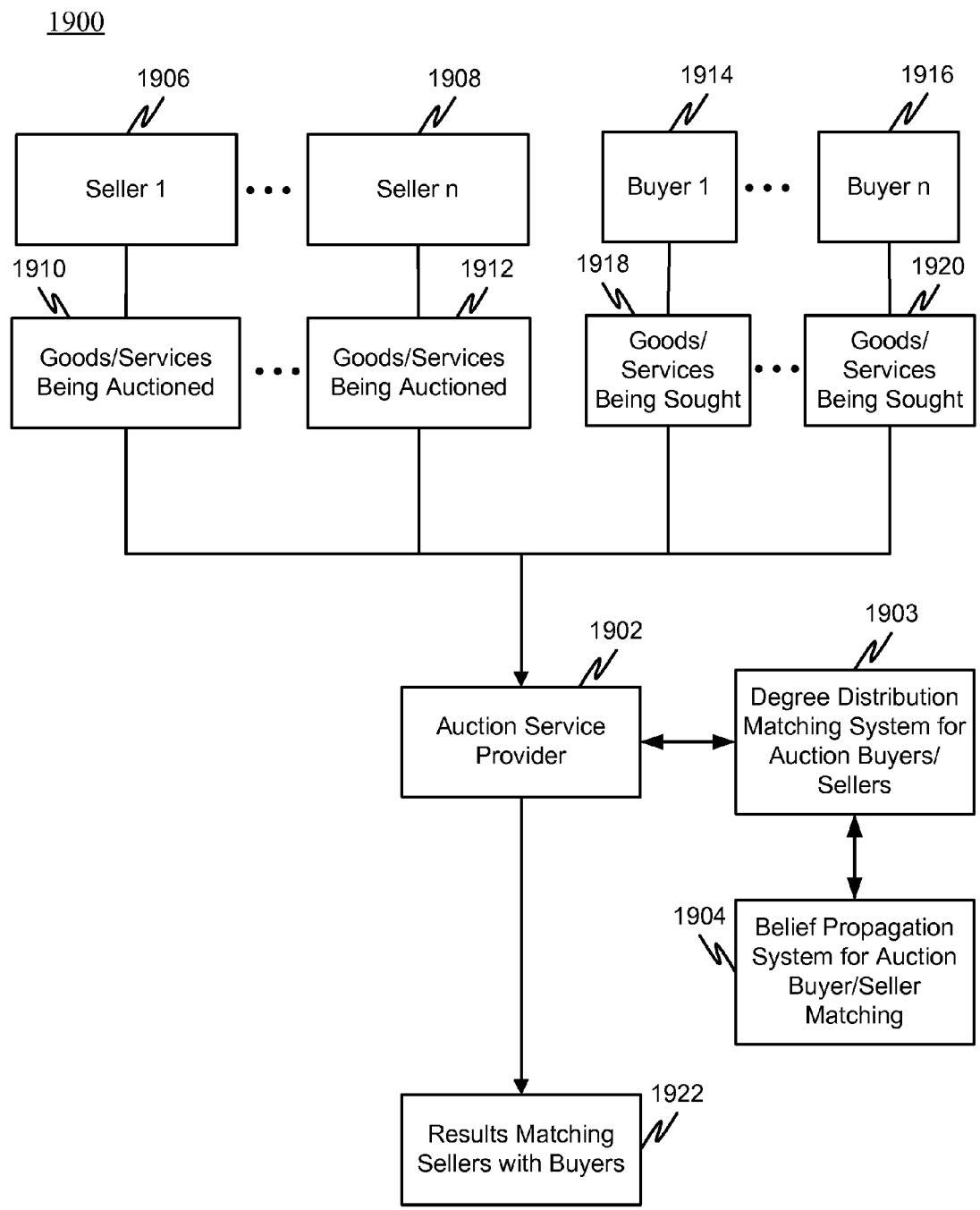
FIG. 19 is a diagram of a system for matching sellers and buyers in an auction using degree distribution and belief propagation according to some embodiments of the disclosed subject matter.

FIG. 19 is a diagram of a system for matching sellers and buyers in an auction using degree distribution and belief propagation according to some embodiments of the disclosed subject matter. In particular, the system 1900 includes an auction service provider 1902 that is coupled to a belief propagation system for auction buyer/seller member matching 1904. The auction service provider 1902 is also coupled to an electronic data storage having stored therein data representing a plurality of sellers (1906-1908) each having a respective set of goods/services being offered (1910-1912), and a plurality of buyers (1914-1916) each having a respective set of goods/services being sought (1918-1920). The auction service provider 1902 receives the goods/services being offered (1910-1912) and the goods/services being sought (1918-1920), which can be used to generate a profit matrix for matching the buyers and sellers, for example, by generating a profit value for each seller selling his goods/services to a corresponding buyer seeking those goods/services.

In response to the received goods/services being offered (1910-1912) and the goods/services being sought (1918-1920), the auction service provider 1902 performs graph and profit matrix expansion using degree distribution matching system 1903. Then, using the expanded graph data structure and expanded profit matrix, the auction service provider performs buyer/seller matching using the belief propagation system for auction buyer/seller matching 1904 to match each buyer with b sellers (e.g., such that the buyer's requirements are met), as described below with respect to FIG. 20. The b matching sellers may then be communicated to the buyer that they are matched with in order to complete a transaction. For example, a results set 1922 that has the b-matching between buyers and sellers can be provided as output. Alternatively, the matches for a particular buyer or seller can be communicated directly to that buyer or seller.

In this example, the nodes of the graph data structure represent goods/services being offered (1910-1912) and the goods/services being sought (1918-1920). The profit matrix can have values based on a particular buyer buying from a particular seller. For example, in the case of a buyer, the b value can represent the number of matching sellers needed to meet the buyer's requirements. In the case of a seller, the b value can represent the number of buyers needed to purchase the sellers goods/services being offered. However, each node may also be subject to other constraints on its belief value. These constraints may affect whether or not a buyer/seller is selected as matching for another buyer/seller, even if the profit for that matching is high enough that it would normally be selected.

Figure 20:
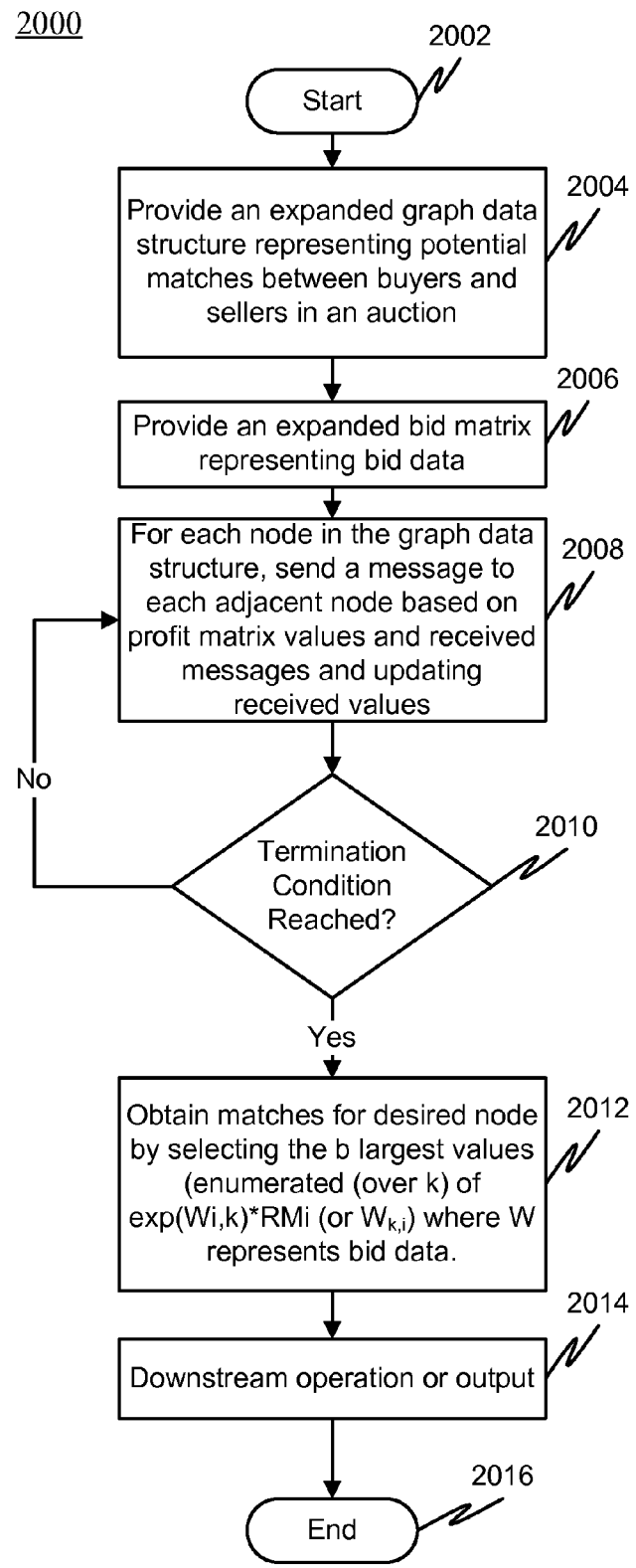
FIG. 20 is a chart of a method of matching sellers and buyers in an auction using degree distribution and belief propagation according to some embodiments of the disclosed subject matter.

FIG. 20 is a chart of a method of matching sellers and buyers in an auction using degree distribution and belief propagation according to some embodiments of the disclosed subject matter. After beginning 2002, an expanded graph data structure is provided as indicated at 2004. The expanded graph data structure nodes or vertices represents auction buyers and sellers, and their respective goods/services, to be matched. Next, an expanded profit matrix is provided 2006. The expanded profit matrix represents a profit value for each seller node connected to a corresponding buyer node. The expanded graph data structure and the expanded profit matrix being generated according to the method described above.

Electronic messages are passed between adjacent or neighboring nodes as indicated at 2008. A belief propagation processor or distributed processing system adapted to perform belief propagation sends each message from a node is based on the profit matrix values and received messages of that node. The value (or data content) of each message is determined according to a compressed message update rule, described above. Received messages are stored by the processor in an electronic memory, such as, for example, RAM or a database. The message passing can be performed iteratively until a termination condition is met. This is controlled by a branch point 2012.

Belief values for each neighboring node are updated based on received messages and stored as indicated at 2008. The updating can be executed, for example, by the processor adapted to perform belief propagation. The belief value for each node is based on the received messages and the profit matrix portion. If the belief value updating would result in changes to messages already sent, then those messages are sent again with updated values. However, if no belief values change or no message updated are needed, then the node does not send out messages. The settling of the node's belief values for adjacent nodes can indicate that an optimal solution has been reached and the belief propagation has converged on a solution to the matching problem.

Next, it is determined whether the termination condition has been reached at branch point 2010. The termination condition can be defined as reaching a steady state with respect to message updating. The steady state can be defined as no further message updates being sent or an amount of update message being sent that is below a certain threshold. Alternatively, the termination condition can be defined in terms of a number of iterations of message updating or a number of messages sent (either an aggregate number or a number per node). In another alternative, the termination condition can be defined as the elapsing of a predetermined period of time. If the termination condition has been reached, the b-matching buyer or seller nodes matching an input buyer/seller node are selected as indicated at 2012, otherwise control returns to 2008.

The selected nodes are matched based on sorted belief values at 2012. For example, in a b-matching problem, the b nodes having the highest belief values (i.e., profit values) with respect to an input node are selected. At 2014, the selected nodes can be provided as output to another process or system. For example, the sellers corresponding to a selected buyer node can be displayed for the buyer (or vice versa). Processing then ends 2016.

It will be appreciated that the procedure at 2002-2016 may be repeated in whole or in part in order to accomplish a contemplated auction buyer-seller matching using belief propagation. For example, the belief values may be updated for the entire graph data structure and then matching results may be provided for a plurality of nodes on interest before the belief values of the graph are updated. Alternatively, because the matching may result in changes to one or more nodes in the graph as a result of being selected as matching nodes (e.g., a buyer or seller has reached their respective quota of goods/services), the belief values may need to be recomputed each time a matching is performed for a node.

Figure 21:
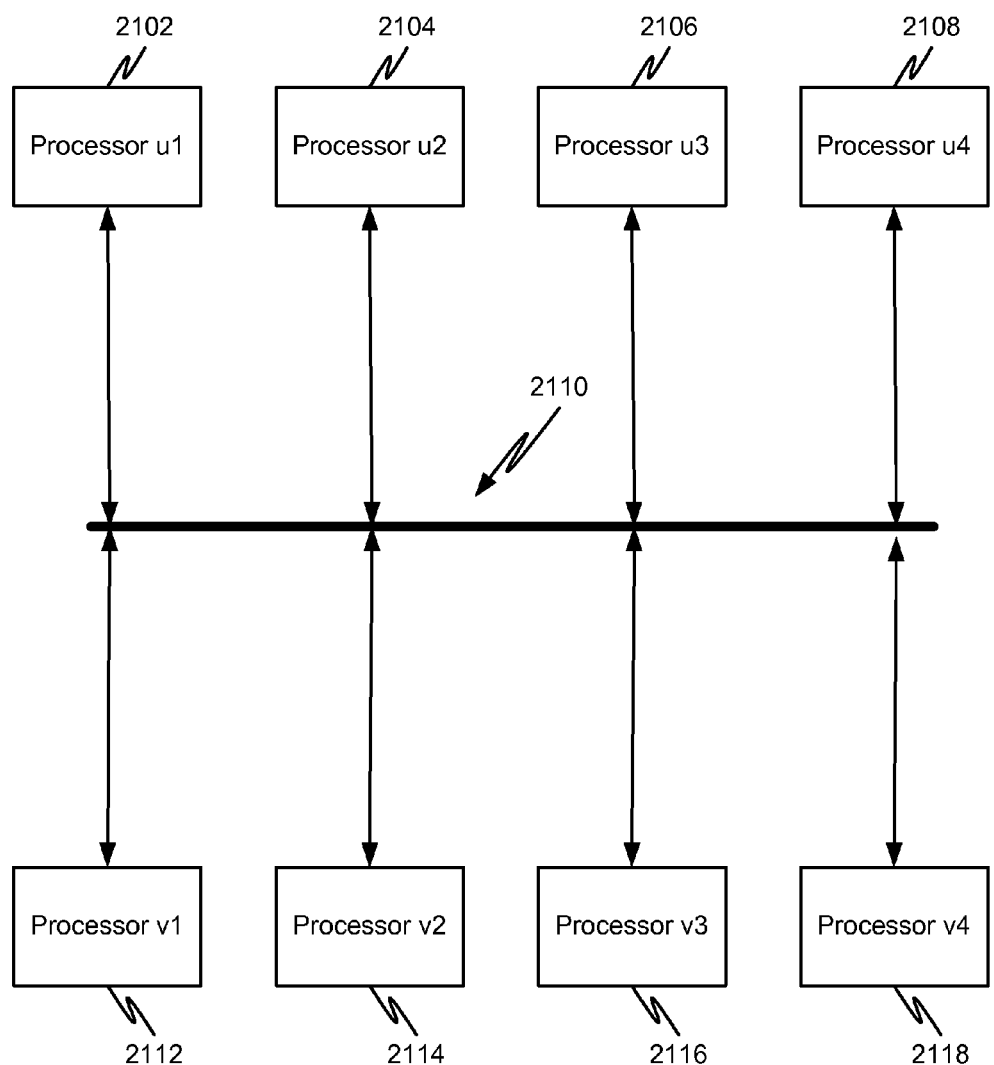
FIG. 21 is a diagram of a plurality of degree distribution matching/belief propagation processors implemented in hardware according to some embodiments of the disclosed subject matter.

FIG. 21 is a diagram of a plurality of degree distribution matching/belief propagation processors implemented in hardware according to some embodiments of the disclosed subject matter. In particular, a system 2100 includes a plurality of belief propagation processors (2102-2108 and 2112-2118). Each of the processors is coupled to a bus 2110. The belief propagation processors are constructed for operating as nodes in a belief propagation system for matching using degree distribution as described above. The system 2150 can include processors that are stand-alone or can represent a single semiconductor device having multiple belief propagation processors constructed thereon.

Figure 22:
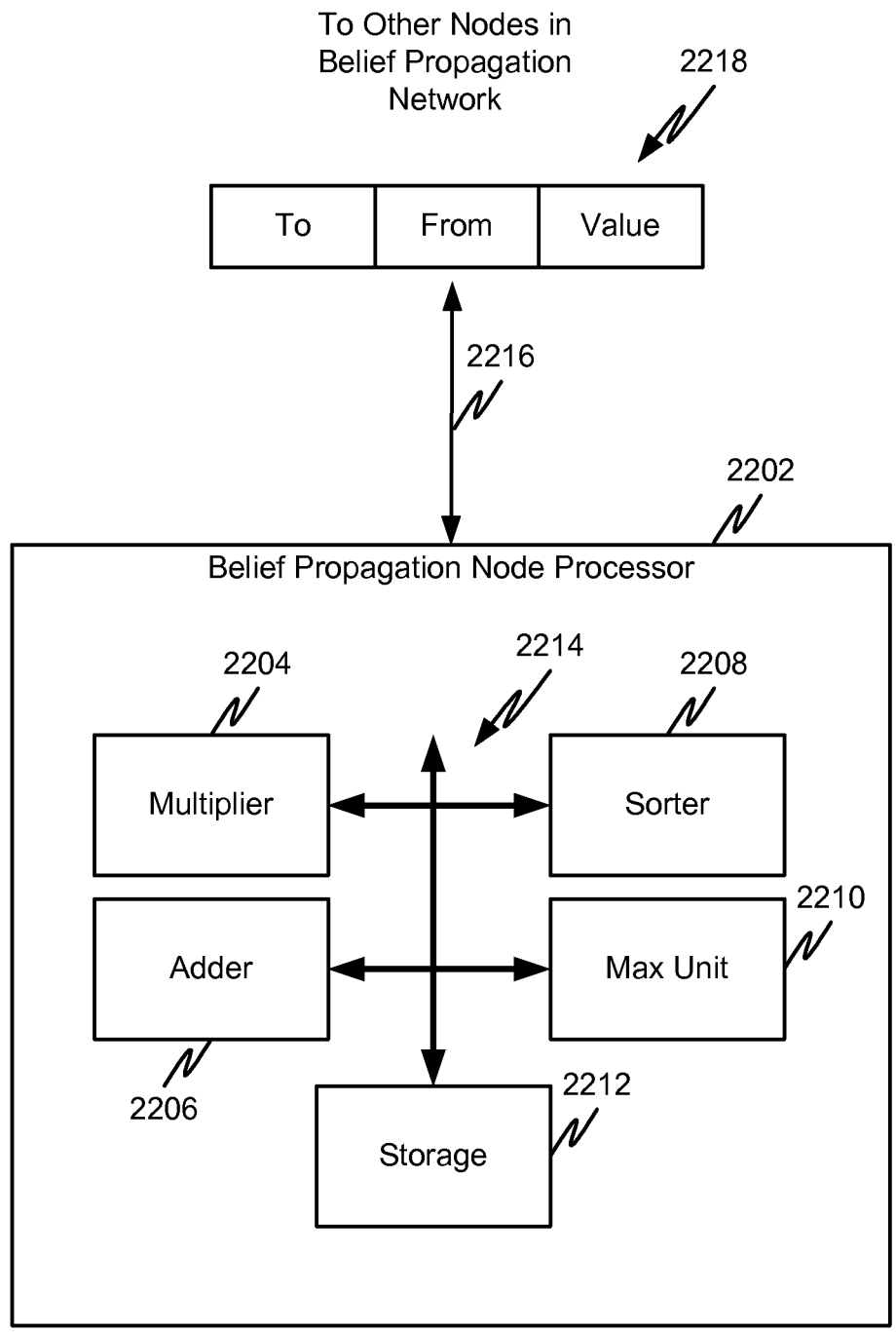
FIG. 22 is a diagram of a hardware matching using degree distribution/belief propagation processor according to some embodiments of the disclosed subject matter.

In operation, each hardware belief propagation processor performs the belief propagation method described above for a single node. The hardware details are shown in FIG. 22, which is a diagram of a hardware matching using degree distribution/belief propagation processor according to some embodiments of the disclosed subject matter.

In particular, the hardware belief propagation processor 2202 includes a multiplier section 2204, an adder section 2206, a sorter section 2208, a max unit 2210, a storage 2212 each coupled to an internal bus 2214. The processor 2202 is coupled to an external bus 2216 in order to communicate with other processors and exchange messages 2218. The messages 2218 include a "to" field, a "from" field and a value field. The "to" field specifies an intended recipient node of the message, the "from" field specifies the sending node, and the value field contains the message value as calculated according to the message update rule described above.

In operation, the processor 2202 listens to messages on the external bus 2216. When a message is intended for the processor 2202, the processor 2202 receives the message and stores it in the storage at a location corresponding to the sender node of the message. Processor 2202 can then calculate an updated message value to the nodes stored in its storage as neighbor or adjacent nodes and can send the updated messages to each corresponding neighbor node. The sections and units of the processor 2202 are used to perform the calculations required for determining updated messages and belief values. The processor 2202 can also transmit its b-matching nodes to another processor or system via the external bus 2216.

The processor 2202 may be implemented as a stand alone device or may be incorporated into a device having other circuitry including other belief propagation processor nodes.

In addition to the applications described above, the method and system for matching using degree distribution data can also be adapted to provide solutions to other types of problems. For example, the weight matrix can be thresholded. Setting the degree prior to:

$$\psi_i(k) = -\theta k$$

will cause the maximum b-matching to have edges on when Wij is greater than threshold $\Phi$.

The method and system for matching using degree distributions can mimic traditional b-matching by setting the degree prior to be delta functions at degree b.

The method and system for matching using degree distributions can mimic bd-matching, which enforces lower and upper bounds on the degrees, by setting the degree priors to be uniform between the bounds and to have zero probability elsewhere.

The method and system for matching using degree distributions can mimic k nearest neighbors by duplicating the nodes of the graph to form a bipartite graph, where edges between nodes in the original graph are represented by bi-partitions, and by setting the degrees of one bipartition to exactly k while leaving no constraints on the other bipartition.

Also, the method and system for matching using degree distributions can mimic spanning tree estimates by requiring that each node has at least one neighbor and there are at most |V|−1 edges total.

Figure 23:
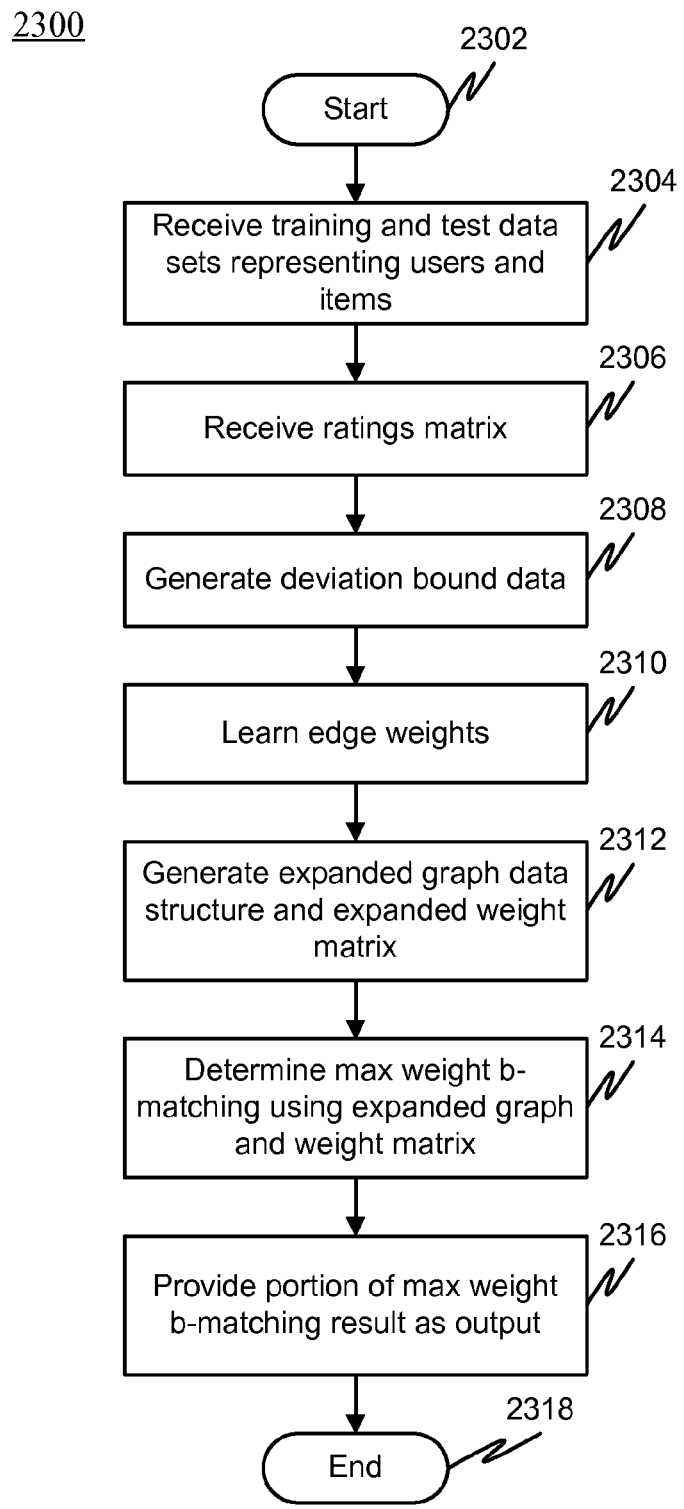
FIG. 23 is a chart of a recommendation post processing method using degree distribution and belief propagation according to some embodiments of the disclosed subject matter.

FIG. 23 is a chart of a recommendation post processing method using degree distribution and belief propagation according to some embodiments of the disclosed subject matter. The method 2300 begins at 2302 and continues to 2304.

At 2304, training and test data sets are received. The data sets include node representing users and items. For example, the users may include movie watchers or book readers and the items may include movies or books. In another example, the users can include customers of an e-commerce business and the items may include items sold by the e-commerce business. Processing continues to 2306.

At 2306, a ratings matrix is received. The ratings matrix corresponds to ratings of items by users in the training data set. For example, movie watchers may rate movies on a scale of 1 to 5, or readers may rate books on a scale of 1 to 10. Processing continues to 2308.

At 2308, deviation bound data is determined. The deviation bound represents the probability that ratings by a user or for an item will deviate from their respective true mean values. The deviation bound can be used to determine the "degree" distribution for each row (e.g., user) and column (e.g., item) in the training data set. The degree potential can be set according to the following formula:

$$\psi_i(k) = -\lambda \frac{\left(\frac{1}{c_{tr}}\sum_{j=1}^{c_{tr}} Y_{ij} - k/c_{te}\right)^2 c_{tr} c_{te}}{2(c_{tr} + c_{te})}$$

where Y represents the ratings matrix value, Ctr is the size of the training set, Cte is the size of the testing set and λ is a regularization parameter used to scale the potentials. For additional discussion on the mathematical background and support for the above formula see the Appendices. Processing continues to 2310.

At 2310, edge weight values are learned from the training data set. For example, a fast Max-Margin Matrix Factorization (fMMMF) using a logistic loss function can be applied. The result of the fMMMF can be used as a weight matrix for matching using degree distribution. Additional discussion of the mathematical basis for using fMMMF can be found in the Appendices. Processing continues to 2312.

At 2312, an expanded graph data structure and expanded weight matrix are generated. The expanded graph data structure can be generated using the testing data set according to the method discussed above. The expanded weight matrix can be generated using the edge weights generated by the edge weight learning performed at 2310 and by using a value proportional to the deviation bound data as "degree" distribution data for each row/column. For example, a particular user may only like 30% of recommended products. The initial recommendation engine output may include 1000 movies that could be recommended to the user. For post-processing of the recommendation engine output, the degree distribution of the user could be represented by a vector of length 1000 (representing the total possible degree values) with a value of 1.0 located at the index of the vector associated with 300 (or 30%). Of course, the degree distribution value may include a different distribution that is a Gaussian centered around the desired value. It will also be appreciated that the recommended products have a degree distribution (e.g., what percentage of users liked or disliked the product). The degree distribution of the products can also be taken into account by including the degree distributions of the products in the expanded weight matrix. Processing continues to 2314.

At 2314, a max weight b-matching process is performed as described above. Belief propagation can be used to determine the max weight b-matching on the expanded graph data and weight matrix data. Processing continues to 2316.

At 2316, a portion of the result of the max weight b-matching is provided as output. For example, a portion of the results corresponding to the testing set nodes can be provided. Processing continues to 2318, where processing ends.

Figure 24:
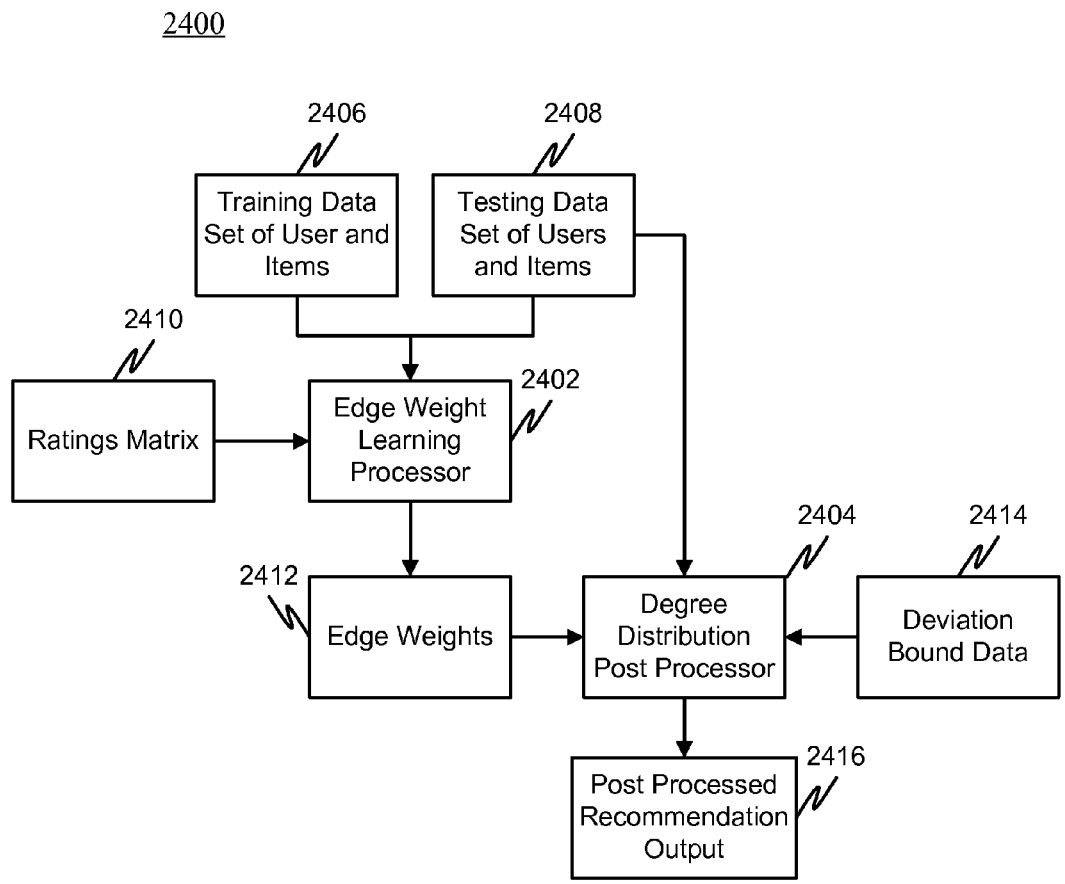
FIG. 24 is a block diagram of a recommendation post processing system using degree distribution and belief propagation according to some embodiments of the disclosed subject matter.

FIG. 24 is a block diagram of a recommendation post processing system using degree distribution and belief propagation according to some embodiments of the disclosed subject matter. In particular, a system 2400 includes an edge weight learning processor 2402 coupled to a degree distribution matching processor 2404.

The edge weight learning processor 2402 is adapted to receive a training data set of users and items 2406 and a testing data set of users and items 2408. The training data set 2406 is used to train the system 2400 in order to make a prediction about the testing data set 2408. The edge weight learning processor 2402 also receives ratings matrix data 2410. The edge weight learning processor 2402 performs an operation to learn edge weight from the training data set. For example, the edge weight learning processor 2402 can perform a fast Max-Margin Matrix Factorization (fMMMF) with a logistic loss function in order to generate an output weight matrix corresponding to the edge weights predicted for the testing data set, these edge weights 2412 can be provided to the degree distribution matching processor 2404 as input.

The degree distribution matching processor 2404 also receives the testing data set 2408 and deviation bound data 2414. The degree distribution matching processor 2404 can use the deviation bound data 2414 as "degree" distribution data for use with the testing data set 2408 and the edge weights 2412 from the edge weight learning processor 2402.

The degree distribution matching processor 2404 performs the matching using degree distribution method as described above and outputs post processed recommendation output 2416. The post processed recommendation output 2416 includes the prediction output of the fMMMF with degree prior adjustment. By using the degree priors from the training data as a statistical bound, the post processing is mathematically guaranteed to produce an improvement or at least to not degrade the initial recommendation engine results.

FIGS. 25A-25D are diagrams of an initial weight matrix being expanded once to "square" the matrix and then expanded once again to include degree distribution data. FIG. 25A shows an initial weight matrix 2500 for a simplistic illustration of the dating service problem described above. The weight matrix 2500 is a 2×3 matrix and includes two men (M1 and M2) and three women (W1-W3). The values in the weight matrix correspond to hypothetical compatibility indexes between respective men and women. The weight matrix 2500 represents a bipartite problem having two classes of nodes (men and women). Also, it can be seen that the weight matrix 2500 is not square.

FIG. 25B shows a first expanded weight matrix 2502. In, the first expanded weight matrix 2502 the men and women have been placed on each side of the matrix to form a 5×5 matrix. This achieves two things. First, the first expanded weight matrix is now square, which will permit the b-matching to be performed more simply by not having to take into account a rectangular, but not square weight matrix. Second, by having both classes of nodes on each side of the graph, computation of the marginal degree distribution quadrants will be simpler. There is, of course, a computational cost to increasing the weight matrix size and depending on the particular problem may or may not be worthwhile.

FIG. 25C shows a second expanded weight matrix 2504 based on the first expanded weight matrix 2502 and on degree distribution values for each node. The second expanded weight matrix 2504 includes the first expanded weight matrix 2502 as the upper left quadrant. The second expanded weight matrix 2504 includes degree difference values as the upper right and lower left quadrants and a zero quadrant as the lower right quadrant.

FIG. 25D shows a diagram of the second expanded weight matrix 2506 with degree distribution values used to populate the weight matrix values for the upper right and lower left quadrants. For example, the first weight matrix value 2508 for the first row, column cell of the upper right quadrant is determined based on the degree distribution values for M1. For example, assuming the degree distribution values start at a value for one connection and that the probability for zero degree, i.e., $\phi_{M1}(0)$, is 0 for all users, the value at 2508 is computed as: $\phi_{M1}(0)-\phi_{M1}(1)$ or $(0-0.2)=-0.2$. Once the weight values for the second expanded weight matrix have been determined according to the method described above, a b-matching operation can be performed. Since the original bipartite graph having men and women nodes has essentially been recast as a unipartite problem (having men and women on each side of the weight matrix), the loopy belief propagation technique described herein can be used to solve the b-matching, where, in this case, b=5.

A result matrix (not shown, but similar in nature to that shown in FIG. 8) can be generated by selecting the top b matches for each node and setting them to a value of 1 in the result matrix, which has a size equivalent to the second expanded matrix. All other values of the result matrix can be set to zero. Thus, a binary result matrix is generated in which a 1 in a cell represents an edge of the subgraph solution. As discussed above, the upper left quadrant (in this case, the upper left 5×5 portion) of the result matrix is extracted as the final result matrix for the original problem. A value of one in a matrix cell represents an introduction between the man and woman corresponding to the edge represented by that cell, with the introduction representing a maximum weight subgraph satisfying the degree distributions of each user node.

In addition to being able to "square" a rectangular weight matrix, the technique described above with respect to FIGS. 25A-25D can be used to transform a bipartite problem into a unipartite problem for solving using the match with degree distribution technique. As mentioned, this technique incurs a computational cost, but may be useful for certain problems needing to be solved with the degree distributions of both classes of nodes being taken into account.

Embodiments of the method, system, computer program product and computer readable media for matching using degree distribution, may be implemented on one or more general-purpose computers, one or more special-purpose computers, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any device or process capable of implementing the functions or processes described herein can be used to implement embodiments of the method, system, computer program product or computer readable media for matching using degree distribution.

Furthermore, embodiments of the disclosed method, software, and computer program product (or computer readable media) for matching using degree distribution may be readily implemented, fully or partially, in software using, for example, object or object-oriented software development environments that provide portable source code that can be used on a variety of one or more computers platforms. Alternatively, embodiments of the disclosed method for matching using degree distribution can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, computer program product and computer readable media for matching using degree distribution can be implemented in hardware and/or software using any known or later developed systems or structures, devices and/or software by those of ordinary skill in the applicable art from the functional description provided herein and with a general basic knowledge of the computer arts.

Moreover, embodiments of the disclosed method for generalized matching using belief propagation can be implemented in software stored on computer readable media (or provided as a computer program product) and adapted to be executed on a programmed general-purpose computer, a special purpose computer, a microprocessor, or the like. Also, the matching using degree distribution method of this disclosed subject matter can be implemented as a program embedded on a personal one or more computers such as a JAVA® or CGI script, as a resource residing on a server or graphics workstation, as a routine embedded in a dedicated processing system, or the like. The method and system can also be implemented by physically incorporating the method for matching using degree distribution into a software and/or hardware system, such as the hardware and software systems of a search engine, ecommerce platform, online auction, online dating, resource allocation, or image processing system.

It should be appreciated that graph nodes in both the bipartite and unipartite matching process can be associated with any object, article, events, things, processes, or persons and/or data representation one or more of them represented as any form of data structure or vector. The weight (e.g., compatibility score) between nodes may be any function of their corresponding attributes, including but not limited to any distance function, generalized divergence function, generalized inner product, similarity function or kernel function between the pair of objects, data structures or vectors. For example, the nodes in a unipartite matching may correspond to vectors in Euclidean space and the distance may correspond to the Euclidean distance. Note also that, instead of ads and phrases or people in a social network, any dataset of n objects, such as n vectors or n data structures may for a basis for a graph of n nodes and a matrix of size n by n. Thus, the b-matching and degree distribution methods described herein may be applied in settings such as in image processing or in general analytics such as classification problems.

It is, therefore, apparent that there is provided in accordance with the presently disclosed subject matter, a method, system, a computer program product and a computer readable media with software for matching using degree distribution. While this disclosed subject matter has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of disclosed subject matter.

Any of the foregoing embodiments, may be recorded on a non-transitory computer readable medium. "A non-transitory computer readable medium is any type of computer readable medium with the sole exception of a transitory, propagating signal, and thus may include powered storage such as RAM."

APPENDIX 1

[00114] If the weight matrix 318 is $A$ such that the weight of any edge 306, 308 $(u_i, v_j)$ is $A_{ij}$, the potential matchings are defined by the function $M(u_i)$ or $M(v_j)$ where the function $M$ returns the set of neighbor vertices (or nodes) of the input vertex (or node). The $b$-matching objective can be written as:

$$W(M) = \max_M \sum_{i=1}^{n} \sum_{v_k \in M(u_i)} A_{ik} + \sum_{j=1}^{n} \sum_{u_i \in M(v_j)} A_{ij} \quad (1)$$

$$s.t. \quad |M(u_i)| = b, \forall i \in \{1, \ldots, n\}$$
$$|M(v_j)| = b, \forall j \in \{1, \ldots, n\}$$

[00115] Defining the variables $x_i \in X$ and $y_j \in Y$ for each vertex such that $x_i = M(u_i)$ and $y_j = M(v_j)$, the following potential functions can be defined:

$$\phi(x_i) = \exp(\sum_{v_j \in x_i} A_{ij}), \quad \phi(y_j) = \exp(\sum_{u_i \in y_j} A_{ij});$$

and a clique function can be defined:

$$\psi(x_i, y_j) = \neg(v_j \in x_i \oplus u_i \in y_j). \quad (2)$$

[00116] Using the potentials and clique function, the weighted $b$-matching objective can be written as a probability distribution $p(X,Y) \propto \exp(W(M))$.

$$p(X,Y) = \frac{1}{Z} \prod_{i=1}^{n} \prod_{j=1}^{n} \psi(x_i, y_j) \prod_{k=1}^{n} \phi(x_k) \phi(y_k) \quad (3)$$

[00117] The probability function (3) above is maximized using the max-product algorithm. The max-product algorithm iteratively passes messages between dependent variables and stores beliefs, which are estimates of max-marginals. Conventionally, messages are represented by vectors over settings of the variables. The following are the update equations from $x_i$ to $y_j$.

$$m_{x_i}(y_j) = \frac{1}{Z} \max_{x_i} \left[ \phi(x_i) \psi(x_i, y_j) \prod_{k \neq j} m_{y_k}(x_i) \right]$$

$$b(x_i) = \frac{1}{Z} \phi(x_i) \prod_{k} m_{y_k}(x_i)$$

[00118] Direct belief propagation on larger graphs using the above equations converges, but may not be suitable due to the number of possible settings for each variable.

[00119] In order to quickly solve a $b$-matching problem using belief propagation, while still maintaining algorithm guarantees, several improvements over conventional direct belief propagation are needed. Three features of the above equations are exploited in order to allow the messages to be represented as scalars.

[00120] First, $\psi$ functions are well structured, and their structure causes the maximization term in the message updates to always be one of two values.

$$m_{x_i}(y_j) \propto \max_{v_j \in x_i} \phi(x_i) \prod_{k \neq j} m_{y_k}(x_i), \text{ if } u_i \in y_j$$

$$m_{x_i}(y_j) \propto \max_{v_j \notin x_i} \phi(x_i) \prod_{k \neq j} m_{y_k}(x_i), \text{ if } u_i \notin y_j \qquad (4)$$

[00121] This is because the $\psi$ function changes based only on whether the setting of $y_j$ indicates that $y_j$ shares an edge with $u_i$. Furthermore, if we redefine the above message values as two scalars, we can write the messages more specifically as $$\mu_{x_i y_j} \propto \max_{v_j \in x_i} \phi(x_i) \prod_{u_k \in x_i, v_j} \mu_{ki} \prod_{u_k \notin x_i, v_j} v_{ki}$$

$$v_{x_i y_j} \propto \max_{v_j \notin x_i} \phi(x_i) \prod_{u_k \in x_i, v_j} \mu_{ki} \prod_{u_k \notin x_i, v_j} v_{ki} \qquad (5)$$

[00122] Second, since the messages are unnormalized probabilities, we can divide any constant from the vectors without changing the result. We divide all entries in the message vector by $v_{x_i y_j}$ to get $$\hat{\mu}_{x_i y_j} = \frac{\mu_{x_i y_j}}{v_{x_i y_j}} \text{ and } \hat{v}_{x_i y_j} = 1.$$

[00123] This lossless compression scheme simplifies the storage of message vectors from length $\binom{n}{b}$ to 1.

The $\phi$ functions are rewritten as a product of the exponentiated $A_{ij}$ weights and eliminate the need to exhaustively maximize over all possible sets of size $b$. Inserting Equation (2) into the definition of $\hat{\mu}_{x_i y_j}$ gives $$\hat{\mu}_{x_i y_j} = \frac{\max_{j \in x_i} \phi(x_i) \prod_{k \in x_i, j} \hat{\mu}_{ki}}{\max_{j \notin x_i} \phi(x_i) \prod_{k \in x_i, j} \hat{\mu}_{ki}}$$

$$= \frac{\max_{j \in x_i} \prod_{k \in x_i} \exp(A_{ik}) \prod_{k \in x_i, j} \hat{\mu}_{ki}}{\max_{j \notin x_i} \prod_{k \in x_i} \exp(A_{ik}) \prod_{k \in x_i, j} \hat{\mu}_{ki}}$$

$$= \frac{\exp(A_{ij}) \max_{j \in x_i} \prod_{k \in x_i, j} \exp(A_{ik}) \hat{\mu}_{ki}}{\max_{j \notin x_i} \prod_{k \in x_i} \exp(A_{ij}) \hat{\mu}_{ki}}$$

[00124] We cancel out common terms and are left with the simple message update rule, $$\hat{\mu}_{x_i y_j} = \frac{\exp(A_{ij})}{\exp(A_{i\ell}) \hat{\mu}_{y_\ell x_i}}$$

[00125] Here, the index $\ell$ refers to the $b$ th greatest setting of $k$ for the term $\exp(A_{ik}) m_{yk}(x_i)$, where $k \neq j$. This compressed version of a message update can be computed in $O(bn)$ time.

[00126] We cannot efficiently reconstruct the entire belief vector but we can efficiently find its maximum.

$$\max_{x_i} b(x_i) \propto \max_{x_i} \phi(x_i) \prod_{k \in x_i} \hat{\mu}_{y_k x_i}$$

$$\propto \max_{x_i} \prod_{k \in x_i} \exp(A_{ik}) \hat{\mu}_{y_k x_i}$$

Finally, to maximize over $x_i$ we enumerate $k$ and greedily select the $b$ largest values of $\exp(A_{ik}) \hat{\mu}_{y_k x_i}$.

[00127] The procedure avoids enumerating all $\binom{n}{b}$ entries in the belief vector, and instead reshapes the distribution into a $b$ dimensional hypercube. The maximum of the hypercube is found efficiently by searching each dimension independently. Each dimension represents one of the $b$ edges for node $u_i$. In other words, the above procedure makes it possible to select the largest b matches for each node as the solution, without having to compare all of the node combinations.

APPENDIX II

Exact Graph Structure Estimation with Degree Priors

A generative model for graph edges under specific degree distributions which admits an exact inference method for recovering a most likely structure. This binary graph structure may be obtained by reformulating any suitable inference problem as a generalization of the polynomial time combinatorial optimization known as $b$-matching. Standard $b$-matching recovers a constant-degree constrained maximum weight subgraph from an original graph instead of a distribution over degrees. After this mapping, the most likely graph structure can be found in cubic time with respect to the number of nodes using max flow methods. Furthermore, in some instances, the combinatorial optimization problem can be solved exactly in near quadratic time by loopy belief propagation and max product updates even if the original input graph is dense. An example application to post-processing of recommender system predictions is shown.

1 Introduction

An important task in graph analysis is estimating graph structure given only partial information about nodes and edges. The present disclosure concerns finding subgraphs from an original (possibly fully connected and dense) graph, subject to information about edges in terms of their weight as well as degree distribution information for each node.

Consider a graph $\Gamma = (\varsigma, E)$. Such a graph contains an exponential number of subgraphs (graphs that can be obtained from the original by performing edge deletion). In fact, the number of subgraphs is $2^{|E|}$, and since $|E|$ can be up to $|\varsigma|(|\varsigma|-1)/2$, search or probabilistic inference in such a space may often be intractable. Working with a probability distribution over such a large set of possibilities is not only computationally difficult but may also be misleading since some graph structures are known to be unlikely *a priori*. This article proposes a particular distribution over graphs that uses factorization assumptions and incorporates prior distributions over node degrees. *Maximum a posteriori* (MAP) estimation is performed under this distribution by converting the problem into a maximum weight $b$-matching.

This conversion method generalizes maximum weight $b$-matching, which is applied to various classical applications such as advertisement allocation in search engines, as well as machine learning applications such as semi-supervised learning, and embedding of data and graphs. The method also generalizes $bd$-matching (which itself is a generalization of $b$-matching) and $k$-nearest neighbors.

In some settings, MAP estimation over subgraphs with degree priors can be solved *exactly* in polynomial time. Given the present conversion method, which formulates the problem as a $b$-matching, an optimal graph structure estimate may be obtained with degree distribution information.

Applications of the proposed method include situations in which degree information is inferred from statistical sampling properties, from empirical methods in which degree distributions are learned from data, or from more classical problems in which the degree probabilities are given. An example of the latter case is in protein interaction prediction, where 3D shape analysis can bound the number of mutually accessible binding sites of a protein. Similarly, in social network applications, the number of connections for each user may be known even though the explicit identities of the users who are connected to them are hidden (e.g., LinkedIn.com).

1.1 Outline

In Section 2, the main algorithm for MAP graph estimation with degree priors is proved and its computational cost and the methods it generalizes are discussed. In Section 3, an example of an application of the method to post-processing graph predictions is described. In Section 4 a brief summary and discussion of some possible alternative applications and future work are provided.

2 MAP Edge Estimation

In this section, the derivation and proof of a method for maximizing a probability function defined over subgraphs is presented. Using this method, it is possible to find the optimum of a distribution defined by a concave potential function over node degrees in addition to the basic local edge potentials. Considering the degree potentials prior probabilities over node degrees, the operation can be described as a *maximum a posteriori* optimization.

Formally, a subgraph of an original graph $\Gamma = (\varsigma, E)$ is found. Consider a distribution over all possible subgraphs that involves terms that factorize across (a) edges (to encode independent edge weight) and (b) degree distribution terms that tie edges together, producing dependencies between edges. It is assumed the probability of any candidate edge set $\hat{E} \subseteq E$ is expressed as $$\Pr(\hat{E} \mid \Gamma) \propto \prod_{(i,j) \in \hat{E}} \exp W_{ij} \prod_{v_i \in \varsigma} \exp \psi_i \big( \deg(v_i, \hat{E}) \big) \qquad (1)$$

The singleton edge potentials are represented by a matrix $W \in P^{n \times n}$ where $W_{ij}$ is the gain in log-likelihood when edge $(i, j)$ is changed from off to on. The functions $\psi_j : \{1, \ldots, n\} \to P$ where $j \in \{1, \ldots n\}$ are potentials over the degrees of each node with respect to edges $\hat{E}$. In other words, the probability of an edge structure depends on local edge weight as well as a prior degree bias. Unfortunately, due to the many dependencies implicated in each degree distribution term $\psi_j$, the probability model above has large tree-width. Therefore, exact inference and naive MAP estimation procedures (for instance, using the junction tree algorithm) can scale exponentially with $|V|$. However, with judicious construction, exact MAP estimation is possible when the degree potentials are concave.

2.1 Encoding as a $b$-matching

With the mild assumption that the $\psi_i$ functions in Eq. 1 are concave, the probability of interest can be maximized by solving a $b$-matching. By concavity, it is meant that the change induced by increasing the input degree must be monotonically non-increasing. This is the standard notion of concavity if $\psi_i$ is made continuous by linearly interpolating between integral degrees. Formally, $$\delta \psi_i(k) = \psi_i(k) - \psi_i(k-1),$$
$$\delta^2 \psi_i(k) = \delta \psi_i(k) - \delta \psi_i(k-1)$$
$$= \psi_i(k) - \psi_i(k-1) -$$
$$\big( \psi_i(k-1) - \psi_i(k-2) \big) \leq 0.$$

When degree potentials are concave, it is possible to exactly mimic the probability function $\Pr(\hat{E} \mid \Gamma)$ by building a larger graph with corresponding probability $\Pr(\hat{E}_b \mid \Gamma_b)$. The construction proceeds as follows. First create a new graph $\Gamma_b$, which contains a copy of the original graph $\Gamma$ as well as additional dummy nodes denoted $\Delta$. These dummy nodes mimic the role of the soft degree potential functions $\psi_i$. For each node $v_i$ in the original set $\varsigma$, a set of dummy nodes is introduced. One dummy node is added for each edge in E that is adjacent to each $v_i$. In other words, for each node $v_i$, dummy nodes $d_{i,1},\ldots,d_{i,N_i}$ are added where $N_i = \deg(v_i, E)$ is the size of the neighborhood of node $v_i$. Each of the dummy nodes in $d_{i,1},\ldots,d_{i,N_i}$ is connected to $v_i$ in the new graph $\Gamma_b$. This construction creates graph $\Gamma_b = \{\varsigma_b, E_b\}$ defined as follows:

$$\Delta = \{d_{1,1},\ldots,d_{1,N_1},\ldots,d_{n,1},\ldots,d_{n,N_n}\},$$
$$\varsigma_b = \varsigma \cup \Delta,$$
$$E_b = E \cup \{(v_i, d_{i,j}) \mid 1 \leq j \leq N_i, 1 \leq i \leq n\}.$$

Specifying the weights of the edges in $\Gamma_b$, the weight of each edge $(i, j)$ is copied from E to its original potential $W_{ij}$. The edge weights are set between the original nodes and dummy nodes according to the following formula. The potential between $v_i$ and each dummy node $d_{i,j}$ is $$w(v_i, d_{i,j}) = \psi_i(j-1) - \psi_i(j). \tag{2}$$

While the $\psi$ functions have outputs for $\psi(0)$, there are no dummy nodes labeled $d_{i,0}$ associated with that setting ($\psi(0)$ is only used when defining the weight of $d_{i,1}$). By construction, the weights $w(v_i, d_{i,j})$ are monotonically non-decreasing with respect to the index $j$ due to the concavity of the $\psi$ functions. This characteristic leads to the guaranteed correctness of the method.

$$\psi_i(j) - \psi_i(j-1) \leq \psi_i(j-1) - \psi_i(j-2)$$
$$-w(v_i, d_{i,j}) \leq -w(v_i, d_{i,j-1})$$
$$w(v_i, d_{i,j}) \geq w(v_i, d_{i,j-1}). \tag{3}$$

The probability $\Pr(\hat{E} \mid \Gamma)$ (Eq. 1), which is over edges in $\Gamma$, is emulated with a probability $\Pr(\hat{E}_b \mid \Gamma_b)$, which is over edges of $\Gamma_b$. The degree constraints are set such that each (original) node $v_i$ must have exactly $N_i$ neighbors (including any connected dummy nodes to which it might connect). Dummy nodes have no degree constraints. The proposed approach recovers the most likely subgraph $\hat{E}_b = \arg\max_{\hat{E}_b} \Pr(\hat{E}_b \mid \Gamma_b)$ by solving the following $b$-matching problem:

$$\hat{E}_b = \arg\max_{\hat{E}_b \subseteq E_b} \sum_{(v_i, d_{i,j}) \in \hat{E}_b} w(v_i, d_{i,j}) + \sum_{(i,j) \in \hat{E}_b} W_{ij}$$

$$\text{subject to } \deg(v_i, \hat{E}_b) = N_i \text{ for } v_i \in \varsigma. \tag{4}$$

This construction can be conceptualized in the following way: There is freedom to choose any graph structure in the original graph, but a penalty is paid based on node degrees due to selecting dummy edges maximally. The following theorem proves that this penalty is equivalent to that created by the degree priors.

Theorem 1 *The total edge weight of b-matchings* $\hat{E}_b = \arg\max_{\hat{E}_b} \log \Pr(\hat{E}_b | \Gamma_b)$ *from graph* $\Gamma_b$ *differs from* $\log \Pr(\hat{E}_b \cap E | \Gamma)$ *by a fixed additive constant.*

*Proof.* Consider the edges $\hat{E}_b \cap E$. These are the estimated connectivity $\hat{E}$ after removal of the dummy edges from $\hat{E}_b$. Since the weight of the original edges are set to the $W_{ij}$ potentials, the total weight of these edges is exactly the first term in (1), the local edge weights.

What remains is to confirm that the $\psi$ degree potentials agree with the weights of the remaining edges $\hat{E}_b \setminus (\hat{E}_b \cap E)$ between original nodes and dummy nodes. Recall that the degree constraints require each node in $\Gamma_b$ to have degree $N_i$. By construction, each $v_i$ has $2N_i$ available edges from which to choose: $N_i$ edges from the original graph and $N_i$ edges to dummy nodes. Moreover, if $v_i$ selects $k$ original edges, it must maximally select $N_i - k$ dummy edges. Since the dummy edges are constructed such that their weights are non-decreasing, the maximum $N_i - k$ dummy edges are to the last $N_i - k$ dummy nodes, or dummy nodes $d_{i,k+1}$ through $d_{i,N_i}$. Thus, the following may be verified:

$$\sum_{j=k+1}^{N_i} w(v_i, d_{i,j}) - \sum_{j=k'+1}^{N_i} w(v_i, d_{i,j}) \stackrel{?}{=} \psi_i(k) - \psi_i(k').$$

Terms in the summations cancel out to show this equivalence. After substituting the definition of $w(v_i, d_{i,j})$, the desired equality is revealed.

$$\sum_{j=k+1}^{N_i} (\psi_i(j-1) - \psi_i(j)) - \sum_{j=k'+1}^{N_i} (\psi_i(j-1) - \psi_i(j))$$

$$= \sum_{j=k}^{N_i} \psi_i(j) - \sum_{j=k+1}^{N_i} \psi_i(j) - \sum_{j=k'}^{N_i} \psi_i(j) + \sum_{j=k'+1}^{N_i} \psi_i(j)$$

$$= \psi_i(k) - \psi_i(k')$$

This means the log-probability and the weight of the new graph change the same amount as different subgraphs of $\Gamma$ are tried. Hence, for any $b$-matching $\hat{E}_b$, the quantities $\log\Pr(\hat{E}_b \cap E | \Gamma)$ and $\max_{\hat{E}_b \backslash E} \log\Pr(\hat{E}_b | \Gamma_b)$ differ only by a constant.

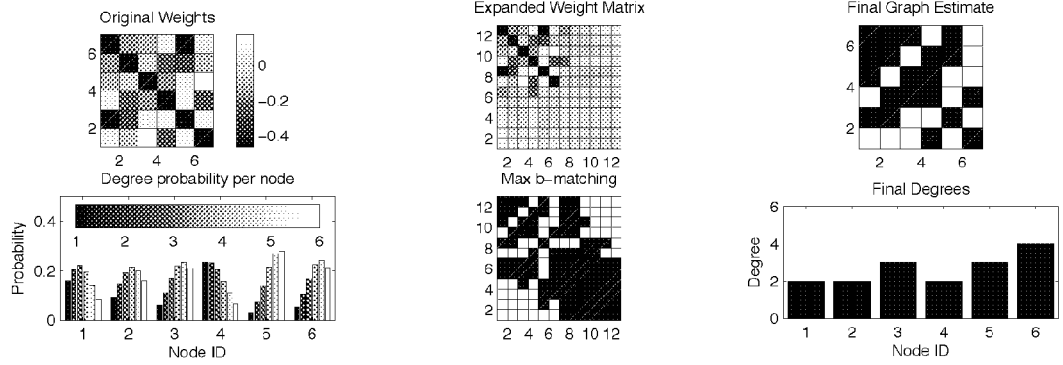

Figure 1: Example of mapping a degree dependent problem to a hard-constrained $b$-matching. Left: Original weight matrix and row/column degree distributions. Upper Middle: Weight matrix of expanded graph, whose solution is now constrained to have exactly 6 neighbors per node. Lower Middle: Resulting $b$-matching, whose upper left quadrant is the final output. Right: MAP solution and final node degrees.

$$\begin{bmatrix} W_{1,1} & W_{1,2} & \cdots & W_{1,n} & \psi_1(0)-\psi_1(1) & \cdots & \psi_1(n-1)-\psi_1(n) \\ \vdots & \vdots & \ddots & \vdots & \vdots & \ddots & \vdots \\ W_{n,1} & W_{n,2} & \cdots & W_{n,n} & \psi_n(0)-\psi_n(1) & \cdots & \psi_n(n-1)-\psi_2(n) \\ \psi_1(0)-\psi_1(1) & \psi_2(0)-\psi_2(1) & \cdots & \psi_n(0)-\psi_n(1) & 0 & \cdots & 0 \\ \vdots & \vdots & \ddots & \vdots & \vdots & \ddots & \vdots \\ \psi_1(n-1)-\psi_1(n) & \psi_2(n-1)-\psi_2(n) & \cdots & \psi_n(n-1)-\psi_n(n) & 0 & \cdots & 0 \end{bmatrix}$$

Figure 2: The new weight matrix constructed by the procedure in Section 2. The upper left quadrant is the original weight matrix, and the extra rows and columns are the weights for dummy edges.

2.2 Computational cost and generalized methods

Since the dummy nodes have no degree constraints, it is only necessary to instantiate $\max_i(N_i)$ dummy nodes and reuse them for each node $v_i$. The process described in this section is illustrated in Figures 2.1 and 2. This results in at most a twofold increase of total nodes in the constructed graph (i.e., $|V_b| \leq 2|V|$). In practice, it is possible to find the maximum weight $b$-matching to maximize $\Pr(\hat{E}_b | \Gamma_b)$ using classical maximum flow algorithms, which require $O(|\varsigma_b| \| E_b |)$ computation time. However, in the special case of bipartite graphs, belief propagation can be used, which yields not only a rather large constant factor speedup, but has been theoretically proven to find the solution in $(|\varsigma_b|^2)$ or $(|E_b|)$ time under certain mild assumptions. Furthermore, the algorithm can be shown to obtain exact solutions in the unipartite case when linear programming integrality can be established.

The class of log-concave degree priors generalizes many maximum weight constrained-subgraph problems. These include simple thresholding of the weight matrix, which is implemented by placing an exponential distribution on the degree; setting the degree prior to $\psi_i(k) = -\theta k$ causes the maximum to have edges on when $W_{ij}$ is greater than threshold $\theta$. Mimicking $b$-matching is possible by setting the degree priors to be delta-functions at degree $b$. Mimicking $bd$-matching is possible, which enforces lower and upper bounds on the degrees, by setting the degree priors to be uniform between the bounds and to have zero probability elsewhere. Mimicking $k$-nearest neighbors is possible by duplicating the nodes of the graph to form a bipartite graph, where edges between nodes in the original graph are represented by edges between bipartitions, and by setting the degrees of one bipartition to exactly $k$ while having no constraints on the other bipartition. Finally, maximum spanning tree estimation can be mimicked by requiring that each node has at least one neighbor and there are exactly $|\varsigma| - 1$ total edges.

3 Experiments

The MAP estimation algorithm may be applied as a post-processing step in a graph prediction process. Consider the task of predicting a graph defined by the preferences of users to items in a slight variation of the standard collaborative filtering setting. A preference graph may be defined as a bipartite graph between a set of users $U = \{u_1, \ldots, u_n\}$ and a set of items $V = \{v_1, \ldots, v_m\}$ that the users have rated with binary recommendations. A rating matrix $Y = \{0,1\}^{n \times m}$ representing the preferences of users (rows) for items (columns) may be assumed. The rating matrix $Y$ is equivalent to the adjacency matrix of the preference graph, and $Y_{ij} = 1$ indicates that user $i$ approves of item $j$ while $Y_{ij} = 0$ indicates that the user disapproves. The training data is a set of user-item pairs and whether an edge is present between their nodes in the preference graph. The testing data is another set of user-item pairs, and the task is to predict which of the testing pairs will have a preference edge present.

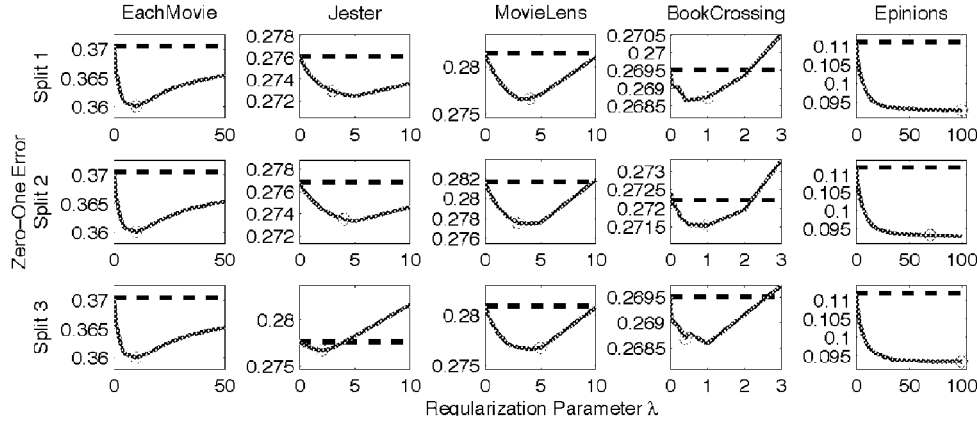

Figure 3: Testing errors of MAP solution across different data sets and random splits. The x-axis of each plot represents the scaling parameter $\lambda$ and the y-axis represents the error rate. The solid blue line is the MAP solution with degree priors, the dotted black line is the logistic-fMMMF baseline. The red circle marks the setting of $\lambda$ that performed best on the cross-validation set. See Table 1 for the numerical scores.

First, a motivation for using degree priors in post-processing is provided. The degrees of nodes in the predicted graph represent the number of items liked by a user or the number of users that like an item. Under certain assumptions, it can be proved that the rate of liking or being liked will concentrate around its empirical estimate, and the deviation probability between training and testing rates is bounded by a log-concave upper bound. Therefore, the deviation bound will be used as a degree prior to post-process predictions output by a state of the art inference method. This, in effect, forces the predictions to obey the bounds.

3.1 Concentration bound

Assume that users $U$ and items $V$ are drawn iid from arbitrary population distributions $\Delta_u$ and $\Delta_v$. Also assume that the probability of an edge between any nodes $u_i$ and $v_j$ is determined by a function that maps the features of the nodes to a valid Bernoulli probability.

$$\Pr(Y_{ij} = 1 | u_i, v_j) = f(u_i, v_j) \in [0,1]. \tag{5}$$

These assumptions yield a natural dependency structure for rating probabilities. The joint probability of users, items and ratings is defined as follows:

$$\Pr(Y, U, V | \Delta_u, \Delta_v) \propto \prod_{ij} p(Y_{ij} | u_i, v_j) \prod_i p(u_i | \Delta_u) \prod_j p(v_j | \Delta_v). \tag{6}$$

The structure of this generative model implies dependencies between the unobserved ratings and even dependencies between the users and movies. This is because the query rating variables and all user and item variables are latent. Due to the independent sampling procedure on users and items, this is known as a hierarchical model and induces a coupling, or interdependence, between the test predictions that are to be estimated by the algorithm. Since the rating variables exist in a lattice of common parents, this dependency structure and the hierarchical model are difficult to handle in a Bayesian setting unless strong parametric assumptions are imposed. Instead, a bound is derived that captures the interdependence of the structured output variables $Y$ without parametric assumptions.

It is assumed that both the training and testing user-item sets are completely randomly revealed from a set of volunteered ratings, which allows proof of an upper bound for the probability that the empirical edge rate of a particular node deviates between training and testing data. In other words, the probability is estimated that an empirical row or column average in the adjacency matrix deviates from its true mean. Without loss of generality, let the training ratings for user $i$ be at indices $\{1,\ldots,c_{tr}\}$ and the testing ratings be at indices $\{c_{tr}+1,\ldots,c_{tr}+c_{te}\}$ such that the training and testing sets are respectively of size $c_{tr}$ and $c_{te}$.[1] Let $\overline{Y}_i = [Y_{i,1},\ldots,Y_{i,c_{tr}+c_{te}}]$ represent the row of ratings by user $i$. Let function $\Delta(\overline{Y}_i)$ represent the difference between the training and query averages. The following theorem bounds the difference between training and testing rating averages:

$$\Delta(Y_{i,1},\ldots,Y_{i,c_{tr}+c_{te}}) = \frac{1}{c_{tr}} \sum_{j=1}^{c_{tr}} Y_{ij} - \frac{1}{c_{te}} \sum_{j=c_{tr}+1}^{c_{tr}+c_{te}} Y_{ij},$$

which will obey the following theorem.

---

[1] A subscript is omitted for the training and testing counts $c_{tr}$ and $c_{te}$ for notational clarity only. Since these counts vary for different nodes, precise notation would involve terms such as $c_i^{tr}, c_i^{te}$.

Theorem 2 *Given that users $U = \{u_1,\ldots,u_n\}$ and rated items $V = \{v_1,\ldots,v_n\}$ are drawn iid from arbitrary distributions $\Delta_u$ and $\Delta_v$ and that the probability of positive rating by a user for an item is determined by a function $f(u_i, v_j) \mapsto [0,1]$, the average of query ratings by each user is concentrated around the average of his or her training ratings. Formally,*

$$\Pr\left(\Delta(\overline{Y}_i) \geq \varepsilon\right) \leq 2\exp\left(-\frac{\varepsilon^2 c_{tr} c_{te}}{2(c_{tr} + c_{te})}\right), \tag{7}$$

$$\Pr\left(\Delta(\overline{Y}_i) \leq -\varepsilon\right) \leq 2\exp\left(-\frac{\varepsilon^2 c_{tr} c_{te}}{2(c_{tr} + c_{te})}\right).$$

The proof of Theorem 2 is deferred to Appendix A.

Using a standard learning method, the estimates of each edge are obtained. However, predicting the most likely setting of each edge independently is equivalent to using a uniform prior over the rating averages. However, a uniform prior violates the bound at a large enough deviation from the training averages. Specifically, this occurs for users or items with a large number of training and testing examples. Thus, it may be advantageous to use a prior that obeys the bound. Since the bound decays quadratically in the exponent, priors that will never violate the bound must decay at a faster rate. These exclude uniform and Laplace distributions and include Gaussian, sub-Gaussian and delta distributions. It is proposed simply to use the normalized bound as a prior.

3.2 Edge weights

To learn reasonable values for the independent edge weights, a Fast Max-Margin Matrix Factorization (fMMMF) is employed using a logistic loss function, which has a natural probabilistic interpretation. In the binary-ratings setting, the gradient optimization for logistic fMMMF, which uses a logistic loss as a differential approximation of hinge-loss, can be interpreted as maximizing the conditional likelihood of a generative model that is very similar to one discussed above. The objective is [2]

---

[2] Here $Y_{ij}^{\pm}$ represents the signed $\{-1,+1\}$ representation of the binary rating, whereas previously, the $\{0,1\}$ representation was used.

$$\min_{U,V} J(U,V) = \frac{1}{2}(\|U\|_{Fro}^2 + \|V\|_{Fro}^2) + C\sum_{ij} \log\left(1 + e^{Y_{ij}^{\pm}(u_i^T v_j - \theta_i)}\right). \tag{8}$$

The probability function for positive ratings is the logistic function, which yields the exact loss term above.

$$\Pr(Y_{ij} | u_i, v_j, \theta_i) = f(u_i, v_j) = \frac{1}{1 + e^{-(u_i^T v_j - \theta_i)}}$$

Minimization of squared Frobenius norm corresponds to placing zero-mean, spherical Gaussian priors on the $u_i$ and $u_i$ vectors, $\Pr(u_i) \propto \exp(-\frac{1}{C}\|u_i\|^2)$ and $\Pr(v_j) \propto \exp(-\frac{1}{C}\|v_j\|^2)$. This yields the interpretation of fMMMF as MAP estimation:

$$\max_{U,V,\Theta} \prod_{ij} P(Y_{ij} | u_i, v_j, \theta_i) \prod_i \Pr(u_i) \prod_j \Pr(v_j).$$

Once the MAP $U$ and $V$ matrices are found using fMMMF, the logistic probabilities are used to set the singleton functions over edges (i.e., edge weights). Specifically, the weight of an edge is the change in log-likelihood caused by switching the edge from inactive to active, $W_{ij} = u_i^T v_j - \theta_i$.

3.3 Results

Experiments tested five data sets. Four are standard collaborative filtering datasets that were thresholded at reasonable levels. The last is trust/distrust data gathered from Epinions.com which represents whether users trust other users' opinions. The EachMovie data set contains 2,811,983 integer ratings by 72,916 users for 1,628 movies ranging from 1 to 6, which were thresholded at 4 or greater to represent a positive rating. The portion of the Jester data set used contains 1,810,455 ratings by 24,983 users for 100 jokes ranging from -10 to 10, which were thresholded at 0 or greater. The MovieLens-Million data set contains 1,000,209 integer ratings by 6,040 users for 3,952 movies ranging from 1 to 5, which were thresholded at 4 or greater. The Book Crossing data set contains 433,669 explicit integer ratings[3] by 77,805 users for 185,854 books ranging from 1 to 10, which were thresholded at 7 or greater. Lastly, the Epinions data set contains 841,372 trust/distrust ratings by 84,601 users for 95,318 authors.

---

3.

Each data set is split randomly three times into half training and half testing ratings. One fifth of the training set were set aside for cross-validation, and logistic fMMMF were trained on the remainder using a range of regularization parameters. The output of fMMMF served as both a baseline as well as the weight matrix of the algorithm. The "degree" distribution was set for each row/column to be proportional to the deviation bound from Theorem 2. Specifically, the following formula was used to set the degree potential $\psi_i$:

$$\psi_i(k) = -\lambda \frac{\left(\frac{1}{c_{tr}} \sum_{j=1}^{c_{tr}} Y_{ij} - k/c_{te}\right)^2 c_{tr} c_{te}}{2(c_{tr} + c_{te})} \tag{9}$$

A regularization parameter $\lambda$ scales the potentials. When $\lambda$ is zero, the degree prior becomes uniform and the MAP solution is to threshold the weight matrix at 0 (the default fMMMF predictions). At greater values, a uniform degree prior (default rounding) becomes strict $b$-matching, following the shape of the concentration bound at intermediary settings. The increasing values of $\lambda$ is explored starting at 0 until either the priors are too restrictive and overfitting is observed or until the value of $\lambda$ is so great that a simple $b$-matching is being solved with degrees locked to an integer value instead of a distribution of integers. Increasing $\lambda$ thereafter will not change the result. Cross-validation is done at this stage by including the testing and held-out cross-validation ratings in the query set of ratings.

The running time of the post-processing procedure is short compared to the time spent learning edge weights via fMMMF. This is due to the fast belief propagation matching code and the sparsity of the graphs. Each graph estimation takes a few minutes (no more than five), while the gradient fMMMF takes hours on these large-scale data sets.

Performance is related to a comparison of the zero-one error of prediction on the data. In particular, it is relevant to compare the fMMMF output that performed best on cross-validation data to the MAP solution of the same output with additional degree priors. The results indicate that adding degree priors reduces testing error on all splits of five data sets. The error rates are represented graphically in Fig. 3 and numerically in Table 1. With higher $\lambda$ values, the priors pull the prediction averages closer to the training averages, which causes overfitting on all but the Epinions data set. Interestingly, even $b$-matching the Epinions data set improves the prediction accuracy over fMMMF. This suggests that the way users decide whether they trust other users is determined by a process that is strongly concentrated. While choosing the bound as a prior and the sampling assumptions made in this article may be further refined in future work, it is important to note that enforcing degree distribution properties on the estimated graph consistently helps improve the performance of a state of the art factorization approach.

Table 1: Average zero-one error rates and standard deviations of best MAP with degree priors and fMMMF chosen via cross-validation. Average taken over three random splits of the data sets into testing and training data. Degree priors improve accuracy on all data sets, but statistically significant improvements according to a two-sample t-test with a rejection level of 0.01 are bold.

| Data set | fMMMF | Degree |
|---|---|---|
| EachMovie | 0.3150 ± 0.0002 | 0.2976 ± 0.0001 |
| Jester | 0.2769 ± 0.0008 | 0.2744 ± 0.0021 |
| MovieLens | 0.2813 ± 0.0004 | 0.2770 ± 0.0005 |
| BookCrossing | 0.2704 ± 0.0016 | 0.2697 ± 0.0016 |
| Epinions | 0.1117 ± 0.0005 | 0.0932 ± 0.0003 |

4 Discussion

We have provided a method to find the most likely graph from a distribution that uses edge weight information as well as degree distributions for each node. The exact MAP estimate is computed in polynomial time by showing that the problem is equivalent to $b$-matching or maximum weight degree constrained subgraph problem. These can be efficiently and exactly implemented using maximum flow as well as faster belief propagation methods. The method generalizes $b$-matching, $bd$-matching, simple thresholding, $k$-nearest neighbors and maximum weight spanning tree which can all be viewed as graph structure estimation with different degree distributions. Various methods that use either these simple degree distributions or no degree information at all may benefit from generalizing the degree information to allow for uncertainty. The main limitation of the approach is that the degree distributions that can be modeled in this way must be log-concave, thus exact inference with more general degree distributions is an open problem.

*Proof of Theorem \refthm:bound*. McDiarmid's Inequality bounds the deviation probability of a function over independent (but not necessarily identical) random variables from its expectation in terms of its Lipschitz constants, which are the maximum change in the function value induced by changing any input variable. The Lipschitz constants for function $\Delta$ are $\ell_j = 1/c_{tr}$ for $1 \le j \le c_{tr}$, and $\ell_j = 1/c_{te}$ otherwise. Although the rating random variables are not identically distributed, they are independently sampled, so we can apply McDiarmid's Inequality (and simplify) to obtain $$\Pr\left(\Delta(\overline{Y}_i) - E[\Delta] \ge t\right) \le \exp\left(-\frac{2t^2 c_{tr} c_{te}}{c_{tr} + c_{te}}\right) \tag{10}$$

The left-hand side quantity inside the probability contains $E[\Delta]$, which should be close to zero, but not exactly zero (if it were zero, Eq. 10 would be the bound). Since the model defines the probability of $Y_{ij}$ as a function of $u_i$ and $v_j$, the expectation is $$E\left[\Delta(\overline{Y}_i)\right] = E\left[\frac{1}{c_{tr}}\sum_{j=1}^{c_{tr}} Y_{ij} - \frac{1}{c_{te}}\sum_{j=c_{tr}+1}^{c_{tr}+c_{te}} Y_{ij}\right]$$

$$= \frac{1}{c_{tr}}\sum_{j=1}^{c_{tr}} f(u_i, v_j) - \frac{1}{c_{te}}\sum_{j=c_{tr}+1}^{c_{tr}+c_{te}} f(u_i, v_j)$$

$$\stackrel{\text{def}}{=} g_i(V)$$

We define the quantity above as a function over the items $V = \{v_1, \ldots, v_{c_{tr}+c_{te}}\}$, which we will refer to as $g_i(V)$ for brevity. Because this analysis is of one user's ratings, we can treat the user input $u_i$ to $f(u_i, v_j)$ as a constant. Since the range of the probability function $f(u_i, v_i)$ is $[0,1]$, the Lipschitz constants for $g_i(V)$ are $\ell_j = 1/c_{tr}$ for $1 \le j \le c_{tr}$, and $\ell_j = 1/c_{te}$ otherwise. We apply McDiarmid's Inequality again.

$$\Pr\left(g_i(V) - E[g_i(V)] \ge \tau\right) \le \exp\left(-\frac{2\tau^2 c_{tr} c_{te}}{c_{tr} + c_{te}}\right).$$

The expectation of $g_i(V)$ can be written as the integral $$E[g_i(V)] = \int \Pr(v_1, \ldots, v_{c_{tr}+c_{te}}) g_i(V) dV.$$

Since the $v$'s are *iid*, the integral decomposes into $$E[g_i(V)] = \frac{1}{c_{tr}} \sum_{j=1}^{c_{tr}} \int \Pr(v_j) f(u_i, v_j) dv_j$$

$$- \frac{1}{c_{te}} \sum_{j=c_{tr}+1}^{c_{tr}-c_{te}} \int \Pr(v_j) f(u_i, v_j) dv_j.$$

Since each $\Pr(v_j) = \Pr(v)$ for all $j$, by a change of variables all integrals above are identical. The expected value $E[g_i(V)]$ is therefore zero. This leaves a bound on the value of $g_i(V)$.

$$\Pr(g_i(V) \geq \tau) \exp\left(-\frac{2\tau^2 c_{tr} c_{te}}{c_{tr} + c_{te}}\right)$$

To combine the bounds, we define a quantity to represent the probability of each deviation. First, let the probability of $g_i(V)$ exceeding some constant $\tau$ be $\frac{\delta}{2}$.

$$\frac{\delta}{2} = \exp\left(-\frac{2\tau^2 c_{tr} c_{te}}{c_{tr} + c_{te}}\right)$$

Second, let the probability of $\Delta(\overline{Y_i})$ exceeding its expectation by more than a constant $t$ also be $\frac{\delta}{2}$, $$\frac{\delta}{2} = \exp\left(-\frac{2t^2 c_{tr} c_{te}}{c_{tr} + c_{te}}\right).$$

We can write both $t$ and $\tau$ in terms of $\delta$:

$$t = \tau = \sqrt{\frac{c_{tr} + c_{te}}{2c_{tr} c_{te} \log \frac{2}{\delta}}}.$$

Define $\varepsilon$ as the concatenation of deviations $t$ and $\tau$, $$\varepsilon = t + \tau = 2\sqrt{\frac{c_{tr} + c_{te}}{2c_{tr} c_{te} \log \frac{2}{\delta}}}.$$

By construction, the total deviation $\varepsilon$ occurs with probability greater than $\delta$. Solving for $\delta$ provides the final bound in Eq. 7. The bound in the other direction follows easily since McDiarmid's Inequality is also symmetric.

Although the above analysis refers only to the ratings of the user, the generative model we describe is symmetric between users and items. Similar analysis therefore applies directly to item ratings as well.

Corollary 1 *Under the same assumptions as Theorem 2, the average of query ratings for each item is concentrated around the* average *of its training ratings.*

Additionally, even though Theorem 2 specifically concerns preference graphs, it can be easily extended to show the concentration of edge connectivity in general unipartite and bipartite graphs as follows.

Corollary 2 *The concentration bound in Theorem 2 applies to general graphs; assuming that edges and non-edges are revealed randomly, nodes are generated iid from some distribution and the probability of an edge is determined by a function of its vertices, the average connectivity of unobserved (testing) node-pairs is concentrated around the average connectivity of observable (training) node-pairs. The probability of deviation is bounded by the same formula as in Theorem 2.*

What is claimed is:

1. A non-transitory computer readable medium having software instructions stored thereon for matching an advertisement with a phrase, the software instructions, when executed by a processor, cause the processor to perform operations comprising:

receiving a first graph data structure, a first weight matrix and degree distribution data as input, the first graph data structure having a first group of advertisement nodes each representing an advertisement and a second group of phrase nodes each representing a phrase, the first weight matrix including weight values, each representing a bid value for each connection between an advertisement node of the first group and a phrase node of the second group in the first graph data structure;

generating a second graph data structure including nodes corresponding to the first graph data structure and additional dummy nodes;

generating a second weight matrix including the first weight matrix and additional weight values each associated with one of the advertisement nodes in the first graph data structure and one of the additional dummy nodes, the additional weight values in the second weight matrix being determined based on the degree distribution data and the second weight matrix also including a group of zero weight values;

constraining the nodes in the second graph data structure that correspond to the first graph data structure to a predetermined degree value and not constraining the additional dummy nodes in the second graph data structure;

determining a maximum weight b-matching based on the second graph data structure, where b is set to the predetermined degree value to generate an intermediate graph data structure having binary weight values;

truncating the intermediate graph data structure to yield a truncated portion; and generating a result graph data structure based on the truncated portion of the intermediate graph data structure as output.

2. The non-transitory computer readable medium of claim 1, wherein the determining the maximum weight b-matching includes:

updating a belief value corresponding to each advertisement node having a connection to a selected phrase node, thereby defining neighboring nodes in the second graph data structure by passing messages between the neighboring nodes until a termination condition is met, each message being based on the additional weight values in the second weight matrix and received messages, where a data content of each message is determined according to a compressed message update rule; and storing each updated belief value and each received message in an electronic storage associated with the selected phrase node.

3. The non-transitory computer readable medium of claim 2, wherein the generating the result graph data structure includes:

selecting a predetermined number of advertisement nodes matching the selected phrase node, the matching based on updated belief values of advertisement nodes neighboring the selected phrase node; and outputting the selected predetermined number of advertisement nodes.

4. The non-transitory computer readable medium of claim 1, wherein the additional weight values include a first group of weight values in a first matrix and a second group of weight values in a second matrix, the second matrix being a transpose of the first matrix.

5. The non-transitory computer readable medium of claim 1, wherein the degree distribution data includes data provided by an advertiser associated with each advertisement.

6. The non-transitory computer readable medium of claim 1, wherein the degree distribution data includes data inferred from statistical properties of prior advertisement and phrase matching data.

7. The non-transitory computer readable medium of claim 1, wherein the degree distribution data includes data learned from stored prior advertisement and phrase matching data.

8. The non-transitory computer readable medium of claim 1, wherein the software instructions are configured to execute on a distributed processor.

9. The non-transitory computer readable medium of claim 1, wherein the operations further include:

receiving quota data for each advertisement;

adjusting weight values for each advertisement node in the first weight matrix based upon quota data corresponding to the each advertisement node; and generating the second weight matrix using the adjusted weight values for the advertisement nodes.

10. The non-transitory computer readable medium of claim 2, wherein the data content of each message is a single scalar value.

11. The non-transitory computer readable medium of claim 10, wherein the single scalar value corresponds to a potential matching of the selected phrase node with a respective one of its neighboring advertisement nodes.

12. The non-transitory computer readable medium of claim 11, wherein the single scalar value includes a weight matrix value corresponding to a potential matching of the selected phrase node and the respective one of the neighboring advertising nodes and a value of a message received by that respective neighboring advertising node from another node and a weight matrix value corresponding to a potential matching between the respective neighboring advertising node and the other node.

13. The non-transitory computer readable medium of claim 1, wherein the phrase is a phrase included in a search query submitted to a search engine.

14. The non-transitory computer readable medium of claim 1, wherein the phrase is a phrase extracted from content within a content page on which a predetermined number of advertisements are to be displayed such that displayed advertisements relate to the content found on the content page.

15. The non-transitory computer readable medium of claim 1, wherein the phrase is a phrase determined based on a semantic analysis of a natural language phrase.

16. The non-transitory computer readable medium of claim 15, wherein the natural language phrase is a natural language search query.

17. The non-transitory computer readable medium of claim 15, wherein the natural language phrase is a natural language advertiser goal.

18. A distributed processing system for matching advertisements with search terms, the system comprising:

a plurality of processors each corresponding to at least one node of a graph data structure having advertisement nodes, search term nodes and dummy nodes, where each advertisement node is a neighbor to at least one search term node;

a network coupling the plurality of processors and configured to transfer messages between the plurality of processors;

wherein each processor is configured to load and execute software instructions stored on a non-transitory computer readable medium, the software instructions, when executed, cause the processor to perform operations including:

receiving a portion of a first graph data structure, a portion of a profit matrix and a portion of degree distribution data as input, the first graph data structure having a first group of nodes each representing an advertisement and a second group of nodes each representing a search term, the profit matrix including a bid value for each connection between an advertisement and a search term in the first graph data structure;

generating a second graph data structure including nodes corresponding to the first graph data structure and a plurality of dummy nodes;

generating a weight matrix portion including the portion of the profit matrix and, when the processor corresponds to one of the plurality of dummy nodes, generating an additional weight value associated with the dummy node, the additional weight value in the weight matrix portion being based on the portion of degree distribution data or having a zero value depending on a location of the dummy node in the second graph data structure;

receiving a node constraint value for nodes in the second graph data structure that correspond to the first graph data structure representing a predetermined degree value and not receiving a constraint value for the dummy nodes in the second graph data structure;

determining a maximum weight b-matching based on the second graph data structure, where b is set to the predetermined degree value to generate an intermediate graph data structure having binary weight values, the determining including:

updating belief values corresponding to respective neighboring nodes by passing messages between neighboring nodes until a termination condition is met, a data content of each message being based on weight matrix values and received messages, where a data content of each message is determined according to a message update rule;

storing each updated belief value and each received message in an electronic storage associated with the respective processor;

truncating the intermediate graph data structure to yield a truncated portion that remains after truncating and a removed portion;

generating a result graph data structure based on the truncated portion of the intermediate graph data structure as output, including selecting a predetermined number of matching neighboring nodes, the matching being determined based on updated belief values of neighbor nodes; and outputting the selected matching neighboring nodes.

19. The distributed processing system of claim 18, wherein the data content of each message is a single scalar value.

20. The distributed processing system of claim 19, wherein the single scalar value corresponds to a potential matching of each search term node of the selected neighboring nodes with a respective one of the advertisement nodes of the selected neighboring nodes.

21. The distributed processing system of claim 20, wherein the single scalar value includes a profit matrix value corresponding to a potential matching of a selected search term node and the respective one of the neighboring nodes and a value of a message received by that respective neighboring node from another node and a profit matrix value corresponding to a potential matching between the respective neighboring node and the other node.

22. The distributed processing system of claim 18, wherein the plurality of processors are constituted by a cloud computing system.

23. The distributed processing system of claim 18, wherein each profit matrix value represents a profit amount associated with an edge between neighboring nodes.

24. The distributed processing system of claim 18, wherein the updating is performed iteratively until the termination condition is met.

25. The distributed processing system of claim 18, wherein the termination condition is a predetermined number of iterations of the updating.

26. The distributed processing system of claim 18, wherein the termination condition is defined as receiving no changed message values within a predetermined period of time.

27. The distributed processing system of claim 18, wherein the termination condition is a number of messages sent from each node.

28. The distributed processing system of claim 18, wherein the termination condition is an elapsing of a predetermined period of time.

29. The distributed processing system of claim 18, wherein the termination condition is defined as the earliest occurrence of one of receiving no changed message values within a first predetermined period of time and an elapsing of a second predetermined period of time.

30. A computerized method for matching an advertiser with a search term, the method comprising:

providing a first bipartite graph data structure having a plurality of advertiser nodes and a plurality of search term nodes, where each advertiser node is connected to a corresponding search term node by an edge;

providing a profit matrix having a profit for each edge of the first bipartite graph data structure;

providing degree distribution data representing a degree distribution of each node;

generating a second bipartite graph data structure including nodes of the first bipartite graph data structure and a plurality of dummy nodes;

generating, with a processor configured to perform weight matrix expansion, a weight matrix including values of the profit matrix and additional values associated with the plurality of dummy nodes, the additional values in the weight matrix being determined based on the degree distribution data and including a group of zero weight values;

constraining the nodes in the second bipartite graph data structure that correspond to the first bipartite graph data structure to a predetermined degree value and not constraining the plurality of dummy nodes in the second bipartite graph data structure when determining a maximum weight b-matching based on the second bipartite graph data structure, where b is set to the predetermined degree value to generate an intermediate bipartite graph data structure having binary weight values;

generating a result graph data structure by truncating the intermediate bipartite graph data structure to remove the plurality of dummy nodes;

selecting a predetermined number of advertiser nodes matching each search term node of a group of search term nodes of interest, the matching being determined based on result graph values of advertiser nodes adjacent to each search term node of interest; and outputting data indicating the selected predetermined number of advertiser nodes matching the each search term node of interest.

31. The computerized method of claim 30, wherein the determining the maximum weight b-matching includes:
updating, with a processor configured to perform belief propagation generalized matching, a belief value corresponding to each advertiser node connected to a selected search term node by passing messages between adjacent nodes until a termination condition is met, each message being based on weight matrix values and received messages, where a data content of each message is determined according to a compressed message update rule; and
storing each updated belief value and each received message in an electronic storage associated with the corresponding advertiser node.

32. The method of claim 31, further comprising displaying advertisements associated with each of the selected predetermined number of advertiser nodes on a search results page corresponding to the search term node associated with the selected predetermined number of advertiser nodes.

33. The method of claim 31, further comprising storing at each advertiser node and at each search term node a portion of the profit matrix and a portion of the degree distribution data, where each portion is selected based on adjacent nodes of each respective advertiser node and each respective search term node.

34. The method of claim 31, wherein the updating and storing are performed using parallel processing.

35. The method of claim 31, wherein the processor is a cloud computing system configured to perform bipartite matching using belief propagation with degree distribution data.

36. The method of claim 31, wherein the electronic storage is a cloud storage system.

37. The method of claim 30, wherein each profit represents a profit on placement of an advertisement by an advertiser associated with the advertisement.

38. The method of claim 31, wherein the updating is performed iteratively until the termination condition is met.

39. The method of claim 31, wherein the termination condition is a predetermined number of iterations of the updating.

40. The method of claim 31, wherein the termination condition is defined as a steady state of updated belief values during a predetermined period of time.

41. The method of claim 31, wherein the termination condition is a number of messages sent from each node.

42. The method of claim 31, wherein the termination condition is an elapsing of a predetermined period of time.

43. The method of claim 31, wherein the termination condition is defined as the earliest occurrence of one of a steady state of updated belief values during a first predetermined period of time and an elapsing of a second predetermined period of time.

44. A computerized method for matching customers with suppliers in an auction, the method comprising:
providing a first bipartite graph data structure having a plurality of supplier nodes and a plurality of customer nodes, where each supplier node is connected to a customer node by an edge;
providing a first weight matrix having a weight value for each edge of the first bipartite graph data structure, where a portion of the first weight matrix is provided to each supplier node and each customer node, the weight matrix portion including weight values for nodes connected respectively by edges to each respective supplier nodes and customer nodes;
generating, using a processor configured to estimate a graph data structure using prior degree distribution information, a second graph data structure including nodes corresponding to the first bipartite graph data structure and having a plurality of dummy nodes;
generating, with the processor, a second weight matrix including the first weight matrix and additional weight values each associated with one of the plurality of dummy nodes, the additional weight values in the second weight matrix being determined based on the degree distribution data, the second weight matrix also including a group of zero weight values associated with a group of the plurality of dummy nodes;
storing the second weight matrix in an electronic memory coupled to the processor;
constraining nodes of the second graph data structure that correspond to nodes of the first bipartite graph data structure to a predetermined degree value, and leaving the plurality of dummy nodes in the second graph data structure unconstrained while determining a maximum weight b-matching based on the second graph data structure, where b is set to the predetermined degree value to generate an intermediate graph data structure having binary weight values;
truncating the intermediate graph data structure to yield a truncated portion that remains after truncating; and
generating a result graph data structure based on the truncated portion of the intermediate graph data structure as output.

45. The computerized method of claim 44, wherein the determining the maximum weight b-matching includes:
updating a belief value corresponding to each of the supplier nodes and customer nodes, with a processor configured to perform belief propagation, by passing electronic messages between adjacent nodes until a termination condition is met, each message being based on the weight matrix portion values and received messages, where a value of each message is determined according to a compressed message update rule; and
storing, in an electronic memory, received messages and an updated belief value for each supplier node and customer node in storage locations of the electronic memory associated with the each supplier node and customer node.

46. The computerized method of claim 45, wherein the method further includes:
selecting, with the processor, a predetermined number of supplier nodes and a predetermined number of respective customer nodes matching each selected one of the predetermined number of supplier nodes, the selecting of the customer nodes being based on updated belief values; and
outputting data responsive to selected ones of said predetermined number of customer nodes and said predetermined number of supplier nodes resulting from said selecting.

47. The computerized method of claim 45, wherein the updating and storing are performed using parallel processing.

48. The computerized method of claim 47, wherein the parallel processing is carried out on a cloud computing system and the electronic memory includes a cloud storage system.

49. The computerized method of claim 45, wherein each weight in the first weight matrix represents a profit amount for a connection between the corresponding supplier and customer.

50. The computerized method of claim 45, wherein the updating is performed iteratively until the termination condition is met.

51. The computerized method of claim 44, wherein the determining the maximum weight b-matching includes applying a max flow algorithm to the second graph data structure.

52. The computerized method of claim 44, wherein the degree distribution data for each node includes data provided by a respective supplier or customer.

53. The computerized method of claim 44, wherein the degree distribution data includes data inferred from statistical properties of prior supplier and customer data.

54. The computerized method of claim 44, wherein the degree distribution data includes data learned from stored prior supplier and customer matching data.

55. A non-transitory computer readable medium having software instructions stored thereon for matching buyers with sellers in an auction, the software instructions, when executed by a processor, cause the processor to perform operations comprising:
provoding a first graph data structure having a plurality of seller nodes and a plurality of buyer nodes, where each seller node is connected to a buyer node by an edge;
providing a first weight matrix having a weight value for each edge of the first graph data structure, where a portion of the first weight matrix is provided to each buyer node and each seller node, the weight matrix portion including weight values for nodes adjacent to each respective buyer node and seller node;
generating, using a processor configured to estimate a graph structure using prior degree distribution information, a second graph data structure including nodes corresponding to the first graph data structure and a plurality of dummy nodes;
generating, using the processor, a second weight matrix including the first weight matrix and additional weight values each associated with one of the plurality of dummy nodes, the additional weight values in the second weight matrix being determined based on the degree distribution data, the second weight matrix also including a group of zero weight values associated with a group of edges between respective ones of the plurality of dummy nodes;
storing the second weight matrix in an electronic memory coupled to the processor;
constraining nodes of the second graph data structure that correspond to nodes of the first graph data structure to a predetermined degree value, and leaving the plurality of dummy nodes in the second graph data structure unconstrained;
determining a maximum weight b-matching based on the second graph data structure, where b is set to the predetermined degree value, the determining including:
updating a belief value corresponding to each of the buyer nodes and seller nodes, with a processor configured to perform belief propagation, by passing electronic messages between adjacent nodes until a termination condition is met, each message being based on the weight matrix portion values and received messages, where a value of each message is determined according to a compressed message update rule; and
storing, in an electronic memory, received messages and an updated belief value for each buyer node and seller node in storage locations of the electronic memory associated with the each buyer node and seller node;
generating an intermediate graph data structure having binary weight values responsively to a result of said determining a maximum weight b-matching;
truncating the intermediate graph data structure to yield a truncated portion that remains after truncating and a removed portion; and
selecting, with the processor, a predetermined number of seller nodes and a predetermined number of respective buyer nodes matching each selected one of the predetermined number of seller nodes, the selecting of the buyer nodes being based on updated belief values; and
outputting data responsive to the selected buyer nodes and the selected seller nodes resulting from said selecting.

56. A computerized method for matching social network members using belief propagation, the method comprising:
accessing a first graph data structure having a plurality of member nodes each representing a member of a social network service and a compatibility matrix representing a compatibility between member nodes connected by an edge of the first graph data structure;
accessing degree distribution data indicating a degree distribution for each member node;
generating a second graph data structure that includes nodes from the first graph data structure and a group of dummy nodes;
generating a weight matrix including the compatibility matrix and additional weight values corresponding to edges connecting member nodes and dummy nodes, the additional weight values being based on a portion of the degree distribution data, the weight matrix also including a group of zero weight values corresponding to edges connecting dummy nodes;
constraining a degree value of the member nodes within the second graph data structure and leaving the dummy nodes within the second graph data structure unconstrained while updating, with a processor configured to perform social network service member matching using degree distribution and belief propagation, a belief value corresponding to edges between nodes of the second graph data structure by passing messages between nodes connected by edges until a termination condition is met, each message being based on weight matrix values and received messages, where a data content of each message is determined according to a compressed message update rule;
storing each updated belief value and each received message in an electronic storage associated with a respective one of the nodes;
extracting a portion of the second graph data structure that corresponds to the member nodes as a result graph data structure;
selecting a predetermined number of connected member nodes matching a member node of interest of the member nodes from the result graph data structure, the selecting being determined based on updated belief values of connected member nodes of the member node of interest; and
outputting the predetermined number of connected member nodes matching the member node of interest.

57. A computerized method for post processing recommender outputs, the method comprising:
receiving, from an electronic storage, a training data set containing a plurality of nodes having a group of nodes representing users and a group of nodes representing items wherein the users are prospective purchasers, at least some of the training data set being responsive to said users, and the items correspond to products available for purchase and stored in an electronic storage of at least one server;

receiving a ratings matrix representing preferences of users for items in the training data set, with each cell in the ratings matrix containing a value representing a rating of one of the items by one of the users;

receiving a testing data set containing a plurality of nodes having a group of nodes representing users and a group of nodes representing items generating deviation bound data including a deviation bound for each user and item in the training data set;

learning values for edge weights based on the training data set and the ratings matrix and storing the edge weights in a first weight matrix;

generating an expanded graph data structure including the nodes of the testing data set and additional dummy nodes;

generating a second weight matrix including values from the first weight matrix corresponding to nodes from the testing data set and additional values corresponding to the additional dummy nodes, the additional values being determined based on a portion of the deviation bound data;

constraining the expanded graph data structure nodes corresponding to the testing data set nodes to a predetermined degree value and not constraining the additional dummy nodes in the expanded graph data structure;

determining a maximum weight b-matching based on the expanded graph data structure and the second weight matrix, where b is set to the predetermined degree value, and generating an intermediate graph data structure having binary values;

truncating the intermediate graph data structure so that only the nodes corresponding to the nodes of the testing data set remain in a resulting truncated portion of the intermediate graph data structure; and generating a result graph data structure based on the truncated portion of the intermediate graph data structure as output.

58. The computerized method of claim 57, wherein the determining the maximum weight b-matching includes:

updating a belief value corresponding to each neighboring item node of a selected user node in the expanded graph data structure by passing messages between neighboring nodes until a termination condition is met, each message being based on the second weight matrix values and received messages, where a data content of each message is determined according to a compressed message update rule; and storing each updated belief value and each received message in an electronic storage associated with the selected user node.

59. The computerized method of claim 58, wherein generating the result graph data structure includes:

selecting a predetermined number of item nodes matching the selected user node, the matching based on updated belief values of item nodes neighboring the selected user node; and outputting the selected predetermined number of item nodes.

60. The computerized method of claim 57, wherein the learning includes performing a fast Max-Margin Matrix Factorization (fMMMF) with a logistic loss function.

61. A recommender system comprising:

a first processor configured to learn edge weights for edges of a graph data structure having a plurality of nodes including a group of user nodes and a group of item nodes and to store the edge weights in a first weight matrix;

a second processor coupled to the first processor and configured to receive a portion of the graph data structure and the first weight matrix from the first processor, the second processor being further configured to perform a matching operation using degree distribution data, the degree distribution data being based on deviation bound data including a deviation bound for each user and item in the graph data structure, the deviation bound data determined based on the portion of the graph data structure and a preference matrix corresponding to the graph data structure, wherein the matching operation includes:

generating an expanded graph data structure including the nodes of the portion of the graph data structure and a plurality of dummy nodes;

generating a second weight matrix including values from the first weight matrix corresponding to nodes from the portion of the graph data structure and additional values corresponding to the predetermined number of dummy nodes, the additional values being determined based on a portion of the deviation bound data;

constraining expanded graph data structure nodes corresponding to nodes of the portion of graph data structure nodes to a predetermined degree value and not constraining the predetermined number of dummy nodes in the expanded graph data structure;

determining a maximum weight b-matching based on the expanded graph data structure and the second weight matrix, where b is set to the predetermined degree value, the determining including:

updating a belief value corresponding to each neighboring item node of a selected user node in the expanded graph data structure by passing messages between neighboring nodes until a termination condition is met, each message being based on the second weight matrix values and received messages, where a data content of each message is determined according to a compressed message update rule; and storing each updated belief value and each received message in an electronic storage associated with the selected user node;

truncating the intermediate graph data structure so that only the nodes corresponding to the portion of the graph data structure remain; and generating a result graph data structure based on a truncated portion of the intermediate graph data structure as output.

62. The recommender system of claim 61, wherein the generating the result graph data structure includes:

selecting a predetermined number of item nodes matching the selected user node, the matching based on updated belief values of item nodes neighboring the selected user node; and outputting the selected predetermined number of item nodes.

63. The recommender system of claim 62, wherein the item nodes include members of the opposite sex in a dating application.

64. The recommender system of claim 62, wherein the first processor is further configured to perform a fast Max-Margin Matrix Factorization (fMMMF) with a logistic loss function.

65. The recommender system of claim 62, wherein the item nodes include movies.

66. The recommender system of claim 62, wherein the item nodes include books.

67. The recommender system of claim 62, wherein the item nodes include sound recordings.

68. A non-transitory computer readable medium having software instructions stored thereon for programming a computer to perform post processing on recommendation data, the software instructions, when executed by a processor, cause the processor to perform operations comprising:
receiving a training data set containing a plurality of nodes including a group of user nodes and a group of item nodes;
receiving a ratings matrix representing preferences of users for items in the training data set, with each cell in the ratings matrix containing a value representing a rating of one of the items by one of the users;
receiving a testing data set containing a plurality of nodes including a group of user nodes and a group of item nodes;
generating deviation bound data including a deviation bound for each user and each item in the training data set;
learning values for edge weights in the testing data set based on the training data set and the ratings matrix and storing the edge weights in a first weight matrix, the learning including performing a fast Max-Margin Matrix Factorization routine with a logistic loss function;
generating an expanded graph data structure including nodes of the testing data set and additional dummy nodes;
generating a second weight matrix including values from the first weight matrix corresponding to nodes from the testing data set and additional values corresponding to the additional dummy nodes, the additional values being determined based on a portion of the deviation bound data;
constraining the expanded graph data structure nodes corresponding to the testing data set nodes to a predetermined degree value and not constraining the additional dummy nodes in the expanded graph data structure;
determining a maximum weight b-matching based on the expanded graph data structure and the second weight matrix, where b is set to the predetermined degree value, the determining including updating a belief value corresponding to each neighboring item node of a selected user node in the expanded graph data structure by passing messages between neighboring nodes until a termination condition is met, each message being based on the second weight matrix values and received messages, where a data content of each message is determined according to a compressed message update rule, and storing each updated belief value and each received message in an electronic storage associated with the selected user node;
truncating the expanded graph data structure so that only the nodes corresponding to the nodes of the testing data set remain in a resulting truncated portion of the expanded graph data structure; and
generating a result graph data structure based on the truncated portion of the expanded graph data structure as output.

69. The non-transitory computer readable medium of claim 68, wherein generating the result graph data structure includes:
selecting a predetermined number of item nodes matching the selected user node, the matching based on updated belief values of item nodes neighboring the selected user node; and
outputting the selected predetermined number of item nodes.

70. The non-transitory computer readable medium of claim 68, wherein the items include movies.

71. The non-transitory computer readable medium of claim 68, wherein the items include books.

72. The non-transitory computer readable medium of claim 68, wherein the items include sound recordings.

73. The non-transitory computer readable medium of claim 68, wherein the items include members of the opposite sex in a dating application.

* * * * *